June 6, 1961     L. C. WILLIAMS ET AL     2,987,099
APPARATUS FOR MOUNTING FILMS AND OTHER INSERTS IN CARDS
Filed March 28, 1957     21 Sheets-Sheet 2

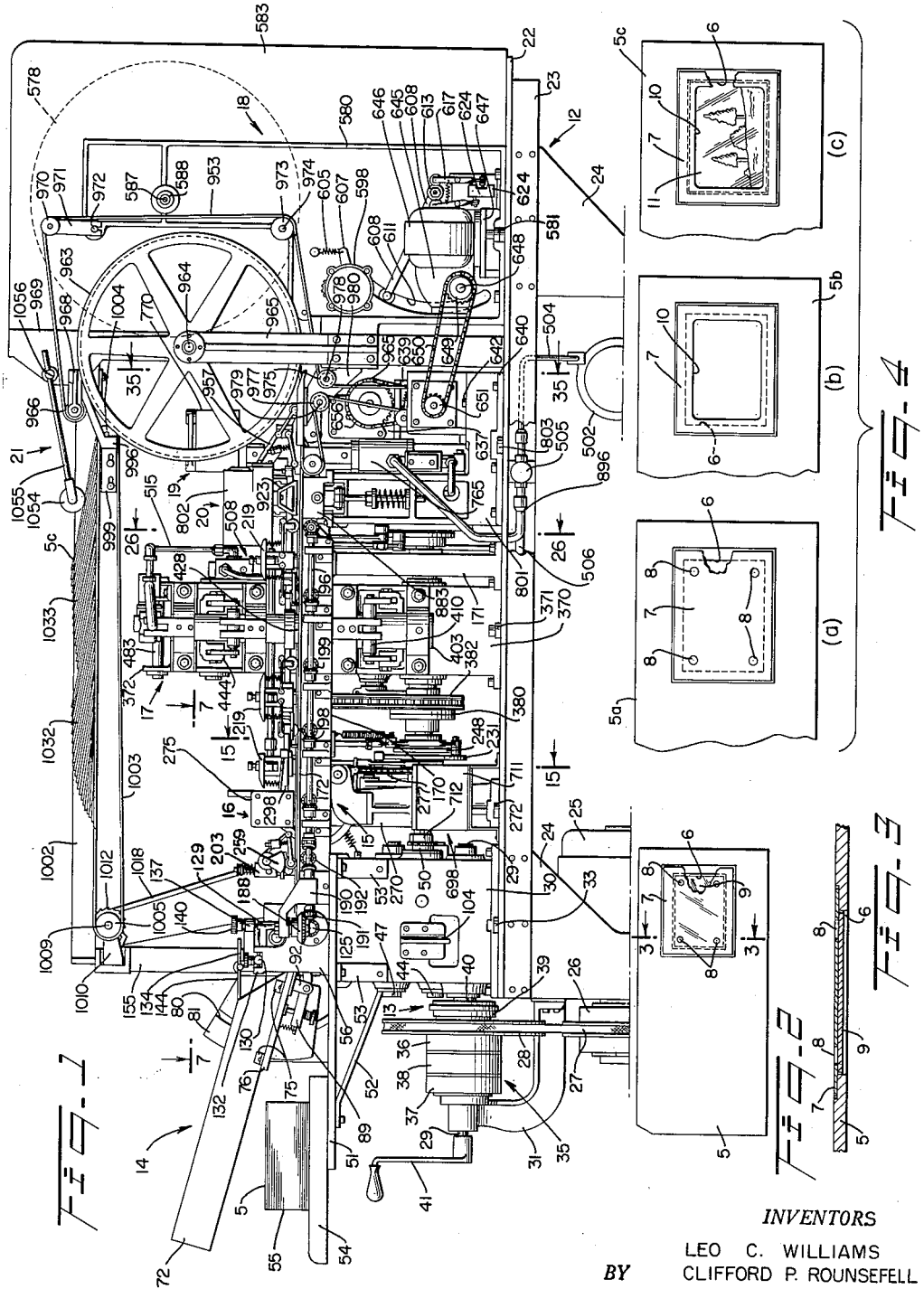

*INVENTORS*
LEO C. WILLIAMS
CLIFFORD P. ROUNSEFELL
BY
*Bauer and Seymour*
ATTORNEYS June 6, 1961 L. C. WILLIAMS ET AL 2,987,099
APPARATUS FOR MOUNTING FILMS AND OTHER INSERTS IN CARDS
Filed March 28, 1957 21 Sheets-Sheet 3
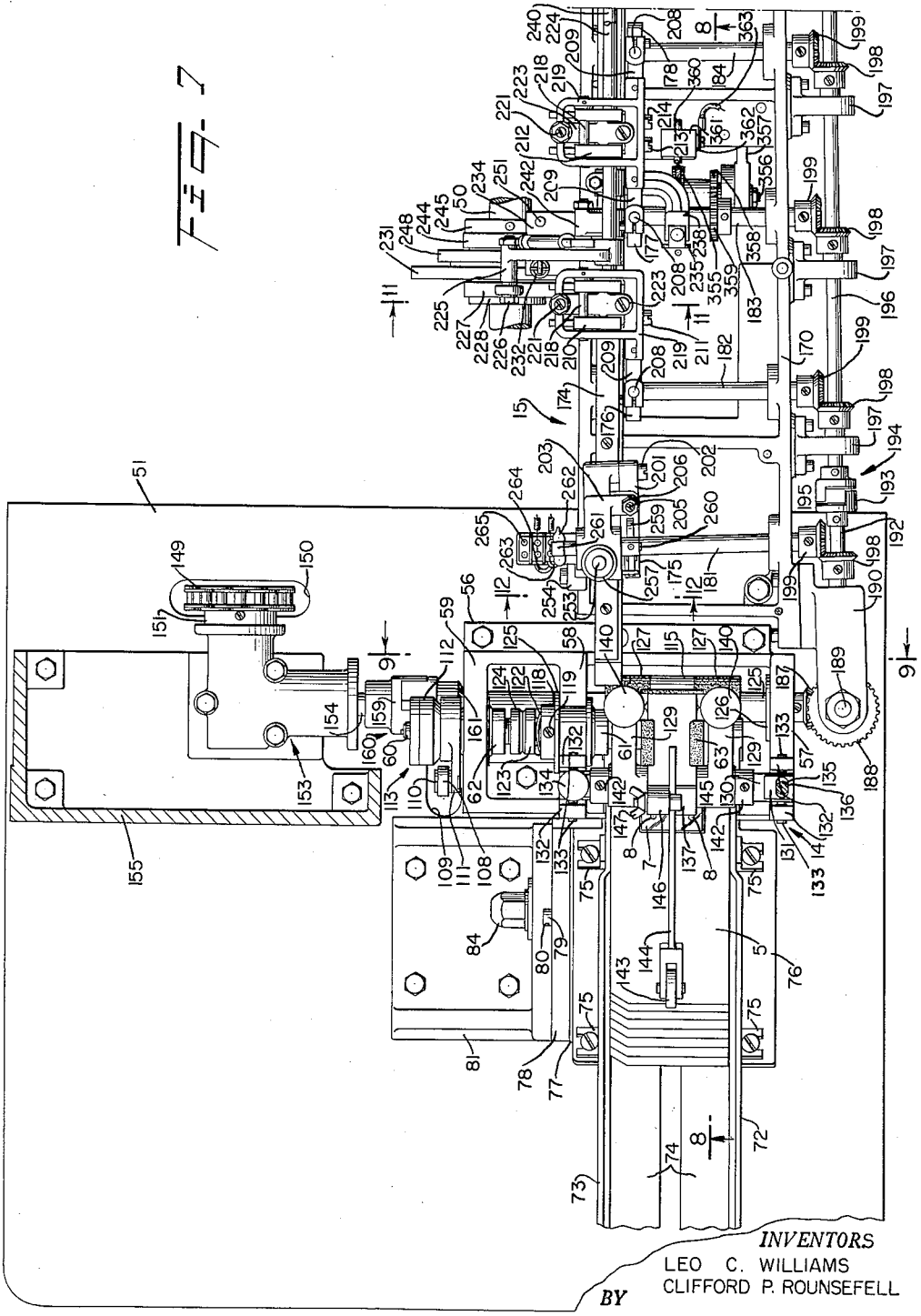
INVENTORS
LEO C. WILLIAMS
CLIFFORD P. ROUNSEFELL
BY
Bauer and Seymour
ATTORNEYS

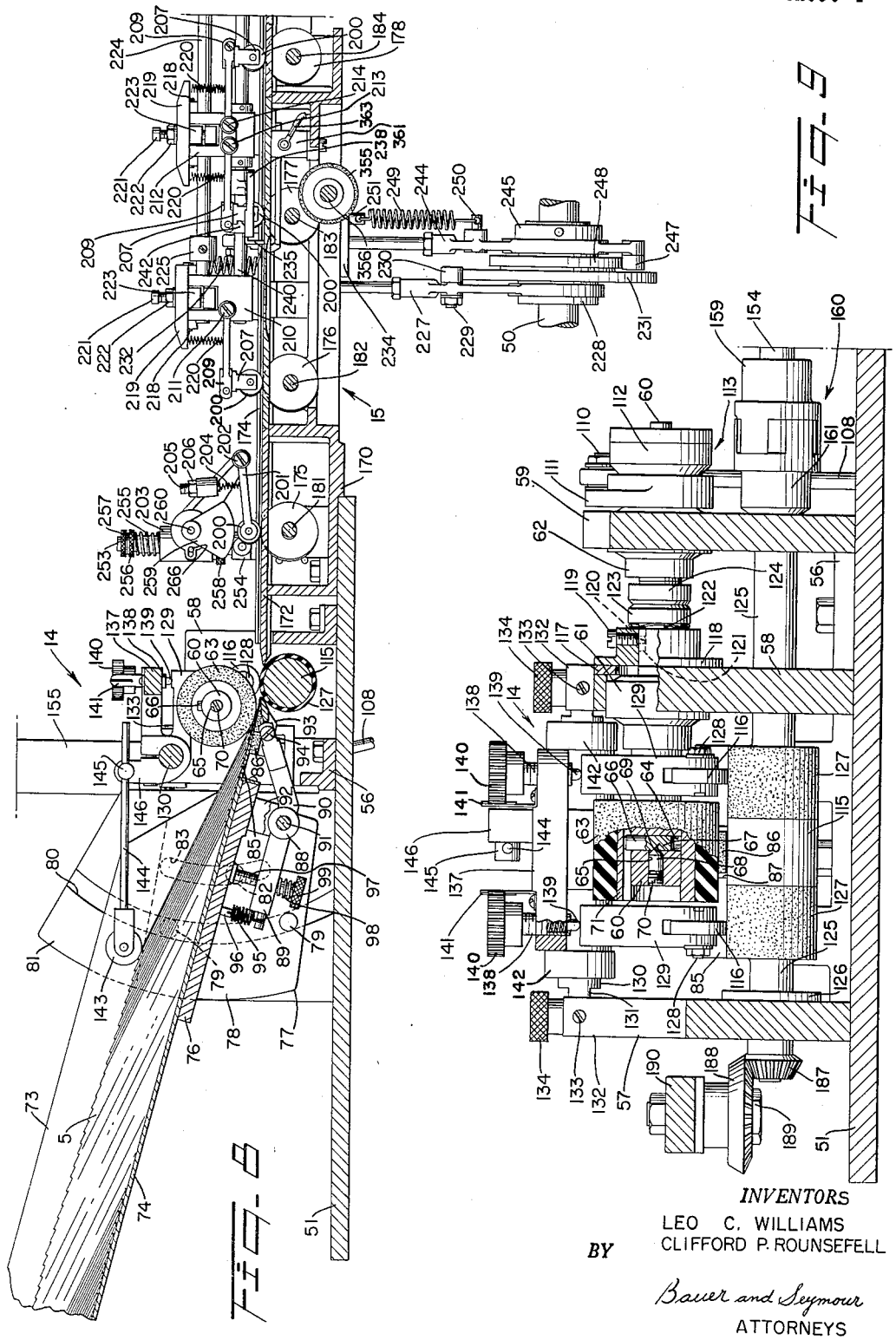

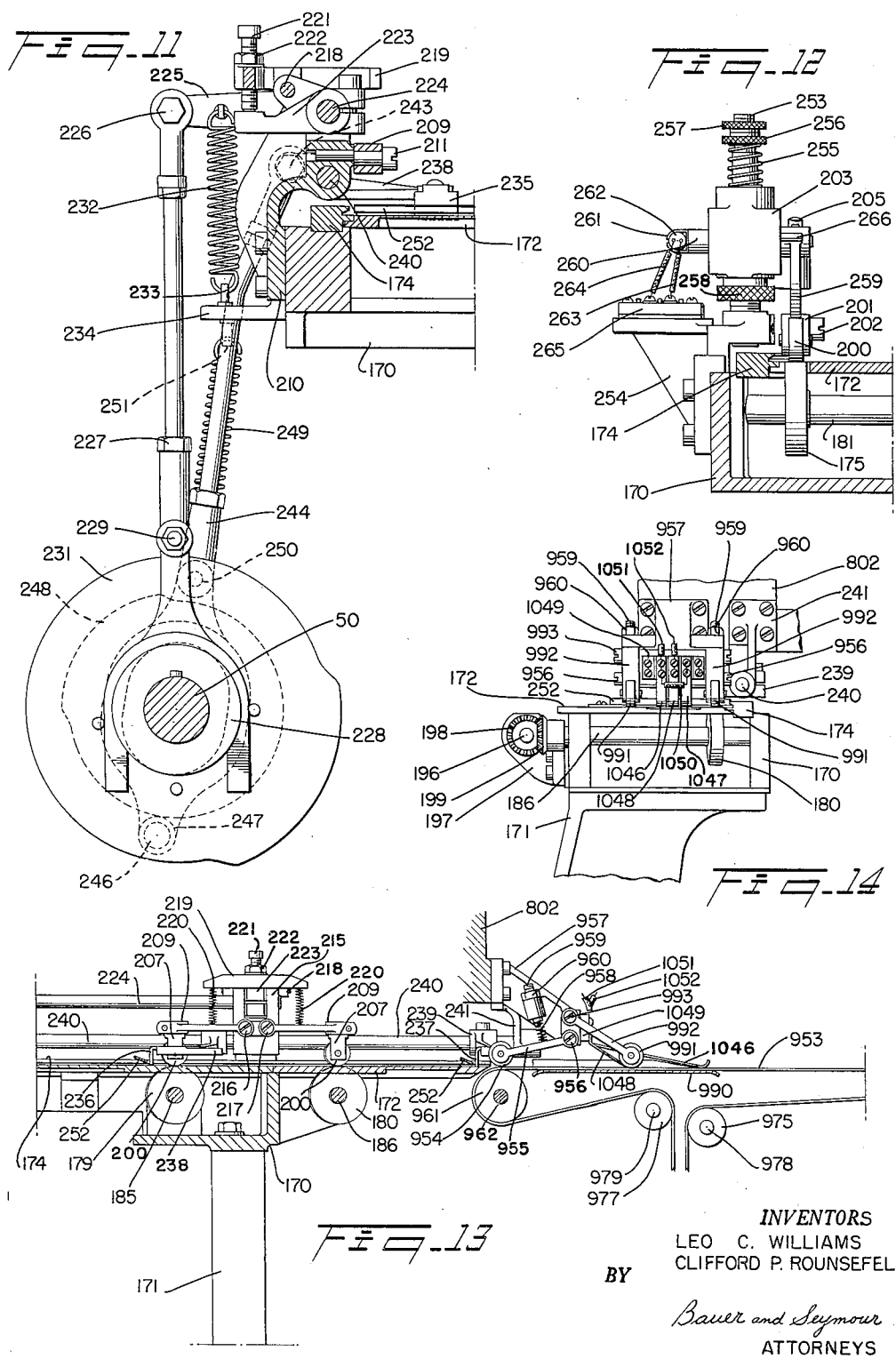

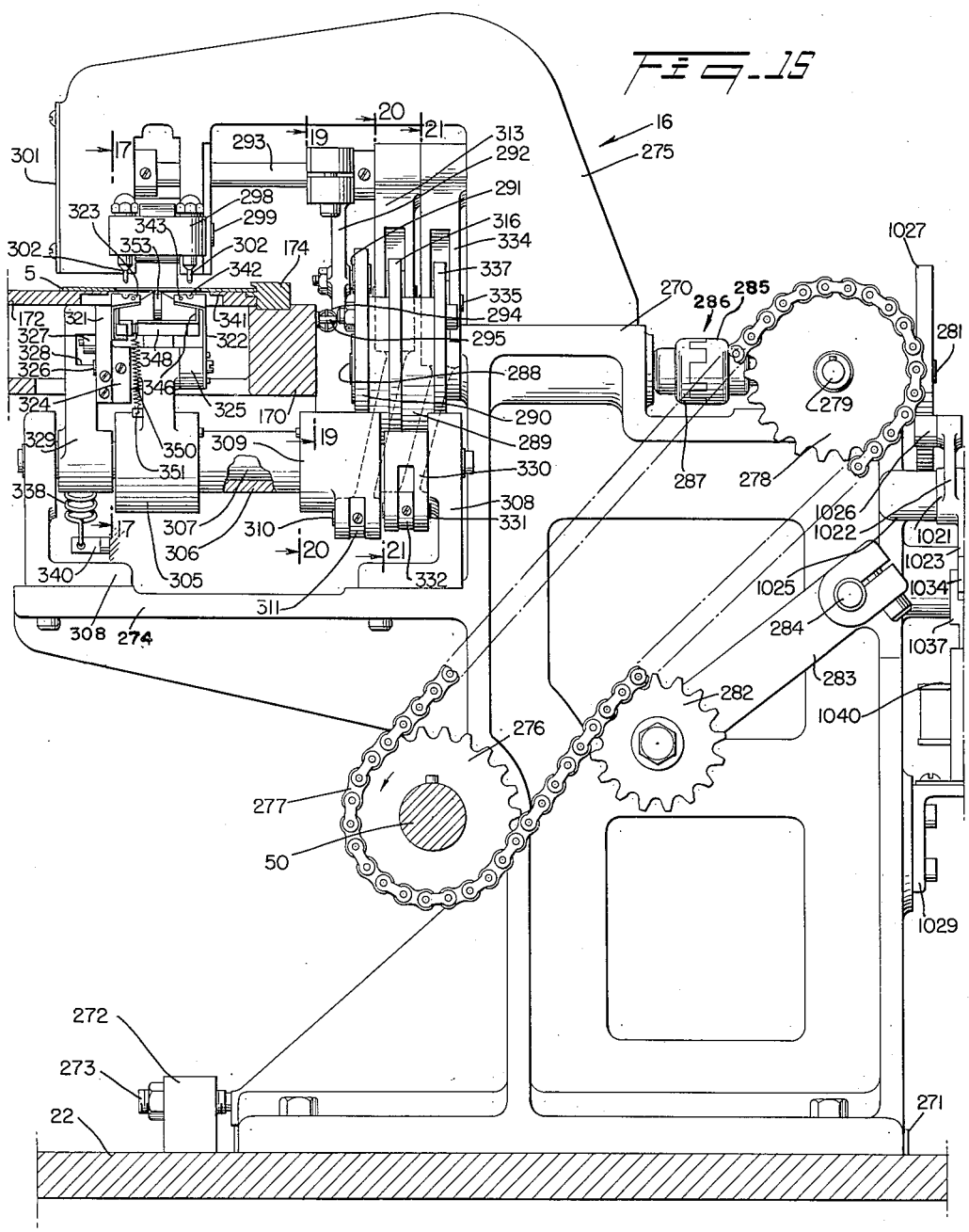

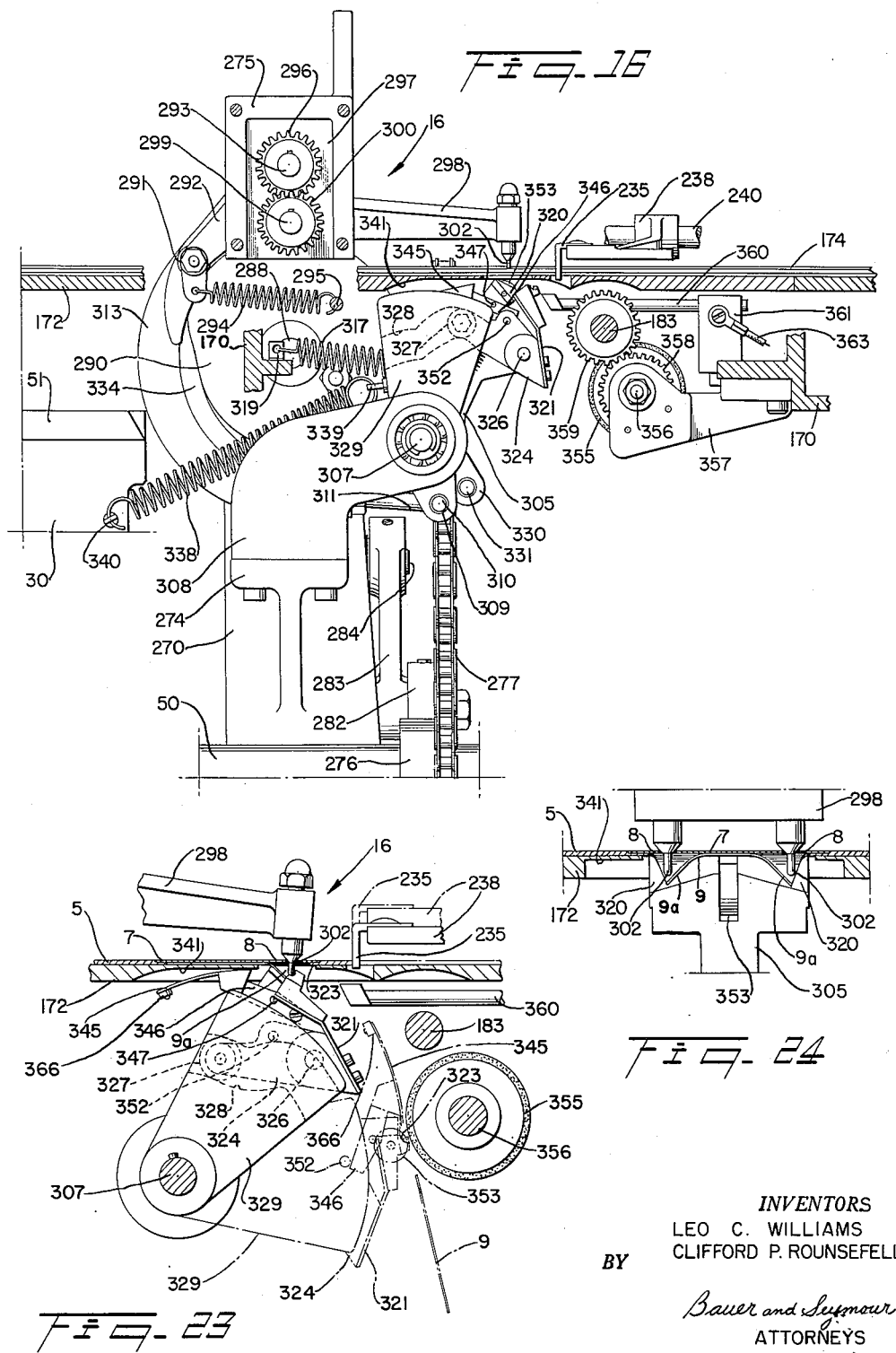

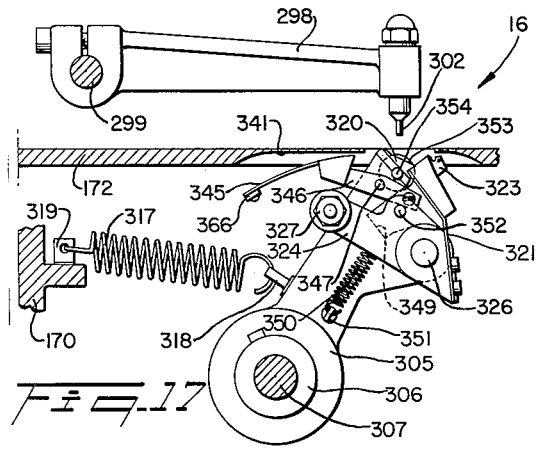
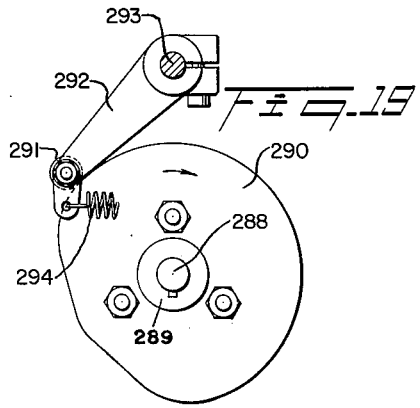
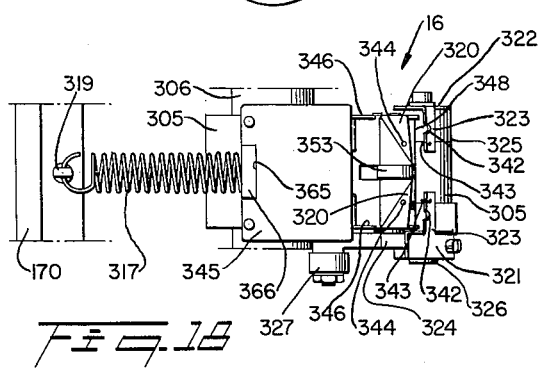
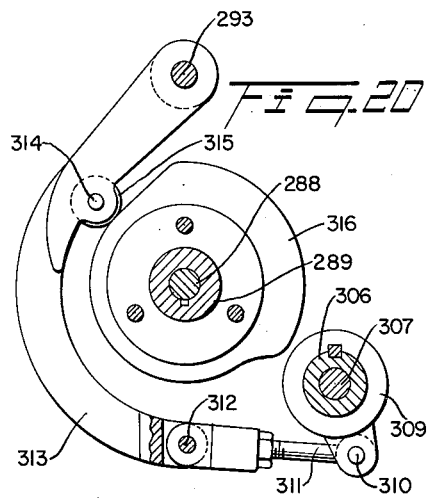
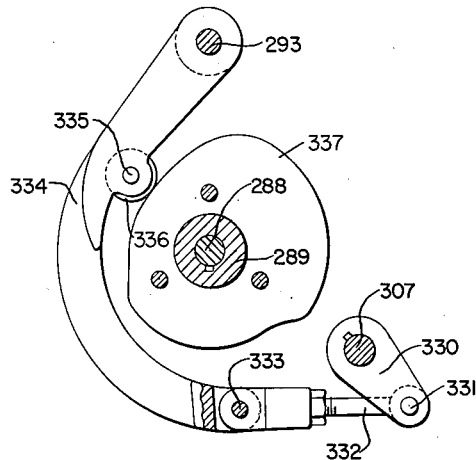
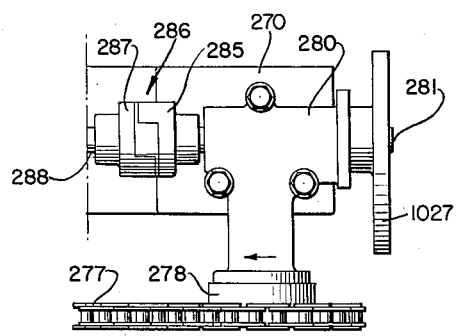
INVENTORS
LEO C. WILLIAMS
CLIFFORD P. ROUNSEFELL
BY Bauer and Seymour
ATTORNEYS

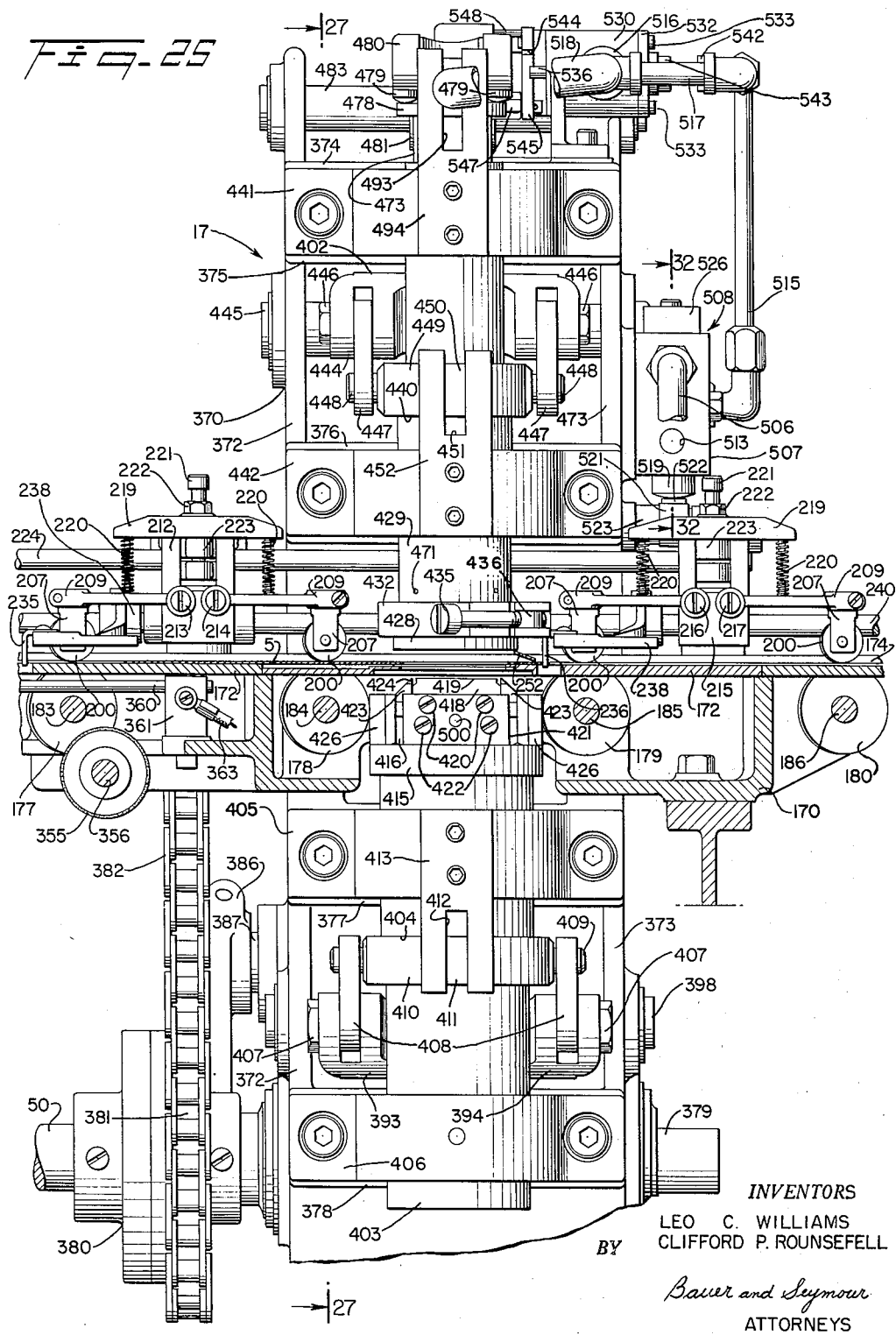

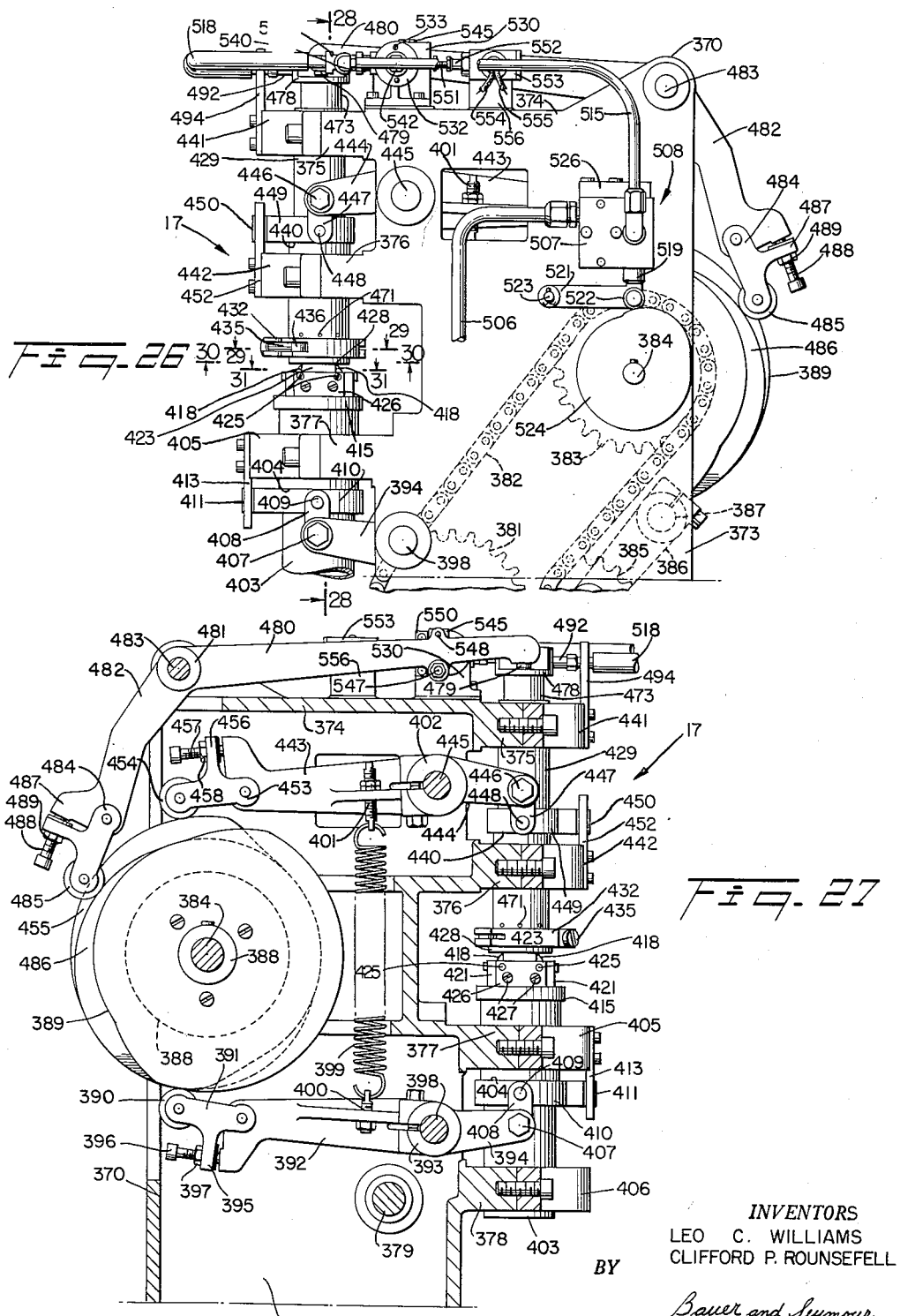

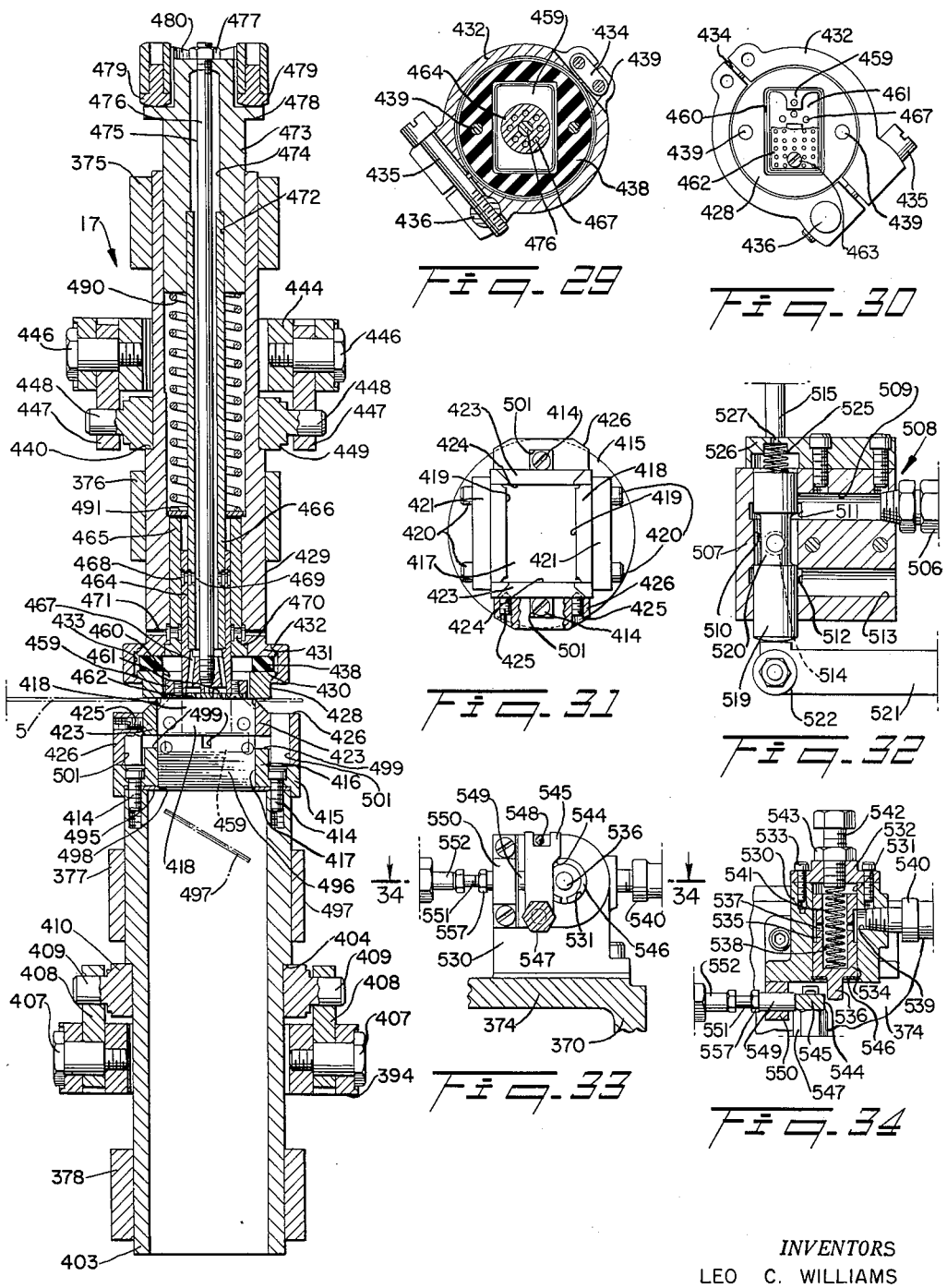

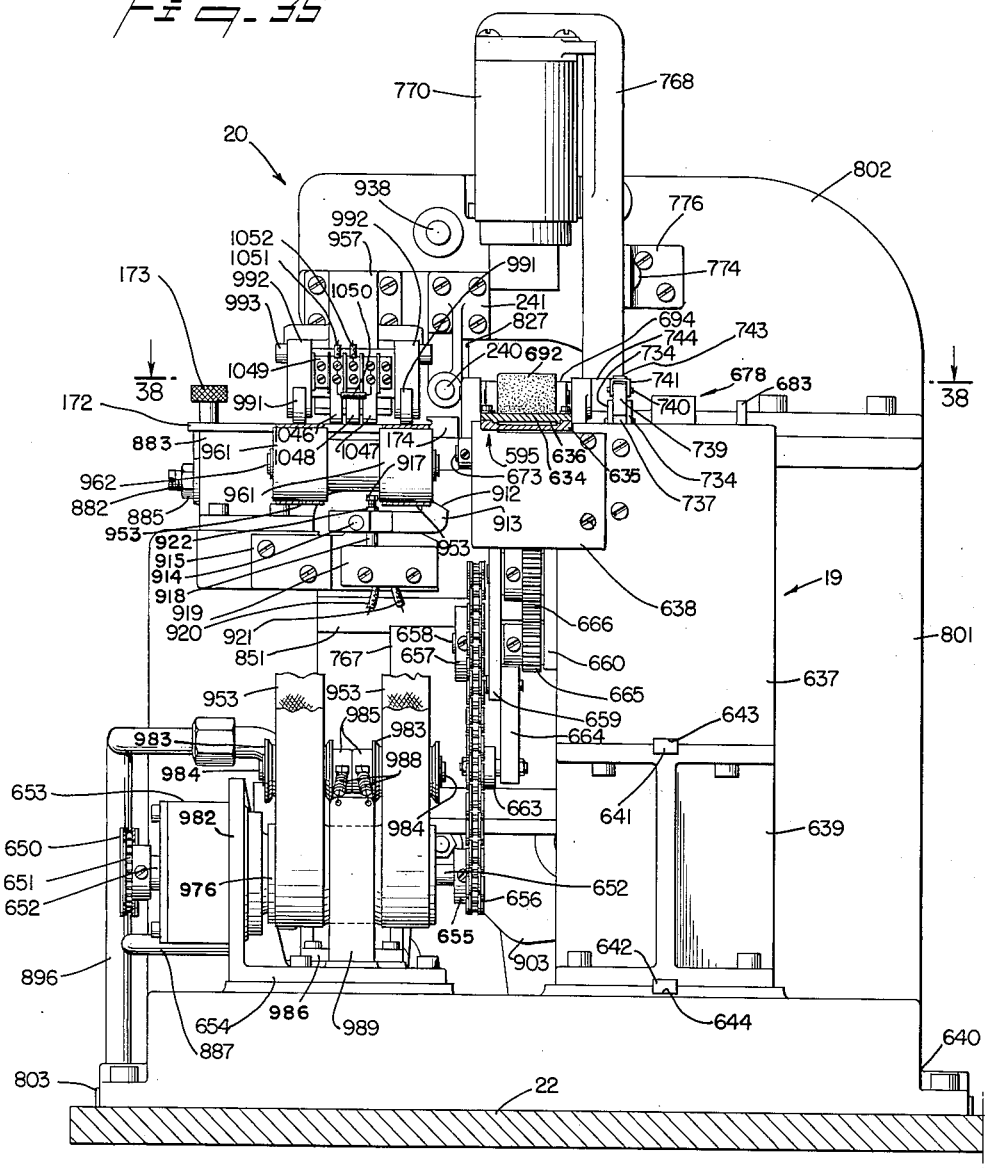

June 6, 1961 L. C. WILLIAMS ET AL 2,987,099
APPARATUS FOR MOUNTING FILMS AND OTHER INSERTS IN CARDS
Filed March 28, 1957 21 Sheets-Sheet 13
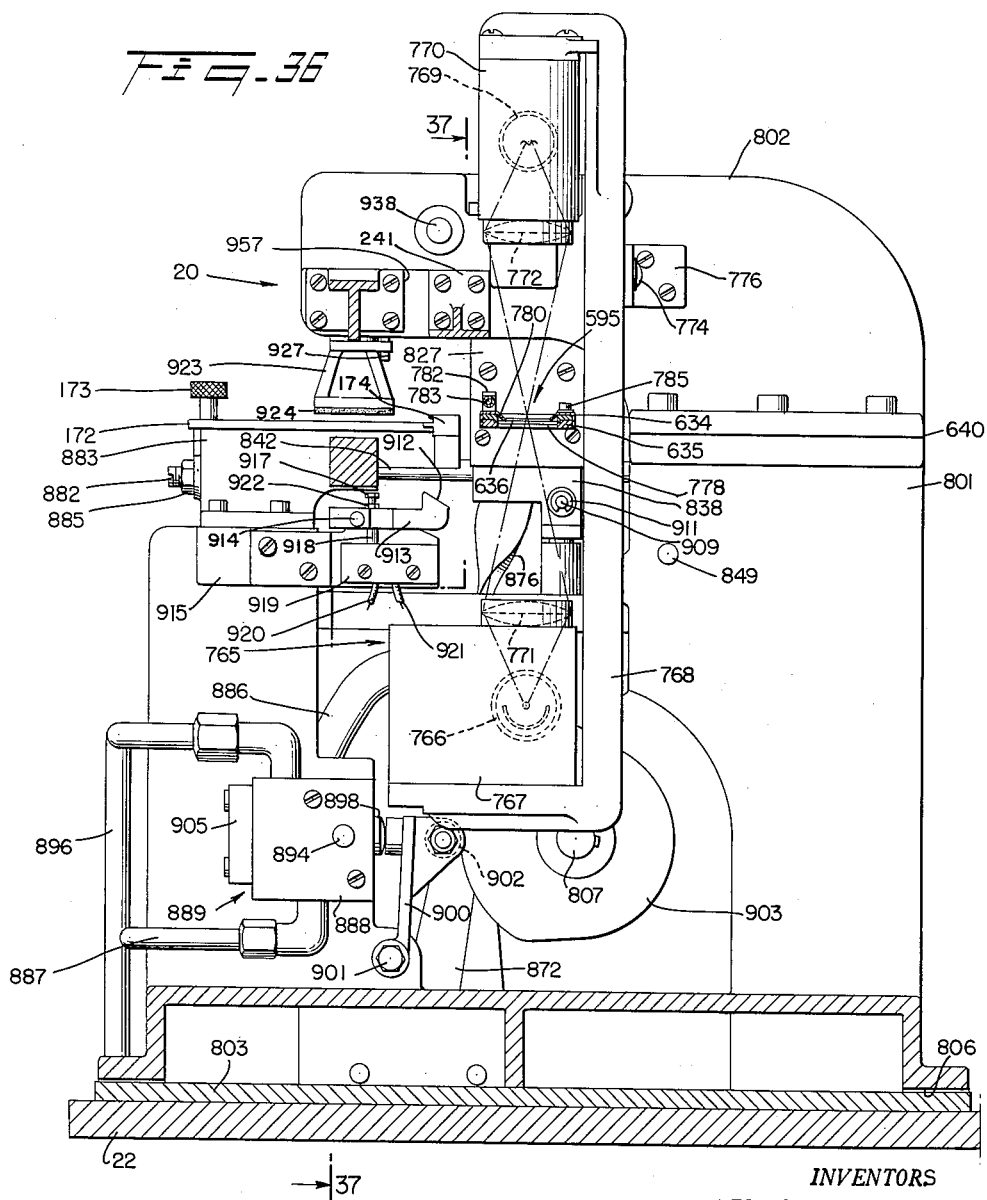
INVENTORS
LEO C. WILLIAMS
CLIFFORD P. ROUNSEFELL
BY
*Bauer and Seymour*
ATTORNEYS

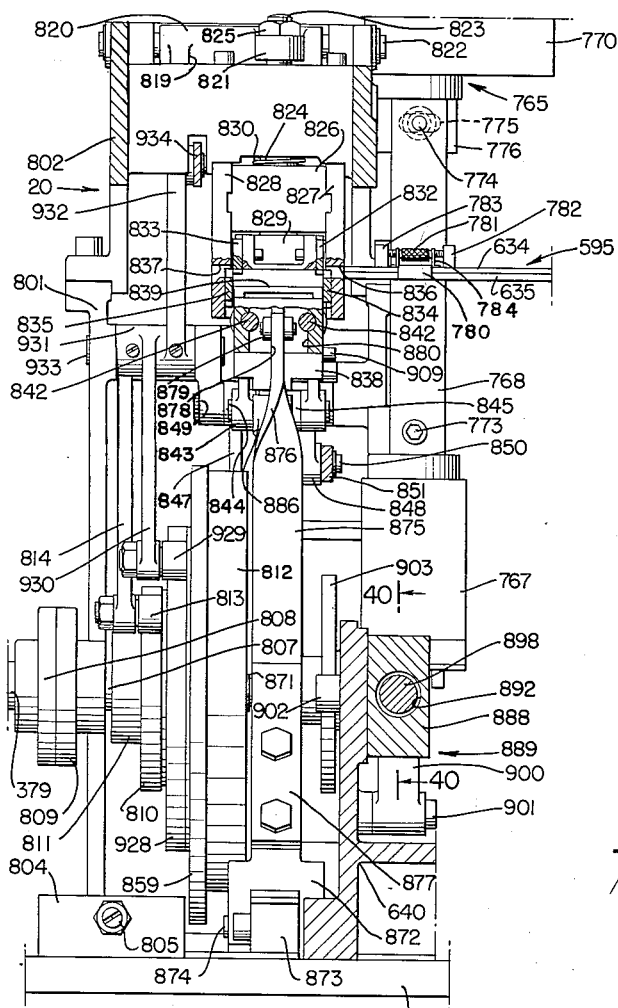
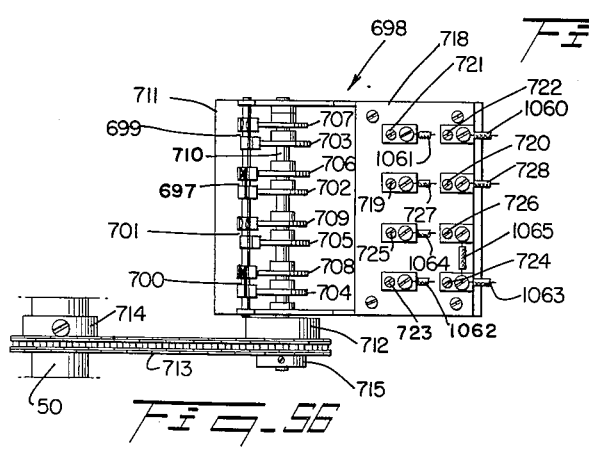

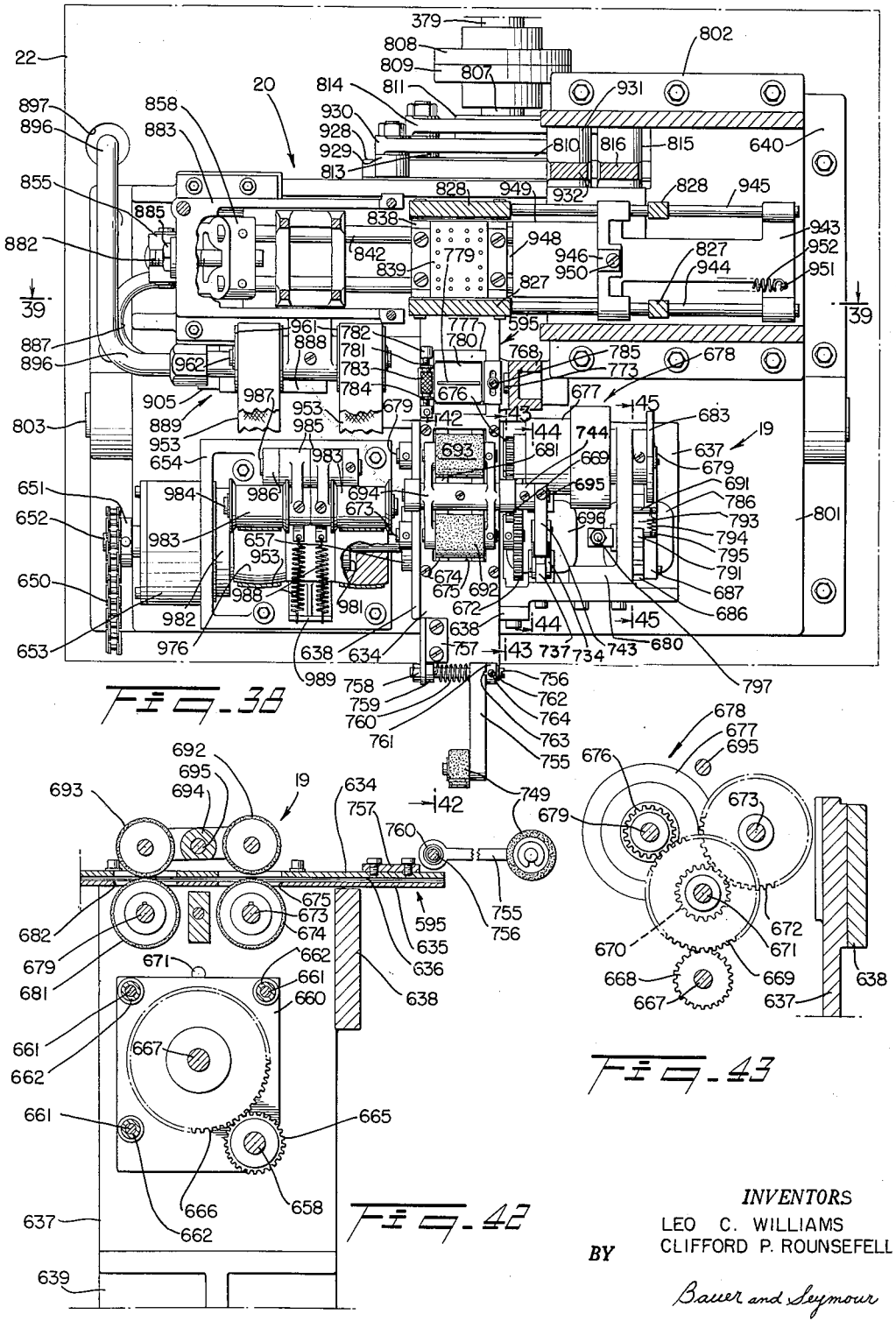

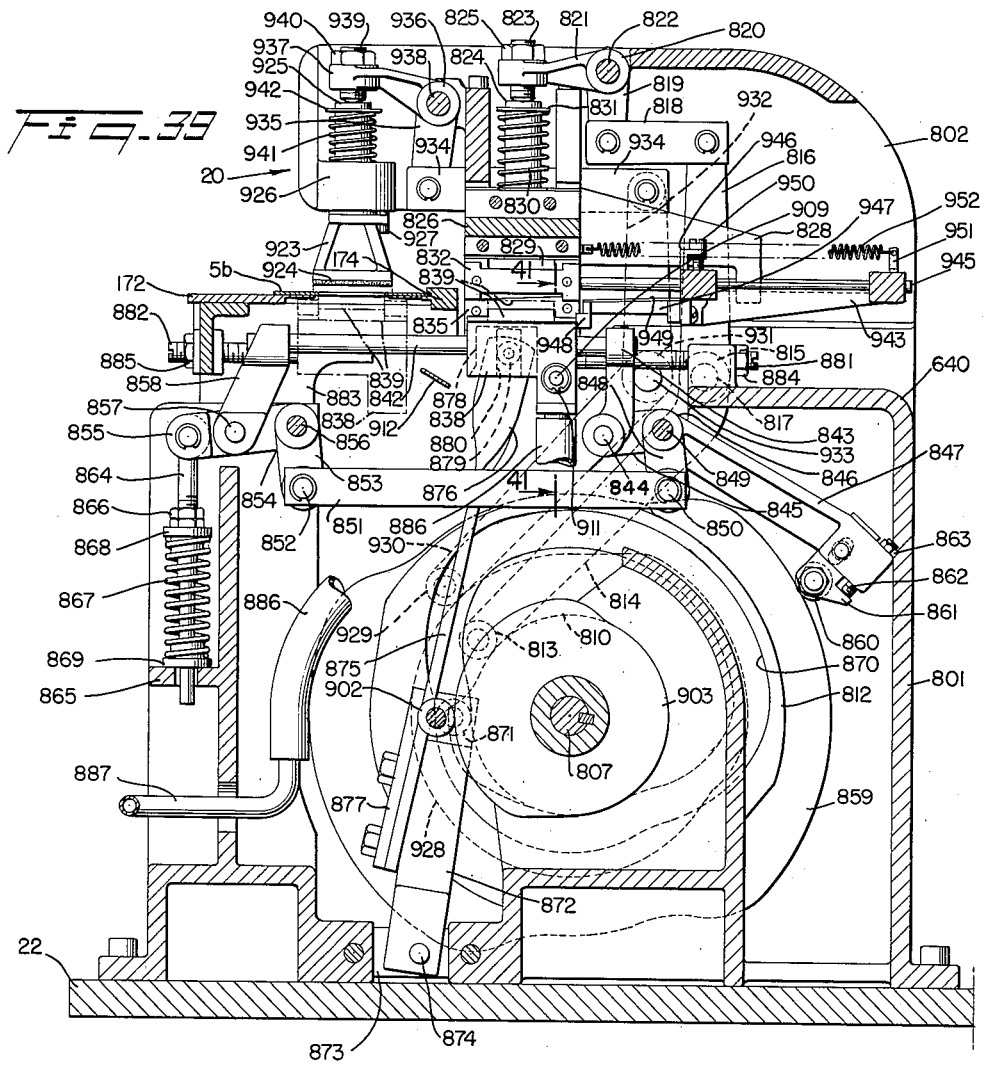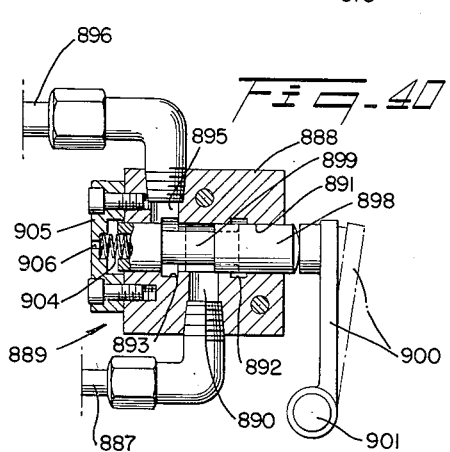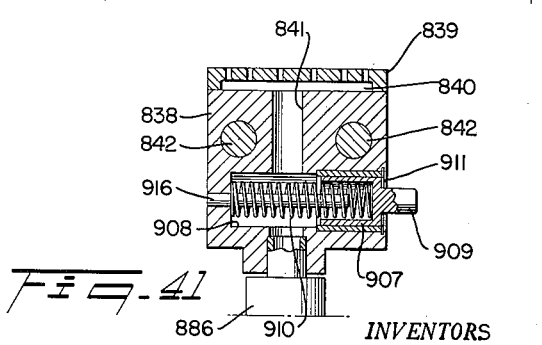

June 6, 1961   L. C. WILLIAMS ET AL   2,987,099
APPARATUS FOR MOUNTING FILMS AND OTHER INSERTS IN CARDS
Filed March 28, 1957   21 Sheets-Sheet 17
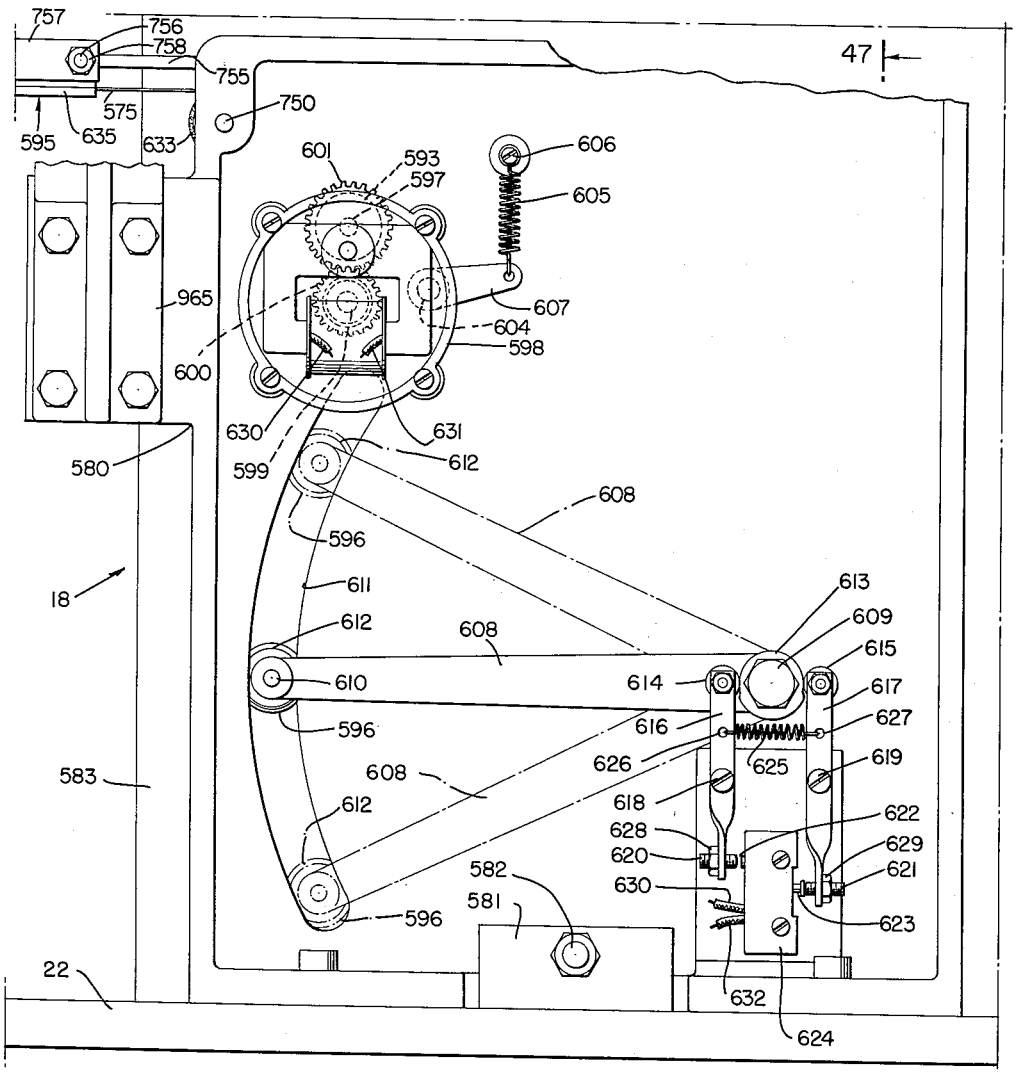
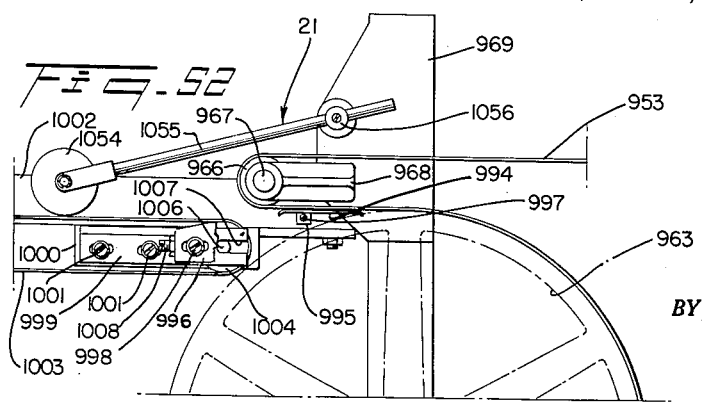
INVENTORS
LEO C. WILLIAMS
CLIFFORD P. ROUNSEFELL
BY
Bauer and Seymour
ATTORNEYS

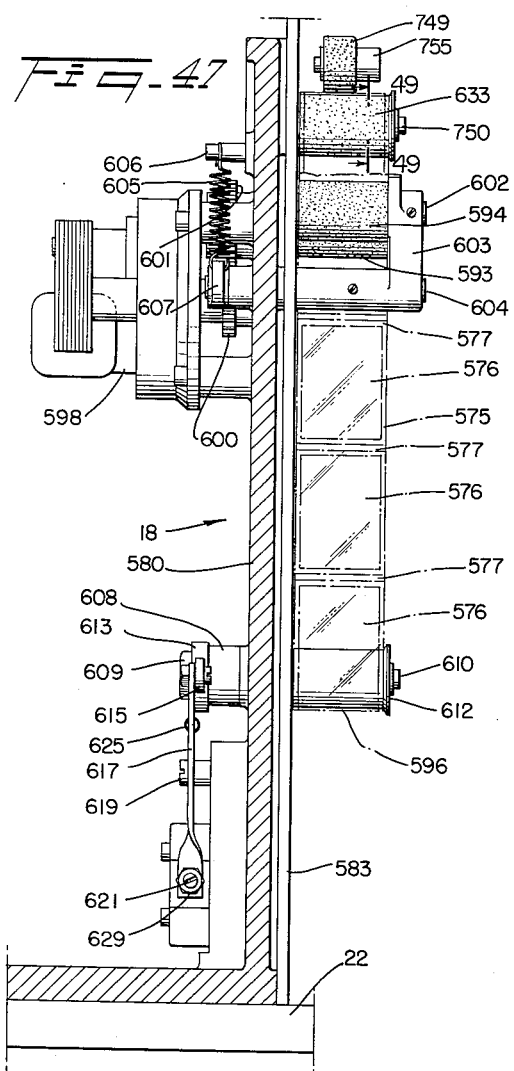
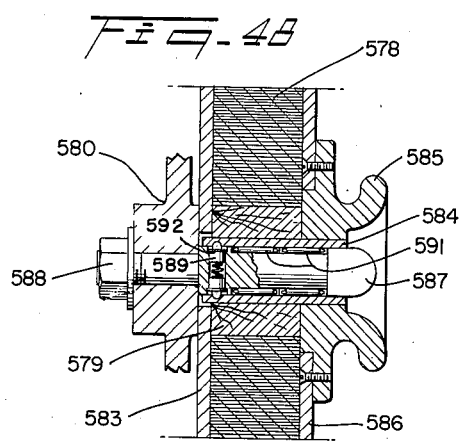
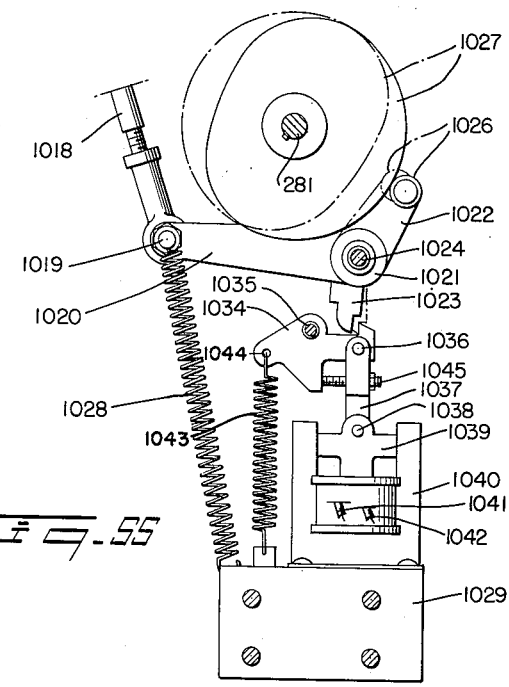
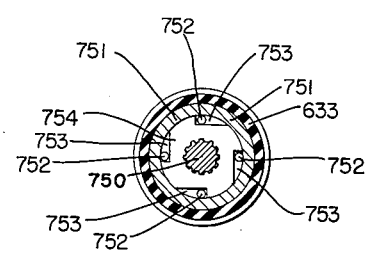
INVENTORS
LEO C. WILLIAMS
CLIFFORD P. ROUNSEFELL
BY Bauer and Seymour
ATTORNEYS

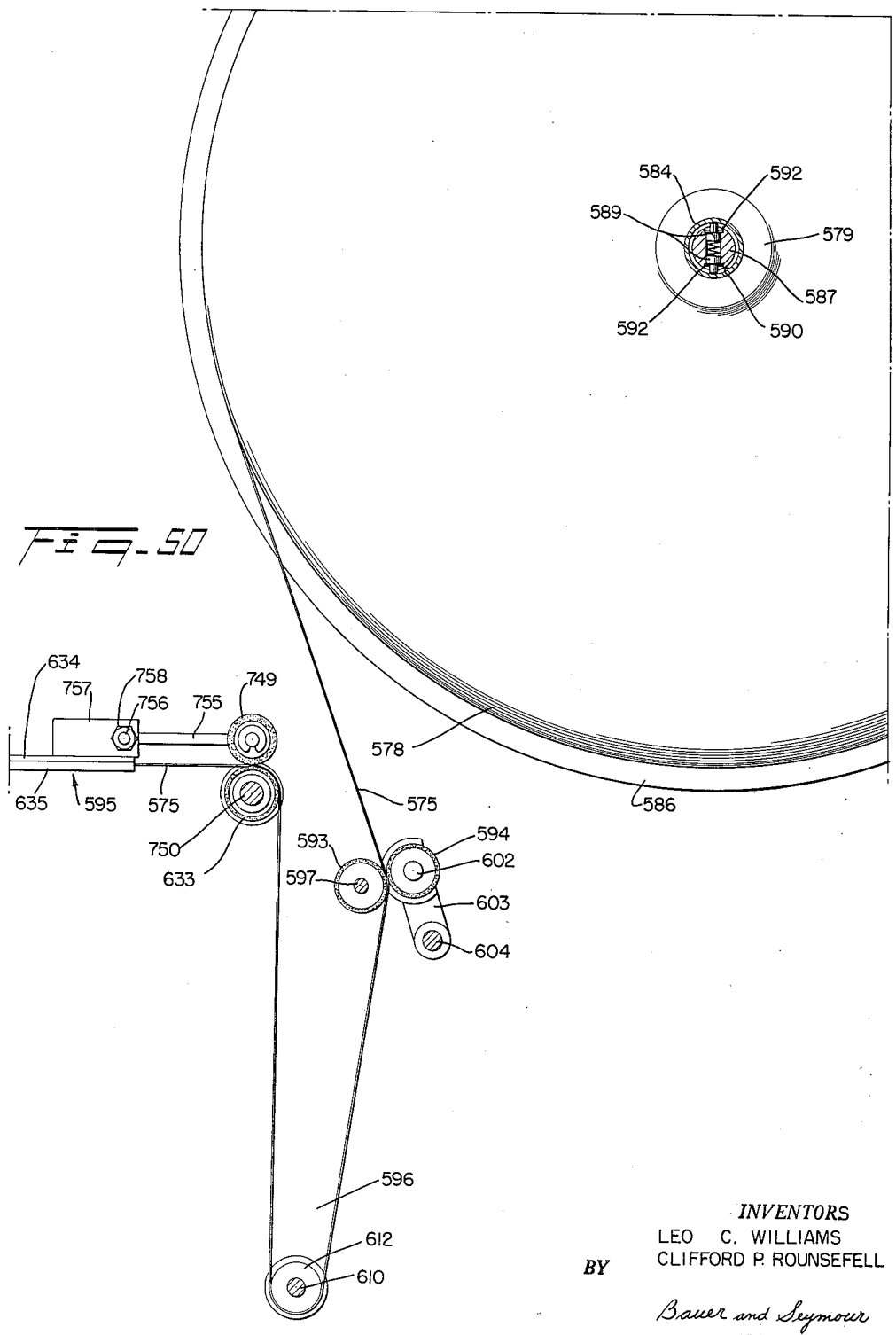

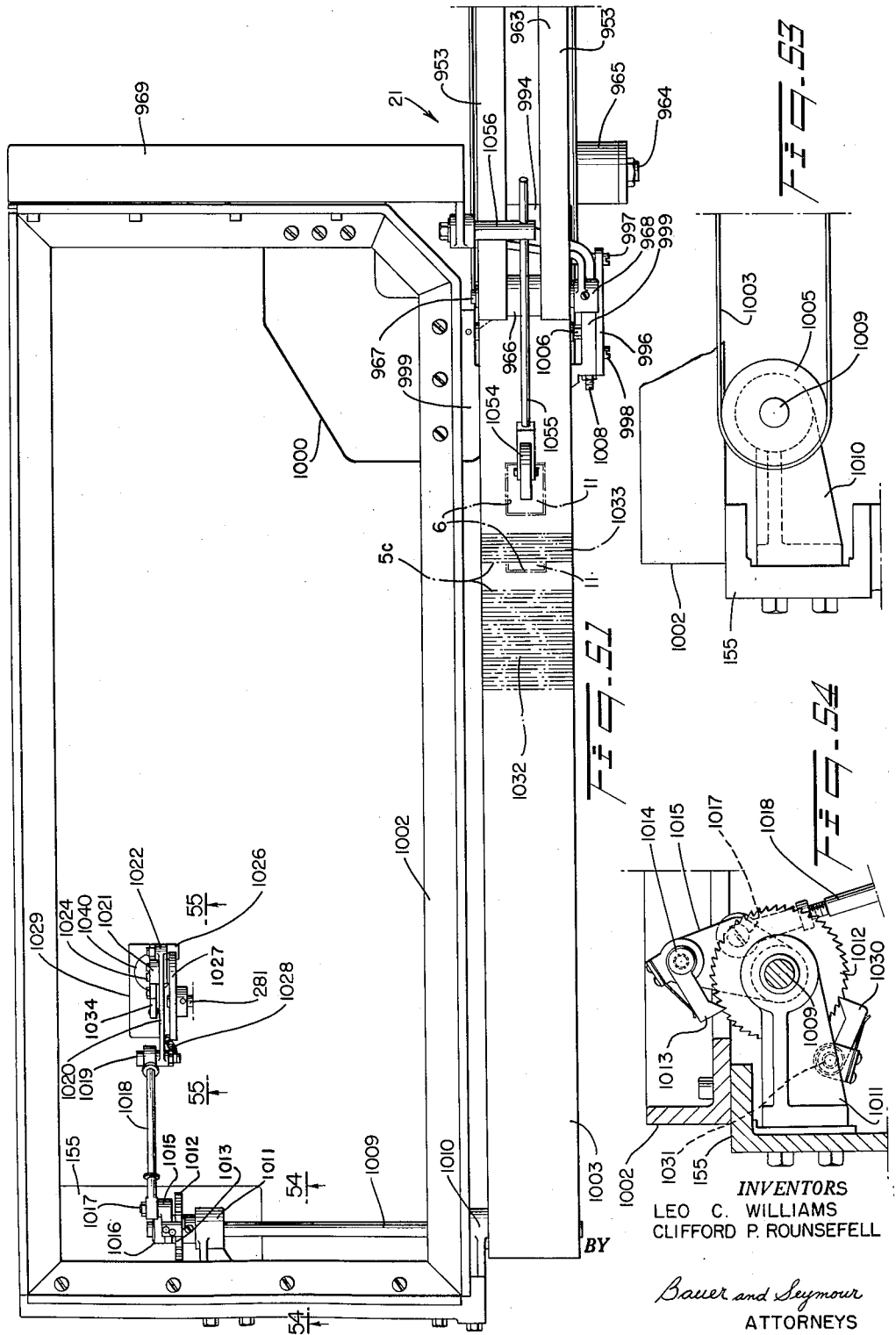

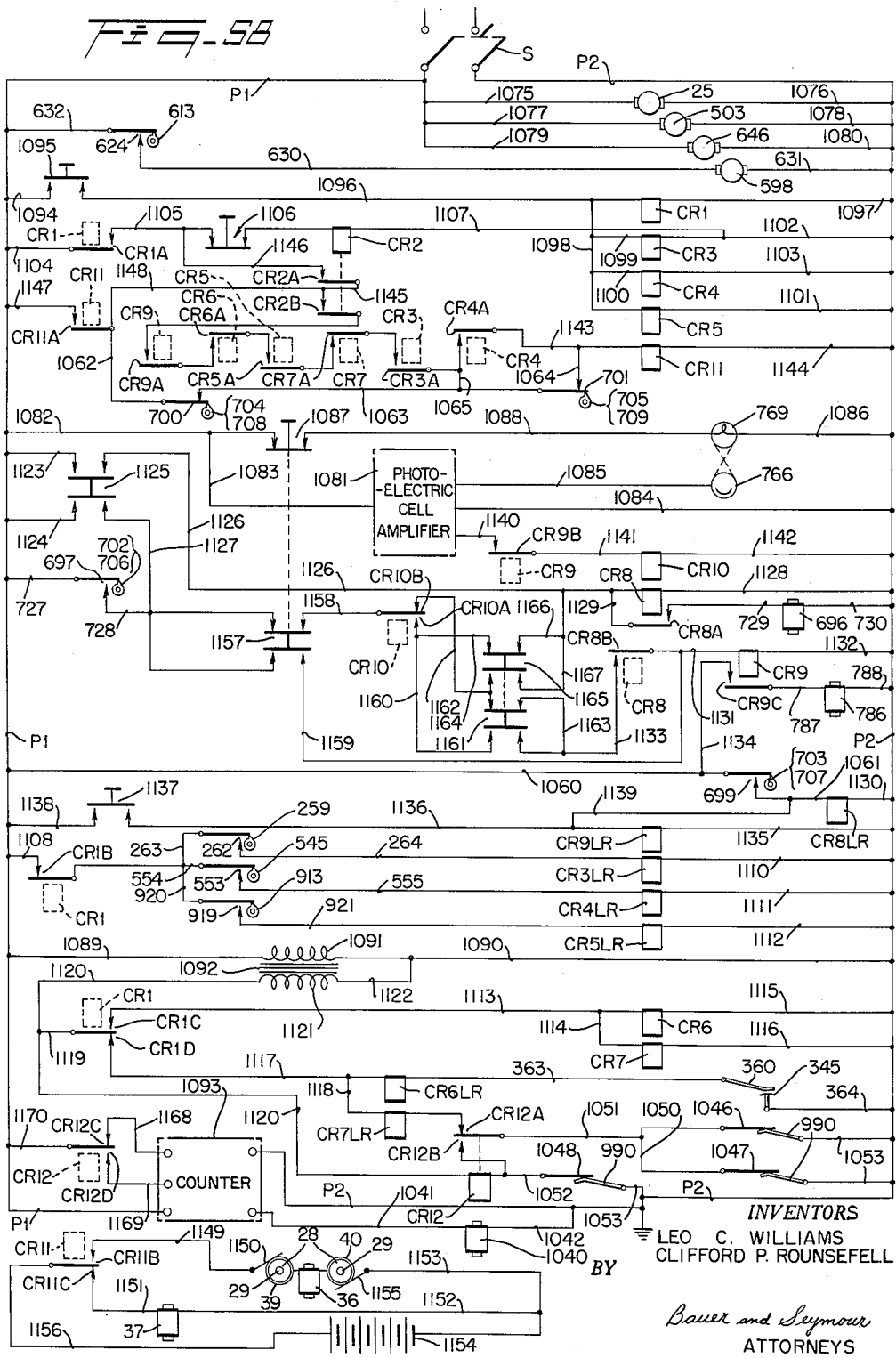

United States Patent Office 2,987,099
Patented June 6, 1961

2,987,099
APPARATUS FOR MOUNTING FILMS AND OTHER INSERTS IN CARDS
Leo C. Williams, Pearl River, N.Y., and Clifford P. Rounsefell, Hillsdale, N.J., assignors, by mesne assignments, to Minnesota Mining and Manufacturing Company, St. Paul, Minn., a corporation of Delaware
Filed Mar. 28, 1957, Ser. No. 649,159
39 Claims. (Cl. 154—1.6)

This invention relates to apparatus which is particularly intended and adapted to produce classification cards, and other cards, each having an image bearing frame of micro-film mounted in an aperture in the card and secured to an adhesive sheet carried by the card and extending over the aperture, whereby each card may advantageously contain a representative visible image or picture record of the data recorded or to be recorded, and each film frame may be conveniently filed, indexed, and classified as to subject matter.

One object of the present invention is to provide novel apparatus which is capable of performing operations on successive cards automatically, accurately and in a reliable manner preparatory to and for the purpose of mounting individual frames of micro-film or other like inserts in apertures in said cards, and of ultimately mounting such frames or inserts in the cards.

Another object of the invention is to provide novel apparatus wherein successive cards initially presented thereto in a semi-prepared condition for the mounting of individual frames of micro-film or other like inserts in apertures in said cards, are completely prepared for this purpose, and such frames or inserts are mounted therein in an accurate and reliable manner.

Another object is to provide apparatus of novel construction which will effectively remove a protective cover sheet from within an aperture in a card, form a central window opening in an adhesive sheet extending over said aperture, and apply a frame of micro-film or other like insert in said aperture and against said adhesive sheet.

Another object is to provide apparatus of the character above described having a plurality of mechanisms arranged along a common rectilinear path travelled by successive cards for performing operations on said cards and for mounting individual frames of micro-film or other like inserts therein, and wherein each mechanism is constructed and mounted as a separate unit so as to enable bench assembling of each mechanism and to facilitate assembling of the entire machine, as well as to enable unit removal of any mechanism for repairs or replacement purposes.

Another object is to provide apparatus of the character and for the purpose above described having automatic control means arranged in a novel manner to prevent operation of said apparatus and possible damage to the cards in the event an abnormal condition exists in the feeding of the cards, or in the performance of the preparing operations on the cards, or in the mounting of the film frames or other like inserts in the cards.

Still another object is to provide a novel mechanism for effectively removing an adhered sheet from a blank or panel, such as a card.

Another object is to provide a novel method of and mechanism for automatically stripping, by a peeling action, an adhered protective cover sheet from within an aperture in a card.

A further object is to provide a novel mechanism of the character and for the purpose above described, wherein the stripping of the cover sheet from the card is advantageously and positively effected by and through relative movements of said card and said mechanism.

Another object is to provide a cover sheet stripping mechanism as described above, having associated therewith in a novel manner automatic control means to cause a desired control function upon failure of said mechanism to strip the cover sheet from a card.

Another object is to provide in a die mechanism for die cutting a window opening in a sheet, novel control means for automatically effecting a control function in the event said mechanism fails to completely die cut from the sheet the portion thereof defining the die cut opening therein.

Still another object is to provide an independent motorized mechanism of novel construction for unwinding a supply roll of strip material, such as micro-film, and including operable means for forming the strip into a slack loop whereby feeding of said strip from said loop for subsequent operations thereon is facilitated without the load of said supply roll thereon, the operation of said mechanism and the unwinding of the strip from the supply roll being automatically controlled by said loop forming means in response to reduction of the loop to a given size as well as to enlargement of said loop to a given size.

Another object is to provide novel means for rotatably and removably supporting a relatively heavy and large diameter supply roll of micro-film and the like.

Another object is to provide a novel method of intermittently feeding to a cutting device an image bearing strip, such as micro-film, whereby individual sections severed from said strip by said cutting device each will contain a full image with the latter properly centered thereon.

A further object is to provide a novel mechanism for feeding an image bearing strip, such as micro-film, to knife means for severing said strip into individual sections each of a predetermined length and containing a full image, wherein the strip is advanced first a short distance at slow speed so as to enable accurate scanning of the strip by a photo-electric cell and detection by the latter of a narrow line space between adjacent images, and then a further distance at a faster speed so as to quickly and accurately present the strip to said knife means with the center of said narrow line space substantially in registry therewith.

Another object is to provide a novel mechanism for successively receiving individual sections of strip material, such as image bearing frames of micro-film, at one locality, transferring the same from said locality to another locality, and mounting each section at said latter locality in an aperture in a card and against an adhesive sheet on said card.

Yet another object is to provide in a machine for handling blanks, such as cards, improved delivering and stacking mechanism wherein the processed blanks received successively thereby are turned over end-for-end and stacked in overlapped fanned-out relation and in separated batches of a predetermined number.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a general assembly view in side elevation of a card preparing and film mounting machine constructed in accordance with and embodying the principles of the present invention, the supporting base of said machine being only partly shown and having a portion thereof broken away for purposes of clearer illustration;

FIG. 2 is a detail face view of one form of card as initially prepared and presented to the machine for use therein, the film mounting sheet on said card having a portion thereof broken away for purposes of clearer illustration;

FIG. 3 is a fragmentary vertical sectional view of said card, said view being on an exaggerated scale and being taken on the line 3—3 of FIG. 2;

FIG. 4 illustrates in three fragmentary face views (a), (b) and (c), the card as it appears in its first (a) and second (b) stages of preparation thereof, and in its third and final stage (c) or completed form with a film frame mounted therein, the film mounting sheet on the card in certain of said views having a portion thereof broken away for purposes of clearer illustration;

Figure 10:
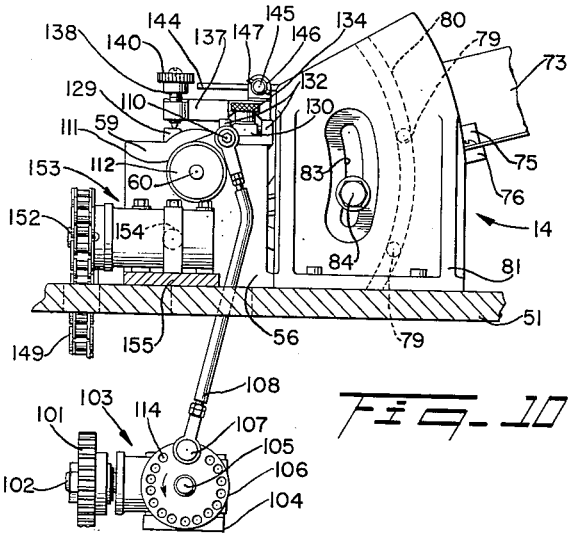

FIG. 7 is a fragmentary top plan view, partly in section, taken substantially from the position indicated by the line 7—7 of FIG. 1, said view showing, on an enlarged scale, a card feeder, and part of a card receiving and advancing conveyor, including a plural card detecting mechanism, the cover sheet stripping mechanism and other parts of the machine, as well as the plates for supporting the cards during movement along said conveyor portion, being omitted for purposes of clearer illustration;

FIG. 8 is a vertical sectional view of the structure shown in FIG. 7, including the card supporting plates, said view being taken substantially on the line 8—8 of FIG. 7;

FIG. 9 is a further enlarged fragmentary vertical sectional view on the line 9—9 of FIG. 7, with portions of certain of the parts broken away for purposes of clearer illustration;

FIG. 10 is an enlarged detail elevational view, partly in section, of the card feeder and the driving and operating means therefor as seen from the far side of the machine as shown in FIG. 1;

FIG. 11 is a further enlarged fragmentary vertical sectional view on the line 11—11 of FIG. 7;

FIG. 12 is a further enlarged fragmentary vertical sectional view on the line 12—12 of FIG. 7;

FIG. 13 is an enlarged vertical sectional view of the remaining portion of the card conveyor, including control means and part of a card delivering and stacking unit, said view and that of FIG. 8 being complementary views;

FIG. 14 is an end elevational view of the card conveyor and control means looking from the right of FIG. 13, with the belts and other parts of the card delivering and stacking unit omitted for purposes of clearer illustration;

FIG. 15 is an enlarged detail elevational view, partly in section, of the cover sheet stripping unit as seen approximately from the position indicated by the line 15—15 of FIG. 1, certain of the card conveyor parts being omitted and one of the parts of said unit having a portion thereof broken away for purposes of clearer illustration;

FIG. 16 is an elevational view, partly in section, of said cover sheet stripping unit looking from the left of FIG. 15, including an associated sweep roller device, a card stop and the cover sheet detecting device, the card conveyor structure having portions thereof broken away for purposes of clearer illustration;

FIG. 17 is an enlarged fragmentary vertical sectional view taken substantially on the irregular line 17—17 of FIG. 15;

FIG. 18 is a detail top plan view of the cover sheet gripping mechanism shown in FIG. 17;

FIG. 19 is a fragmentary vertical sectional view taken substantially on the line 19—19 of FIG. 15;

FIG. 20 is a fragmentary vertical sectional view taken substantially on the irregular line 20—20 of FIG. 15, the cam lever having a portion thereof broken away for purposes of clearer illustration;

FIG. 21 is a fragmentary vertical sectional view taken substantially on the irregular line 21—21 of FIG. 15, the cam lever having a portion thereof broken away for purposes of clearer illustration;

FIG. 22 is a detail top plan view of the driving means for the cover sheet stripping unit;

FIG. 23 is a fragmentary elevational view, partly in section and on an enlarged scale, showing the parts of the cover sheet stripping unit in their respective operative positions and said unit in the process of stripping a cover sheet from a card;

FIG. 24 is an enlarged detail elevational view, partly in section, showing the operation of the cover sheet stripping and deflecting pin elements;

FIG. 25 is an enlarged detail elevational view, partly in section, of the die unit for dieing-out a window opening in the film mounting sheet on the card, as seen from the near side of the machine as shown in FIG. 1, the die and cooperating die block of said unit being shown in their normal retracted inoperative positions;

FIG. 26 is a fragmentary elevational view, on a reduced scale, of said die unit as seen from the right of FIG. 25 and approximately from the position indicated by the line 26—26 of FIG. 1, the die and cooperating die block of said unit being shown in their actuated sheet cutting positions, and the card conveyor structure being omitted for purposes of clearer illustration;

FIG. 27 is a vertical sectional view, on a reduced scale, of said die unit taken substantially on the line 27—27 of FIG. 25, but showing the die and cooperating die block in their actuated sheet cutting positions, the card conveyor structure being omitted for purposes of clearer illustration;

FIG. 28 is an enlarged vertical sectional view on the line 28—28 of FIG. 26;

FIG. 29 is an enlarged horizontal sectional view on the line 29—29 of Fig. 26;

FIG. 30 is an enlarged detail bottom plan view of the die block assembly as seen from the position indicated by the line 30—30 of FIG. 26, with one of the parts having a portion thereof broken away for purposes of clearer illustration;

FIG. 31 is an enlarged detail top plan view of the die assembly as seen from the position indicated by the line 31—31 of FIG. 26, with one of the parts having a portion thereof broken away for purposes of clearer illustration;

FIG. 32 is a vertical sectional view of the vacuum valve shown in FIGS. 25 and 26, said view being taken on the line 32—32 of FIG. 25;

FIG. 33 is a detail elevational view, partly in section, of a control device as seen from the position indicated by the line 33—33 of FIG. 25;

FIG. 34 is a horizontal sectional view on the line 34—34 of FIG. 33;

FIG. 35 is an enlarged detail elevational view, partly in section, of the film feeding, registering, cutting, transferring and mounting unit as seen approximately from the position indicated by the line 35—35 of FIG. 1;

FIG. 36 is an elevational view, partly in section, similar to FIG. 35, but with the film feeding mechanism and driving means therefor omitted and other parts broken away for purposes of clearer illustration;

FIG. 37 is a fragmentary vertical sectional view taken approximately on the irregular line 37—37 of FIG. 36, with parts omitted and portions of certain parts broken away for purposes of clearer illustration;

FIG. 38 is a horizontal sectional view taken approximately on the line 38—38 of FIG. 35, with parts omitted and portions of certain parts broken away for purposes of clearer illustration;

FIG. 39 is a vertical sectional view of said film feeding, registering, cutting, transferring and mounting unit taken approximately on the line 39—39 of FIG. 38;

FIG. 40 is an enlarged vertical sectional view of the vacuum valve shown in FIGS. 36 and 37, said view being taken on the line 40—40 of FIG. 37, and one of the parts having a portion thereof broken away for purposes of clearer illustration;

FIG. 41 is an enlarged vertical sectional view of the film transferring and mounting shuttle shown in FIGS. 36 to 39, inclusive, said view being taken on the line 41—41 of FIG. 39;

FIG. 42 is an enlarged fragmentary vertical sectional view on the line 42—42 of FIG. 38;

FIG. 43 is an enlarged fragmentary vertical sectional view taken on the line 43—43 of FIG. 38;

FIG. 44 is an enlarged fragmentary vertical sectional view taken on the line 44—44 of FIG. 38;

FIG. 45 is an enlarged fragmentary vertical sectional view taken on the line 45—45 of FIG. 38;

FIG. 46 is an enlarged detail elevational view of the film unwinding unit as seen from the near side of the machine as shown in FIG. 1;

FIG. 47 is a vertical sectional view taken approximately on the line 47—47 of FIG. 46;

FIG. 48 is an enlarged fragmentary vertical sectional view of the film supply reel supporting and retaining device;

FIG. 49 is a further enlarged vertical sectional view of the film guiding roller taken approximately on the line 49—49 of FIG. 47;

FIG. 50 is a detail elevational view, partly in section, of parts of the film unwinding unit, including the film supply reel, showing the path of travel of the film from said reel to the film feeding, registering, cutting, transferring and mounting unit;

FIG. 51 is an enlarged detail top plan view of the card delivering and stacking unit shown in FIG. 1;

FIG. 52 is a fragmentary elevational view of the right-hand portion of the structure shown in FIG. 51, one of the parts having a portion thereof broken away for purposes of clearer illustration;

FIG. 53 is a fragmentary elevational view, on a still further enlarged scale, of the left-hand portion of the structure shown in FIG. 51;

FIG. 54 is a fragmentary vertical sectional view, on a further enlarged scale, taken approximately on the line 54—54 of FIG. 51, showing the pawl and rachet mechanism for operating the card stacking conveyor;

FIG. 55 is a detail elevational view, partly in section, and on a further enlarged scale, of the mechanism for operating and controlling the operation of said pawl and ratchet mechanism, said view being taken approximately from the position indicated by the line 55—55 of FIG. 51;

FIG. 56 is a detail top plan view, on an enlarged scale, of the electrical timing device shown in FIG. 1;

FIG. 57 is a detail elevational view on a further enlarged scale, looking from the right of FIG. 56, showing the driving connection for said timing device, certain of the parts having portions thereof broken away for purposes of clearer illustration; and FIG. 58 is a schematic diagrammatic representation of an electric wiring circuit for the operation and control of the machine.

The apparatus constructed in accordance with the present invention and chosen for the purpose of illustration is particularly adapted for mounting individual image bearing frames of micro-film in cards of the type commonly employed in connection with statistical, tabulating and record card sorting systems and machines, and for preparing such cards for this purpose. Mounting of film frames in cards of this character advantageously provides such cards with a picture record of the data recorded or to be recorded thereon, and facilitates classifying and sorting of the film frames, as well as filing and indexing thereof, as to subject matter. It is to be understood that the invention is not so limited and that the principles herein described are applicable to the preparation of a variety of different cards and to the mounting of a variety of different inserts in the cards for the described and other purposes.

There is shown in FIGS. 2 and 3, one card, indicated at 5, of the known statistical or tabulating machine type, which is capable of being handled in the machine of the illustrated embodiment and for which said machine has been primarily designed. This card 5 is oblong in shape and is formed of single ply cardboard or heavy relatively stiff paper material, and as shown, has been pre-prepared for the mounting of a frame of micro-film or other insert of like size therein. The cards 5, as presented to the machine, are each in the form shown in FIGS. 2 and 3, and as shown in said figures, each card 5 contains a generally rectangular aperture 6 extending therethrough and of an appropriate size to receive a frame of micro-film or other insert of equivalent size therein. The aperture 6 is located centrally between the upper and lower longitudinal edges of the card 5, and inwardly a selected distance from one side edge of said card, and said aperture is made of such width or vertical dimension that it will accurately receive the uncut longitudinal edges of the film frame or other insert. Adhesively secured to one face of the card 5 and covering the entire aperture 6 is a very thin generally rectangular sheet 7 of transparent material which is coated on the inner surface thereof with a layer of pressure sensitive adhesive. To eliminate projecting edges and to avoid increasing the thickness of the card 5, the sheet 7 is preferably embedded in the face of the card so that the outer face of said sheet lies flush with the adjacent face of the card. The sheet 7 is utilized to retain the film frame or other insert in the aperture 6 in the card 5 and to firmly hold said film frame or insert when the same is inserted into said aperture and pressed against said sheet as hereinafter described. Disposed within the aperture 6 and removably adhering to the sheet 7, is a very thin temporary cover sheet 9 of readily removable material, such as glassine paper, said cover sheet serving to protect the adhesive on sheet 7 during all handling of the card prior to loading of a supply of said cards in the machine.

For purposes to be hereinafter described, the sheet 7 on the cards 5 as presented to the machine, is provided with four small holes 8 which are located inwardly from the four corners of the card aperture 6 alike short distances on diagonal lines extending across said corners. It will be apparent that any card which has been pre-prepared as above described and which is of the same or substantially the same width or vertical dimension as that of the described card 5 may be handled in the machine of the illustrated embodiment.

In the embodiment of the invention herein disclosed, the machine, as shown in FIG. 1, includes the following:

(1) A supporting base indicated generally at 12 which is adapted to support various mechanisms of the machine, including a suitable driving mechanism indicated generally at 13;

(2) A card feeder indicated generally at 14 for feeding the cards 5 one after another in timed relation from a supply stack of said cards;

(3) A card conveyor indicated generally at 15 for conveying the cards 5 one after another in spaced relation along a horizontal rectilinear path;

(4) A cover sheet stripping mechanism indicated generally at 16 for removing the cover sheet 9 from the card 5, the card as it appears at this stage being shown in FIG. 4(a);

(5) A die mechanism indicated generally at 17 for dieing-out the central portion or section of the adhesive sheet 7 on the card 5 so as to form a window opening in said sheet of corresponding shape to the card aperture 6 but of smaller dimensions and lying within the area of said aperture, leaving a margin of exposed adhesive extending around the aperture, the card as it appears at this stage being shown in FIG. 4(b) and the said window opening being indicated at 10;

(6) A mechanism indicated generally at 18 for unwinding a supply roll of micro-film or other insert strip;

(7) A feeding mechanism indicated generally at 19 for feeding the film or other insert strip to and in registry with strip severing means;

(8) A cutting, transferring and applying mechanism indicated generally at 20 for severing the film or other insert strip into individual frames or sections, transferring each severed frame or section to card mounting position and applying it in the aperture 6 in the card 5 and against the adhesive sheet 7 on said card, the card as it appears at this final stage with mounted insert being shown in FIG. 4(c) and the mounted insert being a frame of micro-film and indicated at 11; and (9) A card delivering and stacking mechanism indicated generally at 21 for receiving the finished cards, turning them over end-for-end, and stacking the same in overlapping fanned-out relation and in separated batches of a predetermined number.

In the following more detailed description of the various mechanisms, each mechanism will for the sake of convenience be separately described. It is to be understood, however, that the mechanisms are substantially simultaneously operated so that during each cycle of operation of the machine, each mechanism will perform its operations at the same or practically the same time on a different card, and the cards will be simultaneously advanced from one to the other of said mechanisms, the finished card from the last mechanism to the delivery and stacking mechanism, and a new card from the card feeder to the first mechanism. The above itemized instrumentalities will be described in the order named, and they are preferably constructed, mounted, and operated as follows.

SUPPORTING BASE AND MAIN DRIVING MECHANISM

Figure 5:
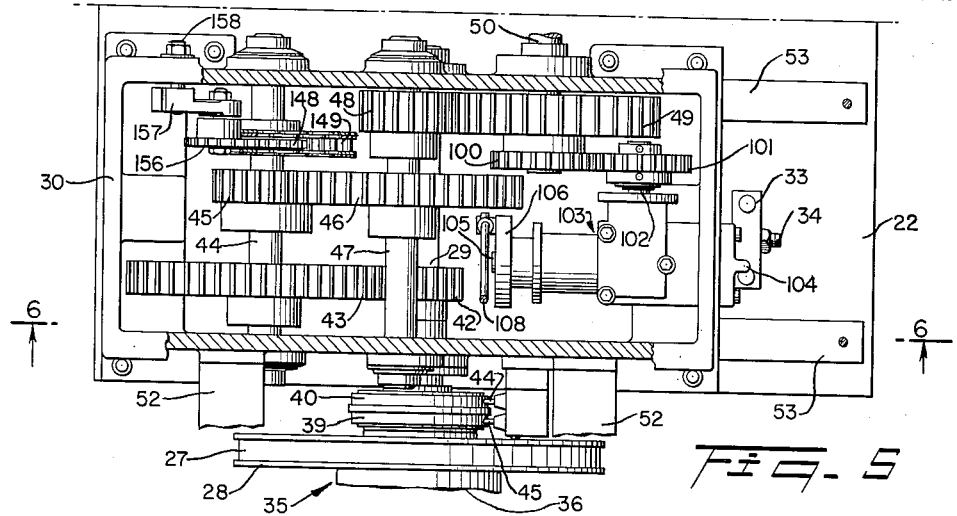
FIG. 5 is an enlarged detail top plan view of the gear box assembly shown in FIG. 1 at the left-hand side thereof, the cover plate normally closing the gear box at the top thereof being removed and portions of said gear box being broken away for purposes of clearer illustration.
Figure 6:
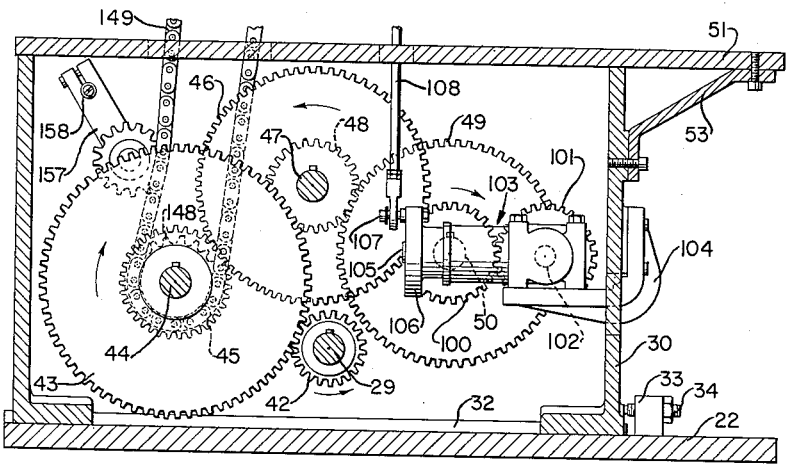
FIG. 6 is a vertical sectional view of said gear box assembly including said cover plate, said view being taken substantially on the line 6—6 of FIG. 5.

FIGS. 1, 5 and 6

The supporting base 12 rests on the machine foundation and comprises a generally rectangular horizontal plate or platform 22, a pair of longitudinally extending bars 23 located at opposite sides of said plate, and two transversely extending standards 24 located at opposite ends of said plate, said plate and said bars being bolted or otherwise suitably secured to said standards, and said plate being also bolted or otherwise suitably secured to said bars. The movable parts of the mechanisms 16, 17, and 20, together with the card feeder 14 and conveyor 15, are all preferably driven by the driving mechanism 13 which includes an electric motor 25. The motor 25 is carried by the supporting base 12 beneath the platform 22, and is preferably mounted on said base in a suitable manner for pivotal up and down movement for a purpose to be presently described. The motor 25 which is of the single phase type is supplied with electrical current from a suitable source and is controlled for starting and stopping purposes by a suitable manually operated switch which will be later explained in connection with the description of the electrical control circuit illustrated in FIG. 58, for the machine.

Fixed on the armature shaft of the motor 25 is a pulley 26 which is preferably of the well-known variable diameter or speed type whereby the speed of operation of the machine may be regulated, as desired, through raising or lowering of said motor. Passing around and driven by the pulley 26 is a belt 27 which also passes around and drives a larger diameter pulley 28. This pulley 28 is loosely mounted on a short shaft 29 which extends longitudinally of the machine and is journalled in suitable bearings provided in the opposed walls of a gear box 30 and in a bracket 31 which is located outwardly of and spaced from said gear box. The pulley 28 is thus driven continuously by the motor 25 when the latter is started. The bracket 31 is bolted or otherwise suitably secured to the adjacent standard 24 of the base 12, and the gear box 30 is mounted on and bolted to the platform 22 of said base. To facilitate locating of the gear box 30 in proper longitudinal and lateral positions in the machine, the platform 22 has secured to the upper surface thereof an elongated transversely extending key 32 and a stop block 33 disposed at right angles to said key and having threaded therein an adjustable stop bolt 34. The gear box 30 is provided in the bottom surface thereof with a corresponding keyway to receive therein the key 32, and when so engaged, the gear box is moved along said key and the platform 22 until it contacts the stop bolt 34, thus easily locating the gear box in proper longitudinal position by means of the key 32 and in proper lateral position by means of the stop bolt 34. Following this, the gear box 30 is immovably bolted to the platform 22.

The shaft 29 is driven by the pulley 28 through a conventional magnetic clutch and brake unit indicated generally at 35, said unit including an annular driving magnet 36 which freely surrounds said shaft and is bolted or otherwise suitably secured to said pulley, an annular braking magnet 37 which freely surrounds the shaft and is bolted or otherwise suitably secured to the bracket 31, and an annular clutch disc 38 of magnetic material which is disposed between the magnets 36 and 37 and is engaged over and drivably keyed to said shaft, said key connection providing for limited axial movement of said clutch disc on said shaft toward and away from said driving and braking magnets. Surrounding and suitably fixed to the hub of the pulley 28 and insulated therefrom is a pair of slip rings 39 and 40 for conducting electrical current to the driving magnet 36. It will thus be apparent that, as hereinafter explained in the description of the electrical control circuit, when the driving magnet 36 is energized the shaft 29 will be rotated through magnetic engagement of the clutch disc 38 with said driving magnet, and that when the braking magnet 37 is energized the shaft 29 will be stopped and held against further rotation through magnetic engagement of said clutch disc with said braking magnet. There is provided a handle 41 by means of which the shaft 29 and the various mechanisms connected therewith may be turned or operated manually, when desired, said handle being ordinarily removed from the shaft, and when used it is engaged over the outwardly projecting end of said shaft and is connected thereto in a suitable manner.

Disposed within the gear box 30 and keyed to the shaft 29 is a spur pinion 42 which meshes with and drives a spur gear 43 that is keyed to a short shaft 44 journaled at its opposite ends in suitable bearings in said gear box. Also keyed to the shaft 44 is a spur pinion 45 which meshes with and drives an idler spur gear 46 that is keyed to a short shaft 47 journalled at its opposite ends in suitable bearings in the gear box 30. Also keyed to the idler shaft 47 is a spur pinion 48 which meshes with and drives a spur gear 49 that is keyed to one end of a short shaft 50 which projects into and outwardly beyond the gear box 30 longitudinally of the machine and is journalled in a suitable bearing in said gear box. By virtue of the described gearing, the shaft 50 is driven to make one complete revolution for each cycle of operation of the machine and, hence, said shaft may be considered as the main cam shaft of the machine. It is from this shaft 50 that the mechanisms 16, 17, and 20 are operated at timed intervals.

The upper open end of the gear box 30 is normally closed by a plate 51 which is adapted to support the card feeder 14 for feeding the cards 5 one after another in timed relation from a supply stack thereof. The plate 51 is bolted or otherwise suitably secured to a series of brackets 52 and 53 which, in turn, are bolted or otherwise suitably secured to the gear box 30. The plate 51 projects rearwardly beyond the gear box 30 and has secured thereto a shelf 54 which is adapted to support a reserve stack 55 of the cards 5 in a convenient position for jogging thereon and loading into the card feeder 14 to replenish the supply of cards in said feeder during the normal operation of the machine.

CARD FEEDER

FIGS. 1, and 7 to 10, inclusive

The card feeder 14 comprises a main bracket 56 which extends transversely of the machine and is bolted or otherwise suitably secured to the plate 51. The bracket 56 is formed with upwardly projecting transversely spaced portions 57, 58 and 59. Disposed within the space between the bracket portions 57 and 58 is the free unsupported end of a shaft 60 which projects transversely through and outwardly beyond the bracket portions 58 and 59 and is journalled in suitable anti-friction bearings 61 and 62 fixed in the bracket portions 58 and 59, respectively. Disposed between the portions 57 and 58 of the bracket 56 and slidably engaged over the free end of the shaft 60 is a rubber covered friction type separator roll 63. The separator roll 63 is connected in a novel manner to the shaft 60 for rotation by said shaft and to facilitate immediate removal of the same therefrom. For this purpose, the shaft 60 is provided with a smooth annular bore 64 extending radially therethrough, and with a threaded annular bore 65 extending axially thereof and opening inwardly into the bore 64 and outwardly through the adjacent free end of said shaft. Slidably engaged in the smooth bore 64 is an annular key 66 provided adjacent the inner end thereof with an annular recess 67 which in cross-section is substantially V-shaped. Slidably engaged in the threaded bore 65 is a pin 68 having a conical inner end 69. Threadedly engaged in the threaded bore 65 is a headless set screw 70.

The length of the key 66 and the location of the recess 67 in said key are so chosen that with the conical end 69 of the pin 68 projecting partly into said recess, said key is engaged in a usual keyway 71 formed in the separator roll 63, thus drivably connecting said roll with the shaft 60 for rotation by said shaft. It will be apparent that when the set screw 70 is turned to move the same farther inwardly, the pin 68 will likewise be moved farther inwardly by said set screw and thereby cam the key 66, through engagement of the conical end 69 of said pin with the inclined surface of the recess 67, radially outwardly into firm engagement with the bottom of the keyway 71 in the separator roll 63, thus firmly locking said roll to the shaft 60 against axial displacement in either direction. When the set screw 70 is turned to move the same outwardly, the pressure of the pin 68 on the key 66 is released, thus freeing the separator roll 63 and enabling axial movement thereof on and removal of the same from the shaft 60.

Arranged rearwardly of the separator roll 63 is an inclined magazine or hopper for supporting a supply stack of cards 5 in fanned-out overlapping relation and in position for feeding of the cards one after another from said stack by said separator roll. The magazine comprises angle side pans 72 and 73 which are laterally adjustable so that the stack of cards 5 placed therebetween may be centrally positioned with respect to the separator roll 63. The magazine comprising the side pans 72 and 73 is supported in a novel manner so that the upper surfaces of the inwardly projecting base portions 74 of said side pans lie in a plane tangent to the lower part of the separator roll 63, and that said magazine may be adjusted to any desired feeding angle of inclination while maintaining the described tangency of the side pans 72 and 73 in all angular positions of adjustment thereof. In this manner, gravity flow of the supply stack of cards 5 toward the separator roll 63 may be accurately controlled, the angle of flow of the cards to the separator roll is substantially unbroken in all inclined positions of the magazine, and continued feeding of cards 5 and only single cards at a time from the stack by the separator roll is assured.

To this end, the laterally adjustable side pans 72 and 73 are secured, as by means of slotted angle elements 75 thereon, to a shelf 76 formed on a bracket 77 having a vertical plate-like portion 78 extending above and below said shelf. Secured in the vertical portion 78 of bracket 77 and projecting outwardly therefrom are at least two arcuately spaced pins 79 which are spaced at equal radial distances from the axis of rotation of the separator roll 63. The pins 79 are slidably engaged in an arcuate groove 80 which is concentric with the axis of rotation of the separator roll 63 and is formed in the adjacent inner surface of a bracket 81 which is bolted or otherwise suitably secured to the plate 51. Threaded or otherwise suitably secured in the vertical portion 78 of bracket 77 and projecting outwardly therefrom is a threaded stud 82 which is slidably engaged in and projects through an arcuate slot 83 which is formed in the bracket 81 concentric with the groove 80 and with the axis of rotation of the separator roll 63. A nut 84 is threaded on the outwardly projecting end of the stud 82 and tightened against the bracket 81 to firmly hold the bracket 77 and the magazine side pans 72 and 73 in all angular positions of adjustment thereof.

It will thus be apparent that by virtue of the described mounting for the magazine side pans 72 and 73, said pans are, through engagement of the pins 79 in the groove 80, caused to tilt to a greater or lesser degree of inclination when raised and lowered, respectively, and that said tilting movement of said side pans occurs substantially about the periphery of the separator roll 63, thus maintaining the upper surfaces of the base portions 74 of the side pans 72 and 73 substantially in tangential relation to the separator roll 63 in all positions of angular adjustment of said side pans. The shelf 76 of the bracket 77 has suitably secured to the forward edge thereof a tongue 85 of resilient material, such as clock-spring steel, for bridging the gap between the magazine side pans 72 and 73 and the separator roll 63 and for directing the foremost cards 5 of the supply stack into position for feeding action of the separator roll 63 thereon.

Disposed below and cooperating with the separator roll 63 in the feeding of the cards 5 successively from the supply stack is a retard pad or element 86 made of friction material, such as rubber, which serves to provide between it and said separator roll a feed throat for the passage of single cards only and to retard or hold back a second or succeeding card against feeding movement simultaneously with a first or preceding card. The retard pad 86 projects through a suitable opening 87 in the tongue 85 and is normally spaced from the separator roll 63 a distance substantially equal to or slightly less than the thickness of a card 5.

In order to provide for accurate spacing of the retard pad 86 at any time from the separator roll 63, and positioning of said pad at the proper feeding angle, there is provided a lever 88 having a rearwardly projecting arm 89 and a forwardly and upwardly projecting arm 90 which is bifurcated at the free end thereof. The lever 88 is pivotally mounted on a stud 91 in a block 92 which is secured in a suitable manner to the lower surface of the shelf 76. The retard pad 86 is cemented to a block 93 which is disposed within the free end of the arm 90 of lever 88 and is pivotally mounted on a stud 94 in said arm, said stud being threaded into one side of the arm and utilized to also immovably clamp said block in its adjusted angular position to said arm. Connected to the free end of the arm 89 of lever 88 is one end of a coil extension spring 95 the opposite end of which is connected at 96 to the shelf 76. This spring 95 continuously tends to move the retard pad 86 downwardly away from the separator roller 63, said movement, however, being limited and regulated by an adjustable screw 97 threaded through a suitable opening in the arm 89 and engaging against the lower surface of the shelf 76. The adjusting screw 97 is normally held against rotation by the expanding action of a coil compression spring 98 surrounding said screw and disposed between the arm 89 and an operating head 99 on the screw. It will thus be apparent that an exceedingly accurate adjustment of the clearance between the retard pad 86 and the periphery of the separator roll 63 to permit only a single card to pass therebetween may be achieved by rotating the adjusting screw 97 in the proper direction by means of its operating head 99. When this adjustment has been made, the retard pad 86 will be maintained in its adjusted position by the contracting action of the spring 95 until such time that readjustment of the clearance is required to compensate for the wearing of said retard pad by the cards through continued feeding of the same thereover.

The separator roll 63 is intermittently rotated at timed intervals in a counter-clockwise direction as viewed in FIG. 8 to feed the cards 5 one after another in timed relation from the supply stack thereof. For this purpose, the cam shaft gear 49 within the gear box 30 (FIGS. 5 and 6) has secured thereto or formed integrally therewith a spur gear 100 which meshes with and drives a spur gear 101. This gear 101 is fixed on one shaft 102 of a conventional angle gear drive unit 103 which is disposed within the gear box 30 and is bolted or otherwise suitably secured to a bracket 104. The angle gear unit 103 is of well-known construction needing no detailed description herein and includes another shaft 105 which is disposed at right angles to the shaft 102. The gears 100 and 101 are of the same size and, hence, the shaft 105 of the angle gear unit 103 will also make one complete revolution for each cycle of operation of the machine. The bracket 104 is bolted or otherwise suitably secured to the gear box 30 exteriorly thereof and projects into said gear box through a suitable opening therein to receive said angle gear unit.

Keyed or otherwise suitably secured to the shaft 105 of the angle gear unit 103 is a crank disc 106 to which is pivotally connected by a stud 107 the lower end of a connecting rod 108. The connecting rod 108 extends upwardly through a suitable clearance opening 109 in the plate 51 and is pivotally connected at its upper end by a stud 110 to the free end of a lever 111. This lever 111 is engaged over and keyed to the hub of one member 112 of a conventional unidirectional wedging roller type of clutch 113. The clutch member 112 is loosely mounted on the separator roll shaft 60, and the clutch 113 is of well-known construction having internal elements (not shown) one of which is keyed or otherwise suitably secured to said shaft and is connected with and rotated by the clutch member 112 upon rocking movement of said member in one direction only. In the illustrated embodiment, the shaft 60 and the separator roll 63 thereon will be rotated only on the down stroke of the lever 111 and will not be rotated on the up stroke of said lever, and as viewed in FIG. 10 which is a rear view of the card feeder 14, the active down stroke of the lever 111 and resulting rotation of the shaft 60 and separator roll 63 occurs in a clockwise direction. It will thus be apparent that upon and during each active down stroke of the lever 111, a card 5 will be advanced from the top of the supply stack by the separator roll 63 through rotation thereof and frictional contact of the same with said card. The series of holes 114 in the crank disc 106 provides for placing of the stud 107 in any one of said holes to thereby adjust the time of operation of the separator roll 63 if deemed necessary or desirable. As shown in FIG. 7, the cards 5 are placed in the magazine facewise with the adhesive sheet 7 at the top and with their longer dimension extending in the feeding direction and so that the transverse edge or shorter dimension nearest the adhesive sheet is leading.

The extent of rotation of the separator roll 63 upon each operation thereof as above described, is sufficient to advance the uppermost card 5 from the supply stack a short distance and present its leading edge between a continuously driven lower feed roll 115 and cooperating upper pressure rollers 116 which complete the withdrawal of the card from the supply stack and further advance the same to the conveyor 15. It is to be noted that when the separator roll 63 has advanced the leading edge of a card 5 between the roll 115 and rollers 116, said separator roll, due to the described overrunning clutch drive therefor, will be rotated independently of said drive by the card as the same is pulled from beneath the separator roll by the advancing action of the feed roll 115 and pressure rollers 116 thereon. Under these conditions, the separator roll 63, due to the momentum gathered thereby, will continue to coast after the card has been advanced from between the same and the retard pad 86, and by such action a second card would very likely be advanced prematurely and out of time. Novel brake means is therefore provided to stop rotation of the separator roll 63 as soon as an advancing card has passed out of the influence of said roll.

As shown, said brake means comprises a disc 117 of a suitable friction material, such as fiber, which freely surrounds the shaft 60 and is loosely disposed within an annular recess formed in the outer surface of the portion 58 of the bracket 56. Mounted on the shaft 60 for limited sliding movement relative to said shaft and located adjacent the disc 117 is a metal disc 118 which is of the same diameter as that of the disc 117. The disc 118 is connected to the shaft 60 for rotation therewith by a machine screw 119 which is threaded in the hub of said disc and is formed with a reduced inner end 120 which is engaged in a relatively short keyway 121 formed in and extending axially of said shaft. The disc 118 is yieldingly and continuously pressed against the disc 117 and the latter, in turn, is so pressed against the bracket portion 58 by a deformed washer-like spring 122 which is loosely engaged over the shaft 60 and is disposed between the hub of the disc 118 and a pair of adjusting and lock nuts 123 and 124, respectively, threaded on a threaded portion of said shaft. The pressure of the discs 117 and 118 is adjusted so that the frictional drag imposed thereby upon the shaft 60 is just sufficient to instantly stop rotation of said shaft and the separator roll 63 as the trailing edge of an advancing card leaves said separator roll. Since the disc 118 operates against the disc 117, and the latter operates against the bracket portion 58, there is provided in effect a double braking action and, hence, a minimum or relatively light pressure is only required for the described purpose, thus avoiding any strain on the described driving means for the separator roll 63.

The feed roll 115 extends transversely of the feeder bracket 56 and is formed at opposite ends thereof with shaft-like extensions 125 of reduced diameter which extend through suitable clearance openings formed in the portions 57, 58 and 59 of said bracket, said openings being of a diameter in excess of the diameter of the feed roll 115 to provide for initial mounting of said feed roll in the bracket 56 through either side thereof. The feed roll 115 is journalled at one end thereof in a suitable anti-friction bearing 126 which is carried by and retained in a suitable manner in the bracket portion 57. The mounting for the anti-friction bearing 126 is preferably chosen so that said bearing may be engaged over and removed from the feed roll shaft 125 through the outer surface of the bracket portion 57, thus enabling and facilitating subsequent removal of the feed roll 115 from the feeder through the bracket portion 57 for repairs or replacement purposes. In order to provide increased feeding traction of the feed roll 115 on the cards 5, said roll is provided with two axially spaced narrow sleeves or tires 127 of soft rubber which are pressed over and suitably bonded to reduced portions of said feed roll.

The idler pressure rollers 116, of which there are two in the illustrated embodiment, coact with the rubber sleeves 127 of the feed roll 115 to further advance the cards 5 delivered successively thereto by the separator roll 63. These pressure rollers 116 are mounted in a novel manner so as to provide for adjustment thereof independently as to the pressure applied thereby on the cards, and collectively in the plane of the top of the feed roll 115 to proper operating position with respect to said feed roll. Accordingly, each pressure roller 116 is journalled on a stud 128 secured in the lower free end of an inverted L-shaped lever 129. The levers 129 for both pressure rollers 116 are pivotally mounted at their rearwardly projecting ends on a round cross bar 130 milled flat at each end thereof as indicated at 131. The cross bar 130 rests on top of the portions 57 and 58 of the bracket 56 with the flat ends 131 thereof engaged between upwardly projecting lugs 132 formed on each of said bracket portions and spaced apart a distance greater than the diameter of said cross bar. Each lug 132 has threaded therein a set screw 133 which is adapted to engage the adjacent side of the cross bar 130. It will thus be apparent that by simply loosening certain of the set screws 133 and tightening others thereof, the cross bar 130, the levers 129, and other parts carried by said cross bar to be hereinafter described, may be moved as a unit in small increments relative to the bracket 56 not only back and forth in a direction longitudinal of the machine, but may also be inclined in a horizontal plane, if necessary, to accurately locate the idler pressure rollers 116 in proper operating position on the feed roll 115. The cross bar 130 is held against upward displacement from the bracket 56 and is immovably clamped in adjusted position to said bracket by the knurled operating heads 134 of clamp screws 135 which are engaged in clearance slots 136 formed in the flat ends 131 of the cross bar 130 and are threaded into the bracket portions 57 and 58.

Disposed between the levers 129 and clamped to the cross bar 130 is an arm 137 which, in plan view, is T-shaped so as to overlie said levers at points substantially directly over the idler pressure rollers 116. This arm 137 has threaded in suitable threaded openings in the laterally extending branches thereof adjustable hollow screws 138 which are provided with spring-pressed plungers 139 that project through the lower ends of said screws into yielding engagement with the forward ends of the levers 129. The idler pressure rollers 116 are thus yieldingly pressed against the feed roll 115 independently of each other through engagement of the plungers 139 with the respective levers 129, and the pressure of said rollers on said feed roll may be independently adjusted by rotating the respective screws 138 which are provided with knurled operating heads 140 for this purpose. The knurling on the heads 140 of screws 138 is of the straight type and thus provides spaced minute teeth around the peripheries of said heads so as to receive in the spaces between said teeth resilient detents 141 for yieldingly holding said screws in the adjusted positions thereof, said detents being suitably secured to the arm 137. The levers 129 are held in spaced relation by the arm 137, and against axial outward displacement by collars 142 which are releasably secured to the cross bar 130.

Bunching of the fanned-out cards 5 in and at the discharge end of the supply magazine is prevented by a hold-down roller 143 which is journalled at one end of a rod 144. The rod 144 extends longitudinally of the card supply magazine and is slidably engaged in a suitable clearance opening formed in one end of a transverse stud 145 which is slidably and rotatably engaged in a suitable clearance opening formed in an upward extension 146 of the arm 137. The stud 145 has threaded on the other end thereof a wing nut 147 which is engaged with the adjacent surface of the arm extension 146 so as to move said stud axially toward said arm extension and thereby releasably clamp the rod 144 against the latter in the adjusted position thereof with respect to the cards 5 in the supply magazine.

The feed roll 115 is driven continuously and at a surface speed faster than that at which the separator roll 63 is rotated in feeding the cards 5 successively from the supply stack. In this manner, each card 5 presented to the feed roll 115 and pressure rollers 116 by the separator roll 63 will be rapidly and completely withdrawn from the supply stack before the separator roll 63 is again operated to feed the next card 5 from the supply stack in the next feeding cycle and, hence, the successively fed cards 5 will follow each other a predetermined distance apart. The feed roll 115 is driven in the manner described from the gear box 30, and for this purpose, the shaft 44 of said gear box has also fixed thereon a sprocket 148 around which passes a chain 149. The chain 149 extends upwardly from the sprocket 148 through a suitable clearance opening 150 in the plate 51 and also passes around a sprocket 151. This sprocket 151 is keyed or otherwise suitably secured to one shaft 152 of a conventional angle gear drive unit 153 having another shaft 154 which is disposed at right angles to the shaft 152. The angle gear unit 153 is located so that the axis of its shaft 154 is coaxial with the axis of the feed roller 115, and is bolted or otherwise suitably secured in such position to the base of a vertical bracket or standard 155. The bracket or standard 155 is bolted or otherwise suitably secured to the upper surface of the plate 51 and is utilized to support one end of the card stacking conveyor, as shown in FIG. 1, to be hereinafter described. Slack in the chain 149 is compensated for by a small diameter sprocket 156 which is located within the gear box 30 and is engaged with said chain. The sprocket 156 is journalled on and at the free end of an arm 157 which is adjustably clamped to a stud 158 secured in any suitable manner to the gear box 30. The shaft 154 of the angle gear unit 153 has keyed or otherwise suitably secured thereto one part 159 of a conventional coupling 160, the other part 161 of which is keyed or otherwise suitably secured to the outwardly projecting end of the feed roll shaft 125, thus completing the drive from the gear box to the feed roll and effecting continuous rotation of said feed roll.

Although the feeder 14 has been primarily described above in connection with the handling of cards therein and the use thereof in a machine for preparing cards and mounting inserts therein, it is to be understood that said feeder is not limited to such articles or to such use, but that the same has application in other arts and that the described principles thereof are applicable to the feeding of sheets, envelopes, letters, and other relatively thin articles of a variety of different sheet materials to various machines for the performance of operations thereon.

In the normal operation of the feeder 14, the cards 5 are separated and advanced successively at timed intervals from the supply stack by the separator roll 63 and presented by said separator roll to and between the feed roll 115 and pressure rollers 116, said feed roll and pressure rollers serving to further advance the cards in succession and deliver them in like manner to the card conveyor 15 which is preferably constructed, mounted and operated as follows.

CARD CONVEYOR

*FIGS. 1, 7, 8, and 11 to 14, inclusive, and 25*

The card conveyor 15 serves to advance and present successive cards 5 to the mechanisms 16, 17 and 20 which are spaced along and mounted at one side of said conveyor, and which will be hereinafter described. The conveyor 15 also serves to deliver the finished cards from the mechanism 20 to the mechanism 21 which is located at the discharge of said conveyor, and which will also be hereinafter described. As shown, the conveyor 15 comprises a generally rectangular open frame 170 which is of one-piece construction and is suitably ribbed at spaced points therealong to strengthen and stiffen the same. The frame 170 is supported at the rear thereof on the plate 51 and at the front thereof on a standard 171 and is bolted or otherwise suitably secured to said plate and said standard. The standard 171 is bolted or otherwise suitably secured to the base platform 22 and projects upwardly therefrom. The frame 170 is provided at the top thereof with a plate 172 the upper surface of which is located substantially in the plane of the top of the feed roll 115 and serves to support the cards 5 during movement thereof along the conveyor and while they are temporarily at rest on said convey for performance of the card preparing and film mounting operations thereon, as hereinafter described. The plate 172 extends substantially across the entire width of the frame 170 and along the entire length of said frame and may be made in one piece, but for the sake of convenience in gaining access to the various mechanisms for inspection and adjustment purposes, said plate is made in several sections which are individually secured to the frame 170 as by clamp screws of the type shown in FIGS. 35 and 36 and indicated at 173.

Suitably secured to the top of the frame 170 at one side thereof and located a slight distance outwardly of the normal line of travel of the cards 5 from the feeder 14 is a side guide in the form of a grooved bar 174 which extends substantially the entire length of the conveyor and projects above and below the upper surface of the sectionalized plate 172. The side guide bar 174 serves to register the successive cards 5 in proper lateral position on the conveyor for accurate performance of the various operations thereon by the mechanisms 16, 17 and 20.

Disposed within the frame 170 and located relatively close to the side guide bar 174 is a plurality of lower feed rollers 175, 176, 177, 178, 179 and 180 which are spaced longitudinally of said frame and are disposed at an angle with respect to said side guide bar and the normal line of travel of the cards 5 along the conveyor. The rollers 175 to 180, inclusive, project through suitable clearance openings in the sectionalized plate 172 to substantially the upper surface of said plate, and said rollers are arranged so that the angle of inclination of each of the rollers 176 to 180, inclusive, is the same and of a slight degree, and that the angle of inclination of the first roller 175 is greater than that of the rollers 176 to 180, inclusive. By virtue of the described arrangement of the rollers 175 to 180, inclusive, and of the associated side guide bar 174, each card 5 received from the feeder 14 by the first angle roller 175 will be advanced by said roller to the second angle roller 176 and during such movement said card will be quickly moved by the roller 175 laterally on the conveyor and registered against said side guide bar, and the registered card will thereafter be maintained against the side guide bar and moved therealong by the other angle rollers 176 to 180, inclusive, with a minimum amount of friction and with little or no crowding of the card against said side guide bar. The spacing between the rollers 175 to 180, inclusive, is less than the length or longer dimension of the cards 5 so that the latter are always under the control of said rollers to insure continued advancing movement thereof along the conveyor. The rollers 175 to 180, inclusive, in the described lateral position thereof engage the cards 5 between the aperture 6 in said cards and the adjacent marginal side edge of the cards. The peripheries of the rollers 175 to 180, inclusive, are preferably roughened, as by knurling the same, so as to provide increased traction of said rollers on the cards.

The inclined rollers 175 to 180, inclusive, are suitably fixed on and rotated by correspondingly inclined shafts 181, 182, 183, 184, 185 and 186, respectively, which extend transversely of the conveyor frame 170 and are journalled at opposite ends thereof in suitable bearings provided in said frame. The rollers 175 to 180, inclusive, are driven continuously and at the same surface speed as that of the feed roll 115. For this purpose, the feed roll 115 has fixed on the shaft section 125 thereof which projects through the portion 57 of the feeder bracket 56, a bevel pinion 187 (FIG. 9) which meshes with and drives an intermediate bevel gear 188. This bevel gear 188 is journalled on a stud 189 suitably secured in a bracket 190 which is bolted or otherwise suitably secured to the conveyor frame 170 exteriorly and at the side thereof opposite the side guide bar 174. The intermediate gear 188, in turn, meshes with and drives a bevel pinion 191 which is of the same size as that of the bevel pinion 187 and is fixed on the rear end of a short shaft 192 which extends through and forwardly beyond the bracket 190 and is journalled in suitable bearings in said bracket. The shaft 192 extends along the adjacent side of the frame 170 in spaced relation thereto and has fixed on the forward end thereof one part 193 of a conventional flexible coupling 194, the other part 195 of which is secured to the rear end of a shaft 196. The shaft 196 is thus driven by the shaft 192 through the coupling 194. The shaft 196 extends along the remaining length of the frame 170 in spaced relation thereto and is supported by and journalled in suitable bearings in several brackets 197 which are spaced along said shaft and are bolted or otherwise suitably secured to said frame. The shaft 192 is disposed at right angles to the inclined shaft 181, and the shaft 196 is disposed at right angles to the inclined shafts 182 to 186, inclusive, and the axes of the shafts 192 and 196 are located in the plane of the axes of the inclined shafts 181 to 186, inclusive. The shafts 192 and 196 have fixed thereon alike bevel pinions 198 which mesh with and drive alike bevel pinions 199 that are fixed on the outwardly projecting ends of the shafts 181 to 186, inclusive, of the inclined rollers 175 to 180, inclusive, respectively. The bevel pinions 198 and 199 are of the same size as that of the bevel pinions 187 and 191.

Cooperating with each of the driven inclined lower rollers 175 to 180, inclusive, to insure positive advancing movement of the cards 5 along the conveyor, is an upper spring-pressed rider wheel or idler pressure roller 200 which is normally disposed at the same angle of inclination as that of the lower roller with which it cooperates. The rider wheel 200 for the inclined roller 175 is journalled on and at one end of an arm 201 which is bifurcated at said end and is pivotally mounted at the other end thereof on an adjustable eccentric stud 202 which is the same as the stud shown in FIG. 11 and indicated at 211, to be hereinafter referred to. The stud 202 is releasably secured in a suitable manner in a bracket 203 which forms a component part of a caliper unit to be hereinafter described which advantageously utilizes the rider wheel 200 on the arm 201 as the means of said unit for gauging the thickness of each card 5 passed between the same and its cooperating lower roller 175. The arm 201 and consequently the rider wheel 200 carried thereby is yieldingly urged downwardly by a coil compression spring 204 to maintain said wheel engaged with its cooperating roller 175 or the top of a card 5 passing between the same, said spring having one end thereof engaged against said arm and the opposite end thereof engaged against a screw 205 which is adjustably threaded in the bracket 203 and is secured in adjusted position by a lock nut 206. The degree of pressure between the driven roller 175 and its cooperating rider wheel 200 may thus be regulated or adjusted as desired or required by turning the adjusting screw 205 in one direction or the other to increase or decrease the tension of the spring 204. The spring 204 is preferably engaged over a short and small diameter pin on the arm 201 and over a similar pin formed on the lower end of the adjusting screw 205 to confine said spring between said arm and said screw. The eccentric stud 202 provides for longitudinal adjutment of the arm 201 and consequently rolling adjustment of the rider wheel 200 on and relative to the driven roller 175 to accurate operating position with respect to said roller.

The rider wheels 200 cooperating with the driven inclined rollers 176 to 180, inclusive, are mounted not only for rolling adjustment on the respective rollers to proper operating positions, but to also enable the angle of inclination thereof to be varied with respect to said rollers whereby the lateral thrust imparted to the cards 5 by the cooperating inclined rollers and rider wheels may be further accurately controlled to a desired degree. Accordingly, these rider wheels 200 are each journalled on and at the lower end of a separator holder 207 which is formed at the top thereof with a round stem 208, and each of said holders is rotatably mounted by its stem 208 and at one end of a separate arm 209 which is split at said end to provide for clamping of the holder in its adjusted angular position to said arm. The sub-assembly comprising the rider wheel 200, the holder 207 and the arm 209 correlated to the driven inclined roller 176 is pivotally mounted on a bracket 210 by an adjustable eccentric stud 211 which is engaged in the other end of said arm and is releasably secured in a suitable manner on said bracket. The sub-assemblies comprising the rider wheels 200, the holders 207 and the arms 209 correlated to the driven inclined rollers 177 and 178, respectively, are pivotally mounted on a single bracket 212 by adjustable eccentric studs 213 and 214, respectively, which are engaged in the other ends of the respective arms 209 and are releasably secured in a suitable manner on said bracket. The eccentric studs 213 and 214 are the same as the stud 211 previously described. The sub-assemblies comprising the rider wheels 200, the holders 207 and the arms 209 correlated to the driven inclined rollers 179 and 180, respectively, are pivotally mounted on a single bracket 215 by adjustable eccentric studs 216 and 217, respectively, which are engaged in the other ends of the respective arms 209 and are releasably secured in a suitable manner in said bracket. The eccentric studs 216 and 217 are the same as the stud 211 previously described. The brackets 210, 212 and 215 are identical in construction and they are bolted or otherwise suitably secured to the conveyor frame 170 at the side guide side thereof and at suitably spaced points along said frame.

The sub-assemblies comprising the rider wheels 200, the holders 207 and the arms 209 are yieldingly urged downwardly under spring pressure so as to maintain said wheels engaged with the respective rollers 176 to 180, inclusive, or with the tops of the cards 5 passing and positioned between said rollers and their cooperating rider wheels. Also, the spring pressure exerted upon the rider wheels 200 of said sub-assemblies is controlled in a novel manner such that while the cards 5 are temporarily at rest on the conveyor and positioned against operable stop means, to be hereinafter described, for arresting the movement of the cards independently of the conveyor at predetermined points spaced along said conveyor and for holding said cards at said points for a predetermined interval against movement by the conveyor, a relatively light pressure is applied by the rider wheels upon the stopped cards so as to maintain the same against the stop means without buckling of said cards, and just as or immediately after the stop means are operated to release the stopped cards for further movement by the conveyor, a relatively heavy pressure is applied by the rider wheels upon the released cards whereby instant and positive further movement of the released cards by the conveyor will occur and is assured without slipping or lagging of the cards on said conveyor. The described variable pressure is applied to all of the rider wheels 200 in unison and is effected during each cycle of operation of the machine by elements which are constructed, mounted, operated and controlled as follows.

Each of the brackets 210, 212 and 215 has mounted thereon for pivotal movement about a horizontal longitudinal axis, as at 218, a lever 219 which is constructed to surround the upper forked end of the bracket and to provide at the inner side thereof a longitudinal portion which, in the case of the brackets 212 and 215, overlies both arms 209 on each of said brackets, and in the case of the bracket 210, overlies the single arm 209 thereon. A coil compression spring 220 is disposed between the single arm 209 carried by the bracket 210 and the lever 219 on said bracket, and between each arm 209 carried by the bracket 212 and the lever 219 on said bracket, and between each arm 209 carried by the bracket 215 and the lever 219 on said bracket. Each spring 220 has one end thereof engaging against the respective arm 209 and the opposite end engaging against the respective lever 219 and is preferably engaged over short and small diameter pins on the arm and the lever to confine the same therebetween. Each of the levers 219 is provided in the outer portion thereof with an adjustable abutment member 221 in the form of a machine screw threaded therein and locked in adjusted position by a lock nut 222. The abutment members 221 on all of the levers 219 are arranged and adjusted to be simultaneously engaged by arms 223 which are disposed within and project outwardly from the forked upper ends of the brackets 210, 212 and 215 and are clamped to or otherwise suitably fixed on a rock shaft 224. The rock shaft 224 extends longitudinally of the conveyor and is journalled in suitable bearings in the brackets 210, 212 and 215.

Keyed and suitably secured to the rock shaft 224 at a suitable position therealong and preferably adjacent to and forwardly of the bracket 210 is a lever 225 which projects outwardly from said shaft beyond the adjacent side of the conveyor frame 170. Pivotally connected by a pin 226 to the free end of the lever 225 is the upper end of a cam strap 227 the lower end of which is engaged over and guided by a grooved hub 228 which is keyed and suitably secured to the cam shaft 50. Disposed above the cam shaft 50 and journalled at 229 on the cam strap 227 is a cam follower 230 which engages a cam 231 that is bolted or otherwise suitably secured to the hub 228. The follower 230 is yieldingly held in engagement with the cam 231 by a coil extension spring 232 having one end thereof connected to the lever 225 and the other end connected at 233 to an angle bracket 234 which is bolted or otherwise suitably secured to the conveyor frame 170. The shaft 224 is thus cam operated in one direction and spring operated in the opposite direction by the cam 231 and the spring 232, respectively, to rock all of the arms 223 on said shaft in unison. It will thus be apparent that when the arms 223, through continued rotation of the cam 231 and engagement of the follower 230 with the high part of said cam, are cam operated in unison in a clockwise direction as viewed in FIG. 11, positive pivotal movement will be imparted to the levers 219 in unison in the same direction by said arms through engagement thereof with the abutment members 221, and consequently all of the springs 220 will be compressed in unison by said levers, thereby applying increased pressure upon all of the rider wheels 200 in unison. When the arms 223 are thereafter spring operated in the opposite direction by the spring 232 upon continued rotation of the cam 231 and engagement of the follower 230 with the low part of said cam, the levers 219 are released by said arms and caused to follow the latter by the expanding action of the springs 220, thus relieving some of the pressure upon the rider wheels 200. The springs 220 initially are of alike tension, and with the follower 230 engaged with the low part of the cam 231, the tension of said springs is adjusted by means of the abutment members 221 so that a light pressure is applied thereby upon the rider wheels 200 sufficient to hold the cards 5 against the stop means without buckling of the same and rebounding thereof from said stop means.

The stop means previously referred to for the cards 5 functions in connection with the mechanisms 16, 17 and 20 to simultaneously arrest the forward movement of successive cards on and independently of the conveyor for a predetermined interval and in predetermined operative positions with respect to said mechanisms. Accordingly, the stop means correlated to the mechanisms 16, 17 and 20 comprises, in the illustrated embodiment, single fingers 235, 236 and 237, respectively, which are rocked in unison from upper positions in which they are out of the path of travel of the cards 5 to lower positions in which they are in the path of travel of the cards to be engaged by their leading edges. The stop fingers 235, 236 and 237 are spaced longitudinally of the conveyor predetermined distances apart. The stop fingers 235 and 236 are each suitably secured to the free end of a rearwardly projecting portion of an arm 238 which, in plan view, is of angular formation and projects transversely of the conveyor over the side guide bar 174. The stop finger 237 is suitably secured to the free inner end of an arm 239 which projects over the side guide bar 174 transversely of the conveyor. The arms 238 carrying the stop fingers 235 and 236, and the arm 239 carrying the stop finger 237, are all keyed and suitably clamped at their outer lateral ends to a rock shaft 240 which extends longitudinally of the conveyor and is journalled in suitable bearings provided in the brackets 210, 212 and 215, and in an additional bracket 241 which is bolted or otherwise suitably secured to the frame of the mechanism 20 to be hereinafter described. The stop fingers 235, 236 and 237 in their lower operative card engaging and stopping positions project downwardly beyond the upper surface of the sectionalized card supporting plate 172 through suitable clearance openings formed in said plate.

The arms 238 and 239 and consequently the stop fingers 235, 236 and 237 carried thereby are rocked in unison once during each cycle of operation of the machine in timed relation with the feeding of the cards 5 and the operations of the mechanisms 16, 17 and 20. For this purpose, the rock shaft 240 has keyed and suitably secured thereto adjacent the lever 225 a lever 242 which projects outwardly from said shaft. Pivotally connected by a stud 243 to the free end of the lever 242 is the upper end of a cam strap 244 the lower end of which is engaged over and guided by the hub 228 on the cam shaft 50. The cam strap 244 is retained on the hub 228 by a collar 245 suitably secured to said hub. Disposed below the cam shaft 50 and journalled at 246 on the cam strap 244 is a cam follower 247 which engages a cam 248 that is bolted or otherwise suitably secured to the hub 228. The follower 247 is yielding held in engagement with the cam 248 by a coil extension spring 249 having one end thereof connected at 250 to the cam strap 244 and the opposite end connected at 251 to the angle bracket 234. The rock shaft 240 is thus cam operated in one direction and spring operated in the opposite direction by the cam 248 and the spring 249, respectively, to rock all of the arms 238 and 239 thereon in unison, whereby the stop fingers 235, 236 and 237 will be moved downwardly in unison by the spring 249 into the path of travel of successive cards 5 to be engaged by their forward or leading edges, and upwardly in unison by the cam 248 out of said path to simultaneously release the cards for further advancing movement by the conveyor.

The stop fingers 235, 236 and 237 are so arranged that when the forward motion of three successive cards 5 is arrested by said stop fingers, the cards will be in proper operating positions with respect to the respective mechanisms 16, 17 and 20, and they will still be under the influence of the continuously driven conveyor rollers 176, 178 and 180, respectively, and the rider wheels 200 cooperating with said rollers. Under these conditions, the cards 5 will be continuously urged against their respective stop fingers 235, 236 and 237 and thereby held against displacement during the performance of operations thereon, the rollers 176, 178 and 180 at this time slipping relative to their respective cards, and the pressure of the rider wheels 200 being relieved and insufficient, as hereinbefore described, to buckle said cards. When the arrested cards 5 are simultaneously released upon upward movement of the stop fingers 235, 236 and 237, they will immediately be taken over by the respective rollers 176, 178 and 180 and the cooperating rider wheels 200 and, through increased pressure applied at this time by all of the rider wheels on the cards, as hereinbefore described, they will be instantly and positively advanced from their stop positions and moved further along the conveyor. The described downward and upward movements of the stop fingers 235, 236 and 237 occur in planes normal to the plane of travel of the cards 5, and when said stop fingers are raised to release the cards engaged thereby, upward displacement of said cards with and by the stop fingers is prevented by strippers 252. These strippers 252 extend transversely of the path of travel of the cards and are located above said path and adjacent to the stop fingers 235, 236 and 237, and they are suitably secured to the plate 172 only at the ends thereof opposite the side guide bar 174.

As previously stated, the rider wheel 200 which cooperates with the driven inclined conveyor roller 175 to advance the successive cards 5, also advantageously serves as the means of a card calipering or excess card detecting device for gauging the thickness of each card passed between said roller and said rider wheel. The calipering or excess card detecting device functions to cause a control action of the machine, such as stopping of the machine, in the event more than one card 5 at a time is passed between the driven roller 175 and its companion rider wheel 200. As hereinshown, the card calipering or excess card detecting device comprises the following elements which are constructed, mounted and operated as follows, and include the previously described bracket 203, and the rider wheel 200 cooperating with the conveyor roller 175.

The bracket 203 is keyed to a vertically extending stem 253 for vertical sliding movement on said stem without relative rotation. The stem 253 is suitably secured at its lower end in a bracket 254 which is bolted or otherwise suitably secured to the adjacent side of the conveyor frame 170. The stem 253 is rotatably positioned in the bracket 254 such that the bracket 203 will be disposed at the same angle of inclination as that of the driven conveyor roller 175. Disposed above the bracket 203 and surrounding the stem 253 is a coil compression spring 255 having one end thereof engaging against said bracket and the opposite end engaging against an adjusting nut 256 threaded on said stem. The adjusting nut 256 is locked in adjusted position by a lock nut 257 also threaded on the stem 253 and engaging said adjusting nut. The spring 255 normally tends to yieldingly move the bracket 203 downwardly relative to the stem 253, such movement, however, being limited and regulated by an adjusting nut 258 also threaded on said stem and engaging the lower end of said bracket. The bracket 203 may thus be raised relative to the stem 253 by rotating the adjusting nut 258 in one direction, and may be lowered by the spring 255 and rotation of said nut in the other direction. The bracket 203 will be yieldingly held in engagement with the adjusting nut 258 by the expanding action of the spring 255 the tension of which may be regulated by the adjusting nut 256 to resist normal upward displacement of said bracket away from the nut 258.

Disposed above and cooperating with the rider wheel 200 carried by the bracket 203 is a normally stationary caliper element 259 which may be of any suitable form and as hereinshown is in the form of a segment. The caliper segment 259 is disposed at the same angle of inclination as that of the conveyor roller 175 and its companion rider wheel 200 and is suitably fixed on the inwardly projecting end of a horizontal pin 260 which is journalled in a suitable bearing provided in the bracket 203 and projects outwardly beyond said bracket. Secured to the outwardly projecting end of the pin 260 is a spring clip 261 within which is yieldingly clamped a normally open electrical switch 262 of the mercury type having conductors 263 and 264 leading therefrom and connected to a terminal block 265. The terminal block 265 is suitably secured to the bracket 254, and the conductors 263 and 264 and consequently the mercury switch 262 are connected in the electrical control circuit for the machine, as illustrated in FIG. 58 and to be hereinafter described in detail. With the caliper segment 259 in the normal position thereof shown in FIG. 8, the mercury switch 262 is positioned on the pin 260 such that the mercury therein is caused to flow away from the contacts of said switch, whereby the electrical control circuit in which said switch is connected will be normally broken. With a single card 5 of normal thickness placed between the conveyor roller 175 and its companion rider wheel 200, the bracket 203 is raised or lowered through rotation of the adjusting nut 258 until the caliper segment 259 in the normal position thereof is spaced from said rider wheel a distance slightly less than the normal thickness of a single card.

It will thus be apparent that as long as single cards 5 are passed between the conveyor roller 175 and its companion rider wheel 200 during the normal operation of the machine, said rider wheel will not be raised by the single cards sufficiently to contact the caliper segment 259. Under these conditions the caliper segment 259 will not be rotated, the switch 262 will not be actuated and, hence, the machine will continue to operate in the normal usual manner. However, should a card 5, for some reason, be accompanied by or contain another or excess card 5 adhering thereto as it passes between the conveyor roller 175 and companion rider wheel 200, said rider wheel will be raised by the double or plural cards sufficiently to contact the sement 259 and, through rotation of said rider wheel by the advancing cards, said caliper segment will be rotated by said rider wheel in a clockwise direction as viewed in FIG. 8. Under these conditions the switch 262 will be rotated by the segment 259 through the pin 260, thus causing the mercury in said switch to flow toward and connect the contacts of the switch, thereby closing the circuit to effect stopping of the machine in a manner to be hereinafter described. The extent of rotation of the caliper segment 259 by the rider wheel 200 is limited to the angular circuit closing position of the switch 262 by a pin 266 which is secured in the bracket 205 and projects inwardly therefrom into the path of rotation of said segment. When the excess cards are thereafter removed from between the conveyor roller 175 and companion rider wheel 200 accompanied by a pivotal downward movement of said rider wheel away from the caliper segment 259, said segment will thus be released by the rider wheel and will return by gravity to its normal position, whereupon the switch 262 will likewise be returned to its original position causing the mercury therein to flow away from the contacts and again break the circuit. Following this, the machine may again be started for continued feeding and processing of the cards 5.

The driven inclined conveyor rollers 175 and 176 and the rider wheels 200 cooperating therewith serve to advance each card 5 into engagement with the side guide 174 and with the first card stop 235, and said side guide and said stop serve to locate said card in accurate register with the mechanism 16 which is constructed, mounted and operated as follows to effectively strip the cover sheet 9 from the adhesive sheet 7 on the card.

COVER SHEET STRIPPING MECHANISM
FIGS. 1, 15 to 24, inclusive

The cover sheet stripping mechanism 16 is mounted on the base plate or platform 22 and comprises a frame or main bracket 270 which is located in proper position longitudinally and laterally of said platform by a transversely extending key 271 and a stop block 272 disposed at right angles to said key and having threaded therein an adjustable stop bolt 273, said key and said block being suitably secured to the upper surface of the platform. The frame 270 is provided in the underside thereof with a suitable keyway to receive the key 271, and when so engaged, said frame is moved along said key and the platform 22 until it contacts the stop bolt 273, thus quickly and easily locating the mechanism 16 in its proper operating position in the machine. Following this, the frame 270 is immovably bolted to the platform 22. The frame 270 projects upwardly from the platform 22 outwardly of the conveyor 15 at the side guide side thereof and is formed with a horizontal shelf 274 which projects inwardly from said frame beneath said conveyor. The frame 270 has bolted or otherwise suitably secured to the top thereof a bracket 275 which projects inwardly from said frame over the conveyor 15.

The various operable parts of the cover sheet stripping mechanism 16 are driven through driving connections therefor with the cam shaft 50. For this purpose, the cam shaft 50 has keyed and suitably secured thereon between the frame 270 and the previously described cam supporting hub 228, a sprocket 276 around which passes a chain 277 which extends upwardly from said sprocket and also passes around a similar sprocket 278. This sprocket 278 is keyed and suitably secured on the outer end of one shaft 279 of a conventional angle gear drive unit 280 having another shaft 281 which is disposed at right angles to the shaft 278 and projects outwardly beyond opposite ends of said unit. Slack in the chain 277 is compensated for by an idler sprocket 282 which is journalled on and at the free end of an arm 283 which is adjustably clamped to a stud 284 secured in any suitable manner to the frame 270. The driven shaft 281 of the angle gear drive unit 280 has keyed and suitably secured thereon one part 285 of a conventional coupling 286, the other part 287 of which is keyed and suitably secured to one end of a short shaft 288 which is journalled in suitable bearings in the frame 270 and projects inwardly beyond said frame toward the conveyor 15. The shaft 288 is driven through the described driving connections therefor with the cam shaft 50 to make one complete revolution for each cycle of operation of the machine and, hence, the shaft 288 may be correctly referred to as the cam shaft for the cover sheet stripping mechanism 16.

The cam shaft 288 has keyed and suitably secured thereon a hub 289 to which is bolted or otherwise suitably secured a cam 290 which engages a cam follower 291 journalled on and at the free lower end of a lever 292. This lever 292 is releasably clamped for adjustment purposes at the upper end thereof to a short rock shaft 293. The shafts 288 and 293 extend transversely of the machine, and the shaft 293 is journalled at opposite ends thereof in suitable bearings provided in inner and outer portions of the bracket 275. The cam follower 291 is yieldingly held in engagement with the cam 290 by a coil extension spring 294 having one end thereof connected to the lever 292 and the opposite end connected at 295 to the conveyor frame 170. Keyed and suitably secured to the inner end of the rock shaft 293 is a spur pinion 296 which is disposed within a shallow chamber 297 formed in the inner face of the inner portion of the bracket 275. The inner portion of the bracket 275 is bifurcated to receive the rear end of an arm 298 which projects forwardly of said bracket above the conveyor 15. The arm 298 is releasably clamped for adjustment purposes at the inner end thereof to a short transverse pin 299 which is journalled in suitable bearings in the bracket 275 and has keyed and suitably secured thereto a spur pinion 300 which meshes with the spur pinion 296. The spur pinions 296 and 300 are normally concealed by a cover plate 301 which is removably secured in a suitable manner to the bracket 275. The arm 298 has secured in the free forward end thereof two pins 302 which are transversely aligned and spaced apart such that the distance between the axes thereof is equal to the distance between the axes of two of the holes 8 in the adhesive sheet 7 on the card 5 as spaced transversely or across the smaller dimension of said card. The card stopping finger 235 is so located longitudinally of the conveyor 15 that when the card 5 is moved into engagement with and stopped by said finger and is also engaged with the side guide bar 174, the two leading holes 8 in the adhesive sheet 7 on said card will be disposed in direct vertical alignment with the pins 302 on the arm 298.

It will thus be apparent that the rock shaft 293 is cam operated in one direction and spring operated in the opposite direction by the cam 290 and spring 294, respectively, and that as a result of such rocking movement of said shaft, the arm 298 and the pins 302 thereon will be rocked through the pinions 296 and 300 downwardly toward the conveyor 15 by the spring 294, and upwardly away from said conveyor by the cam 290. Under these conditions and with a card 5 properly positioned beneath the pins 302 against the stop finger 235 and the side guide bar 174, the pins 302 upon downward movement thereof will enter the two leading holes 8 in the adhesive sheet 7 on the stopped card and engage the cover sheet 9 rearwardly of the leading edge and adjacent the opposite corners thereof, and upon continued downward movement of said pins the latter will strip opposite corner portions of the cover sheet from the adhesive sheet and deflect said corner portions downwardly beyond the card supporting plate 172 through a suitable clearance opening formed in said plate, as clearly illustrated in FIG. 24 wherein the stripped and deflected corner portions of the cover sheet are indicated at 9a.

The stripped and deflected corner portions 9a of the cover sheet 9 are temporarily held by the pins 302 in their deflected positions shown in FIG. 24 until said corner portions are firmly gripped by a gripper which is arranged beneath the card supporting plate 172 and is operated in timed relation with the operation of the pins 302. After the deflected corner portions 9a of the cover sheet 9 are gripped by the gripper, the arm 298 and the pins 302 thereon are moved upwardly by and through continued rotation of the cam 290 and returned to their original positions in which said pins are disposed clear of the line of travel of the cards and clear of the card acted upon and at rest beneath the same on the conveyor 15, as clearly shown in FIGS. 15 and 17. As more clearly shown in FIGS. 17, 18 and 24, the gripper for gripping the deflected corner portions 9a of the cover sheet 9 comprises an upwardly and forwardly inclined lever form of gripper body 305 which is keyed and suitably secured at the lower end thereof to the inner end of a sleeve 306 which extends transversely of the conveyor 15. The sleeve 306 is slidably engaged over a short rock shaft 307 and is journalled on said rock shaft for rocking movement relative thereto. The rock shaft 307 is journalled at opposite ends thereof in suitable bearings provided in brackets 308 which are bolted or otherwise suitably secured to the shelf 274 and project forwardly of said shelf to receive said shaft.

The sleeve 306 has keyed to the outer end thereof a short vertical arm 309 to the lower free end of which is pivotally connected by a pin 310 the forward end of a connecting link 311. The link 311 is pivotally connected at the rear end thereof by a pin 312 to the free end of a forwardly curved laterally offset portion of a lever 313 which is located rearwardly of the cam shaft 288 and is loosely mounted at the upper end thereof on the rock shaft 293 for rocking movement relative to said shaft. The lever 313 has journalled thereon at 314 a cam follower 315 which engages a cam 316 that is bolted or otherwise suitably secured to the hub 289. The follower 315 is yieldingly held in engagement with the cam 316 by a coil extension spring 317 having one end thereof connected at 319 to the conveyor frame 170. It will thus be apparent that the gripper body 305 is rocked by the cam 316 in a clockwise direction, i.e., forwardly and downwardly, from the position thereof shown in FIG. 17, and is returned to said position by the contracting action of the spring 317 under the control of said cam. The cam 316 and the described operating connections for the gripper body 305 are so chosen that said gripper body is rocked during each cycle of operation of the machine from the normal full line position shown in FIG. 23 to substantially the broken line position thereof shown in said figure, and that such rocking movement occurs at a speed which is accelerated to substantially the surface speed of the card 5 in moving from the cover sheet stripping mechanism 16 at the first locality toward the mechanism 17 at the second locality along the conveyor 15.

The gripper body 305 is formed at the top thereof with two transversely spaced cover sheet gripping surfaces 320 which are downwardly inclined forwardly and outwardly to receive the stripped and deflected corner portions 9a of the cover sheet 9 at substantially the same angle of inclination thereof. Disposed at opposite sides of the gripper body 305 are two gripper jaws 321 and 322 having jaw portions 323 which project inwardly over and cooperate with the gripping surfaces 320 on said body to grip the stripped and deflected corner portions 9a of the cover sheet 9 therebetween. The gripper jaw 321 is suitably secured to the upper surface of a rearwardly extending actuating arm 324, and the gripper jaw 323 is suitably secured to the outer surface of a collar 325 which is formed on one end of a transverse stub shaft 326 that is journalled in a suitable bearing in the gripper body 305 and has the arm 324 suitably secured to the other end thereof. The arm 324 has journalled thereon at the free rear end thereof a cam roller 327 which is engaged in a cam groove 328 formed in the adjacent surface of a vertically extending segmental cam 329 which is keyed at the lower end thereof to the previously described rock shaft 307.

The rock shaft 307 has keyed thereto a short vertical arm 330 to the lower free end of which is pivotally connected by a pin 331 the forward end of a connecting link 332. The link 332 is pivotally connected at the rear end thereof by a pin 333 to the free end of a forwardly curved laterally offset portion of a lever 334 which is also located rearwardly of the cam shaft 288 and is also loosely mounted at the upper end thereof on the rock shaft 293 for rocking movement relative to said rock shaft. The lever 334 has journalled thereon at 335 a cam follower 336 which engages a cam 337 that is bolted or otherwise suitably secured to the hub 289. The follower 336 is yieldingly held in engagement with the cam 337 by a coil extension spring 338 having one end thereof connected at 339 to the segmental cam 329 and the opposite end connected at 340 to the gear box 30. It will thus be apparent that the segmental cam 329 is rocked by the cam 337 in a clockwise direction from the normal position thereof shown in FIG. 16, and is returned to said position by the contracting action of the spring 338 under the control of the cam 337.

The contour of the cam 337 is so chosen, and the operation of the segmental cam 329 is so timed, that during each cycle of operation of the machine, said segmental cam is initially rocked relative to the gripper body 305 in a clockwise direction from the position thereof shown in FIG. 16 to the full line position shown in FIG. 23, and then continued in said direction in unison with and at the same accelerated speed as that of said gripper body. Under these conditions, the gripper jaws 321 and 322 will, through engagement of the cam roller 327 in the cam groove 328 in the segmental cam 329, be first rocked toward the gripper body 305 to closed positions on the deflected corner portions 9a of the cover sheet 9, as shown in FIG. 23, and upon rocking movement of said gripper body from the full line position to the broken line position thereof shown in FIG. 23, said cover sheet will be progressively peeled completely from the adhesive sheet 7 through the open end of the card aperture 6 and the opening in the plate 172, and carried away from the card 5 to a position clear of said card and said plate, as shown in broken lines in FIG. 23. Thereupon the segmental cam 329 is again first rocked relative to the gripper body 305 but in the return direction, and then continued in said direction in unison with the return movement of said gripper body, whereby the gripper jaws 321 and 322 are first rocked away from the gripper body to open positions, thus releasing the peeled cover sheet 9, and said gripper body and the segmental cam are returned to their original positions in readiness to act on the next card during the next cycle of operation of the machine.

The operation of the gripper body 305 is so timed that rocking movement of said gripper body in the cover sheet stripping or peeling direction occurs after the card 5 is released by the stop finger 235 and as said card is being advanced by the conveyor beyond said stop finger toward the next or succeeding mechanism 17. In this manner, rocking forward-downward movement of the gripper body 305 is accompanied by forward movement of the card 5, whereby accurate peeling of the cover sheet 9 progressively from the adhesive sheet 7 is achieved without tearing said adhesive sheet and without displacing the card relative to the conveyor by said peeling action. Preferably, the rocking forward-downward movement of the gripper body 305 and the starting of the card 5 from its arrested position are so relatively initiated that a minute slack in the cover sheet 9 is developed before said gripper body reaches its maximum speed and can place the cover sheet 9 under tension.

The card supporting plate 172 is undercut considerably at the location of the gripper body 305, as indicated at 341, so as to advantageously locate said body as close as possible to the card 5 resting on said plate and thereby decrease the extent of deflection of the corner portions 9a of the cover sheet 9 by the pins 302. The jaw portions 323 of the gripper jaws 321 and 322 are provided with notches 342 in the rear edges thereof to receive the pins 302 therein and thereby permit said jaw portions to fully close on the stripped and deflected corner portions 9a of the cover sheet 9. Additionally the jaw portions 323 of the gripper jaws 321 and 322 are provided with small pointed pins 343 which cooperate with corresponding depressions or recesses 344 formed in the gripping surfaces 320 on the gripper body 305 to either pierce or indent the deflected corner portions 9a of the cover sheet 9 and thereby augment the gripping action of said jaws so as to prevent slipping of said corner portions relative to and from between said jaws and said gripper body during the peeling of said cover sheet from the card. If desired, the pins 343 may be carried by the gripper body 305, and the companion recesses 344 may be formed in the gripper jaw portions 323.

The cover sheet 9 is supported by a curved plate-like backing member 345 during peeling thereof from the adhesive sheet 7 on the card 5 by the gripper and while the same is carried by said gripper to a position clear of said card, as hereinbefore described. The backing member 345 is of one-piece construction and is fabricated from electrically conductive material, such as sheet steel, for a purpose to be hereinafter described. The backing member 345 is slightly larger in length and width than the cover sheet 9 and is formed with side extensions 346 which straddle the gripper body 305 and by means of which said backing member is pivotally mounted intermediate the ends of said extensions, as at 347, on and at the top of said gripper body. The backing member 345 projects rearwardly of the gripper body 305, and the free forward ends of the extensions 346 of said backing member are connected together by a spreader bar 348. The gripper body 305 is recessed, as indicated at 349, at the top thereof to provide sufficient space for the spreader bar 348 to enable pivotal movement of the backing member 345 about its pivot 347.

When the gripper body 305 is in its normal position shown in FIGS. 16 and 17 to receive the stripped and deflected corner portions 9a of the cover sheet 9, the backing member 345 is disposed in the inoperative position thereof shown in FIG. 17 within the undercut portion 341 of the card supporting plate 172 and clear of said plate. However, when the gripper jaws 321 and 322 are closed upon the stripped and deflected corner portions 9a of the cover sheet and the gripper body 305 is thereafter rocked in the cover sheet peeling direction, as hereinbefore described, the backing member 345 is caused to swing upwardly into contact with the card supporting plate 172, as shown in Fig. 23, and yieldingly ride along said plate until it is clear of the latter and the cover sheet 9 is completely peeled from the card 5. Thereupon the backing member 345 is caused to swing farther forwardly relative to the gripper body 305 a predetermined extent such that it occupies the broken line position thereof shown in Fig. 23 at the end of the forward-downward active stroke of said gripper body. When the gripper jaws 321 and 322 are opened to release the peeled cover sheet 9 at the end of the active stroke of the gripper body 305, as hereinbefore described, the backing member 345 is retracted to its inoperative position with respect to said gripper body so that said backing member will clear the card supporting plate 172 upon its return movement with the gripper body.

The above described swinging movement of the backing member 345 into and out of its operative cover sheet supporting position is effected respectively in response to the closing and opening of the gripper jaws 321 and 322. For this purpose, the spreader bar 348 of the backing member 345 has connected thereto one end of a relatively light coil extension spring 350 the opposite end of which is connected at 351 to the gripper body 305. The spring 350 tends at all times to yieldingly swing the backing member 345 about its pivot 347 in a clockwise direction, as viewed in FIG. 17. Suitably secured in the actuating arm 324 for the gripper jaws 321 and 322 is a short pin 352 which projects laterally from said arm beneath the adjacent side extension 346 of the backing member 345. As shown in Fig. 17, the pin 352 is so located on the arm 324 that in the normal relative positions of said arm and the gripper body 305 with the gripper jaws 321 and 322 in open positions, the adjacent side extension 346 of the backing member 345 is engaged by said pin and through such engagement said backing member is disposed in its normal inoperative position and held against pivotal movement by the spring 350.

It will thus be apparent that when, as shown in FIG. 23, the arm 324 is rocked by the segmental cam 329 to close the gripper jaws 321 and 322 into gripping engagement with the stripped and deflected corner portions 9a of the cover sheet 9, as hereinbefore described, the pin 352 will be moved out of engagement with the adjacent side extension 346 of the backing member 345 and away therefrom a predetermined extent, thus releasing said backing member and permitting pivotal movement thereof by the spring 350 to its operative position. It will also be apparent that when the backing member 345 in its operative position has travelled clear of the card supporting plate 172 upon forward-downward pivotal movement thereof with the gripper body 305 and the gripped cover sheet 9, said backing member will be swung farther forwardly by the action of the spring 350, said movement of said backing member, however, being limited to the broken line position thereof shown in FIG. 23, through engagement of the side extension 346 with the pin 352. When the gripper jaws 321 and 322 are opened to release the peeled cover sheet 9 at the end of the active stroke of the gripper body 305, the backing member 345 in response to said gripper jaw operation is immediately retracted to its inoperative position through movement of the arm 324 and engagement of the pin 352 with the side extension 346, said backing member remaining in said inoperative position during the return movement thereof with the gripper body 305 and until the gripper jaws 321 and 322 are again closed in the next cycle of operation of the machine. When the backing member 345 is retracted to its inoperative position, said backing member and the gripper body 305 occupy the relative positions thereof shown in FIG. 17, thus permitting return movement of the backing member without striking the card supporting plate 172.

Means are provided to positively remove the peeled cover sheet 9 from the gripper when the same is released by the gripper jaws 321 and 322 at the end of the active stroke of the gripper body 305, thus assuring that said gripper is cleared of the cover sheet before the same is returned to its original position to act on the next card 5 during the next cycle of operation of the machine. As herein shown, said means comprises a small diameter idler roller 353 which is located at the top and centrally of the gripper body 305 and is disposed within a suitable clearance groove in said gripper body. The idler roller 353 is journalled at 354 on the gripper body 305 and it operates between the gripping surfaces 320 and the gripper jaws 321 and 322 on said gripper body, whereby said roller will be overlapped by the front edge portion of the cover sheet 9 gripped by said surfaces and said jaws and being peeled from the card 5. The idler roller 353 projects slightly above the gripping surfaces 320 on the gripper body 305 and it cooperates with a larger diameter rubber-tired roller 355 which is disposed adjacent the path of rocking movement of said gripper body such that it will be engaged by the peeled cover sheet 9 as the gripper body approaches the end of its active forward-downward stroke. The rubber-tired roller 355 is journalled on a transverse stub shaft 356 which is fixed at one end thereof in a bracket 357 which is bolted or otherwise suitably secured to the conveyor frame 170. The rubber-tired roller 355 is driven continuously in the cover sheet peeling direction, and for this purpose, said roller has secured thereto or formed integrally therewith a spur pinion 358 which meshes with and is driven by a similar pinion 359 which is fixed on the driven shaft 183 which carries the inclined conveyor roller 177. The pinions 358 and 359 are of the same size and the rubber-tired roller 355 is of the same diameter as that of the driven conveyor rollers and, hence, said rubber-tired roller is driven at a relatively fast surface speed the same as that of said conveyor rollers.

It will thus be apparent that as the gripper body 305 with the peeled cover sheet 9 moves to the end of its active stroke, the idler roller 353 will pass the rubber-tired roller 355 and in so doing it will momentarily press said cover sheet into contact with said rubber-tired roller. Under these conditions and since the cover sheet 9 is still gripped by the gripper jaws 321 and 322, the rubber-tired roller 355 will be ineffective to remove said cover sheet from the gripper body 305. However, when the peeled cover sheet 9 is released at the end of the active stroke of the gripper body 305 through opening of the gripper jaws 321 and 322 and said gripper body is returned to its original position, as hereinbefore described, the idler roller 353 will again move past the driven rubber-tired roller 355 and momentarily press the now released cover sheet against said rubber-tired roller, whereupon said cover sheet will be quickly ejected from said gripper body through rotation of the rubber-tired roller in the cover peeling direction which action is augmented by the movement of the gripper body in the opposite direction. A suitable waste receptacle (not shown) is provided in the machine and located beneath the rubber-tired roller 355 to receive the peeled and ejected cover sheets 9.

Detector means is provided and associated with the cover sheet gripper comprising the gripper body 305 and gripper jaws 321 and 322 for detecting the presence and absence of a peeled cover sheet 9 during rocking movement of said gripper in the cover sheet peeling direction, and causing stopping of the machine in the event a cover sheet is not present and gripped by the gripper during such rocking movement thereof. As herein shown, said detecting means includes the cover sheet backing member 345, and comprises an elongated feeler finger or probe 360 which extends longitudinally of the machine and is formed of electrically conductive material, such as brass. The feeler finger 360 is located so that the backing member 345 or the peeled cover sheet 9 supported thereby will yieldingly contact and wipe along the free rear end of said feeler finger upon each forward-downward movement of said backing member with the gripper body 305 and forward pivotal movement thereof by the spring 350. The feeler finger 360 is arranged to contact the backing member 345 centrally thereof and is slidably engaged at the forward end thereof in a suitable opening formed in a block 361 of insulating material, such as fiber, which is suitably secured to the conveyor frame 170. The feeler finger 360 is adjustably clamped in the block 361 by a contact element 362 which is carried by said block and extends at right angles to said feeler finger. The contact element 362 has connected thereto one end of a conductor 363 which, together with the backing member 345, is connected in the electrical control circuit for the machine, as illustrated in FIG. 58 and to be hereinafter described in detail. The backing member 345 forms in effect a circuit terminal as indicated in FIG. 58, and is connected in the electrical control circuit to ground through the frame struture of the machine which is represented by the conductor 364 in said figure.

It will be apparent that as long as the backing member 345 is shielded by a peeled cover sheet 9 during each forward-downward movement of the gripper during the normal operation of the machine, the feeler finger 360 will not be directly contacted by said backing member and, hence, the electrical control circuit in which said backing member and said feeler finger are connected will remain open or broken and the mahine will continue to operate in its usual normal manner. However, should the cover sheet stripping and deflecting pins 302 fail, for some reason, to strip and/or deflect the corner portions 9a of the cover sheet 9 so that the gripper jaws 321 and 322 cannot grip the same, or should said gripper jaws fail, for some reason, to grip the stripped and deflected corner portions of the cover sheet, the backing member 345 being thus exposed in either case will directly contact and wipe along the feeler finger upon forward-downward movement thereof with the gripper, thus closing the circuit to effect stopping of the machine in a manner to be hereinafter described.

As previously described, the backing member 345 is slightly longer than the length of the cover sheet 9 and, hence, said backing member will project slightly beyond the trailing edge of the peeled cover sheet supported thereby. In order to prevent a false detecting operation by the feeler finger 360 and unnecessary stopping of the machine through contact of said feeler finger with the unshielded rear edge portion of the backing member 345 protruding beyond the trailing edge of the peeled and gripped cover sheet 9, said backing member is provided with a gap 365 centrally and at the rear edge thereof, and a strip 366 of insulating material, such as fiber, is secured to the underside of the backing member and extends across said gap.

As the card 5 is advanced by the driven conveyor rollers 176 and 177 beyond the first stop finger 235, and the cover sheet 9 is being peeled therefrom by the gripper as previously described, said card is received in the form shown at 5a in FIG. 4a by the driven conveyor roller 178 and further advanced, at about which time the stop fingers 235, 236 and 237 are again lowered to their respective card arresting positions inaugurating the next cycle of operation of the machine. A new card 5 with cover sheet 9 is then advanced from the feeder into engagement with the first stop finger 236 as previously described, and the card 5a with the cover sheet 9 removed therefrom is advanced by the driven conveyor roller 178 along the side guide bar 174 until it engages the second stop finger 236. Engagement of the card 5a with the stop finger 236 stops said card for a predetermined interval in a predetermined position at which the central portion of the adhesive sheet 7 is di-cut therefrom by the die mechanism 17, thereby forming the card 5b shown in FIG. 4b, having a window opening 10 in the adhesive sheet which is located centrally with respect to the card aperture 6 and smaller in size than said aperture, leaving an inner marginal portion of said adhesive sheet extending into the card aperture around its edges. The window opening 10 is of such size and is so formed that the four inner edges of the adhesive sheet 7 defining said window opening are exactly tangent with the outside of the four holes 8 in said adhesive sheet, thus advantageously leaving rounded inner corners in the adhesive sheet to prevent tearing of said sheet during subsequent handling of the card.

ADHESIVE SHEET DIE MECHANISM

FIGS. 1, and 25 to 34, inclusive

The adhesive sheet die mechanism 17 is located outwardly and at the side guide side of the conveyor 15 and comprises a frame 370 which is mounted on and bolted to the base plate or platform 22. The die mechanism 17 is quickly and easily located in its proper operating position longitudinally and laterally of the machine by a key, keyway and stop block arrangement the same as employed in connection with the previously described cover sheet stripping mechanism 16, the stop block only being shown and appearing in FIG. 1 and indicated at 371. The frame 370 projects upwardly from the platform 22 beyond the top of the conveyor 15, and for purposes which will presently be seen, said frame is constructed to include two side members 372 and 373 which are spaced longitudinally of the machine, a transverse connecting shelf 374 adjacent the top of said frame, and four vertically spaced transverse connecting members 375, 376, 377 and 378 at the front of said frame, the members 375 and 376 being located above the conveyor 15 and the members 377 and 378 being located beneath said conveyor.

The various operable parts of the die mechanism 17 are driven through driving connections therefor with the cam shaft 50. For this purpose, the frame 370 has journalled in suitable bearings provided in the lower portions of the side members 372 and 373 thereof a short shaft 379 which extends longitudinally of the machine and transversely of said frame and is located coaxially with the cam shaft 50. The shaft 379 forms in effect an extension of the cam shaft 50 and is connected to said cam shaft by a conventional disc type coupling 380 one part of which is keyed and suitably secured to the cam shaft 50 and the other part of which is keyed and suitably secured to the shaft 379 and both of said parts being bolted or otherwise suitably secured together. Bolted or otherwise suitably secured to the driven disc of the coupling 380 is a sprocket 381 around which passes a chain 382 which extends upwardly from said sprocket and also passes around a similar sprocket 383. This sprocket 383 is keyed and suitably secured to one end of a short shaft 384 which extends transversely of the frame 370 and is journalled in suitable bearings in the side members 372 and 373 of said frame. Slack in the chain 382 is compensated for by an idler sprocket 385 which is journalled on and at the free end of an arm 386 which is adjustably clamped to a stud 387 carried by the side member 372 of the frame 370. The shaft 384 is driven through the described driving connections therefor with the cam shaft 50 to make one complete revolution for each cycle of operation of the machine and, hence, the shaft 384 may be correctly referred to as the cam shaft for the die mechanism 17.

Disposed between the side members 372 and 373 of the frame 370 and keyed and suitably secured to the cam shaft 384 is a stepped hub 388 which spans substantially the entire distance between said side members. Engaged over the hub 388 and bolted or otherwise suitably secured thereto is a cam 389 which engages a cam follower 390 which is journalled on and at the free end of a short arm 391. This arm 391 is pivotally mounted at the other end thereof on and at the free rear end of one arm 392 of a horizontal lever 393 having another arm 394. This lever 393 is employed to impart vertical reciprocating movement to a die which will presently be described. The arm 391 is formed with a depending lug 395 within which is adjustably threaded a bolt 396 which engages the arm 392 of lever 393 and is locked in adjusted positions by a lock nut 397. The cam follower 390 may thus be adjusted relative to the lever 393 toward and away from the cam 389 by rotating the bolt 396 in the proper direction, whereby the stroke of said lever and, hence, the pressure of the die operated thereby may be adjusted to a desired degree. The lever 393 is clamped to a transverse stub shaft 398 which is journalled at opposite ends thereof in suitable bearings in the side members 372 and 373 of the frame 370. The cam follower 390 is yieldingly held in engagement with the cam 389 by a coil extension spring 399 having one end thereof connected at 400 to the lever 393 and the opposite end connected at 401 to a similar lever 402 to be hereinafter referred to.

The arm 394 of lever 393 extends forwardly of the frame 370 between the transverse members 377 and 378 of said frame and is forked so as to partly surround and extend on opposite sides of a strong vertically disposed tube 403. The tube 403 is formed with an external downwardly facing annular shoulder 404, and is journalled for straight-line vertical reciprocating movement in suitable bearings provided in the transverse members 377 and 378 of the frame 370 and in bearing caps 405 and 406 which are bolted or otherwise suitably secured to said frame members, respectively. The arm 394 of lever 393 has pivotally connected thereto at opposite sides of the tube 403 by studs 407 the lower ends of vertical links 408 the upper ends of which are pivotally connected by pins 409 to a ring or collar 410 which surrounds said tube and is positioned in abutting relation with the shoulder 404 on the tube, said pins being suitably secured in or formed integrally with said ring. The ring 410 is keyed to the tube 403 against relative rotation and is also suitably secured to said tube. In order to further prevent rotation of the tube 403 relative to the ring 410 and the frame 370, said ring is formed with a flat forwardly projecting lug 411 which is slidably fitted in an elongated vertical slot 412 formed in a guide block 413 which is recessed into the bearing cap 405 and bolted or otherwise suitably secured thereto. It will thus be apparent that the tube 403, through the described operating connections therefor with the cam lever 393, will be raised by the cam 389 and will be lowered by the spring 399 under the control of said cam, and that such raising and lowering movements of said tube will occur once during each cycle of operation of the machine.

The relative positions of the tube 403 and the second card stop finger 236 are such that with the card 5a engaged with and stopped by said finger, the vertical axis of said tube passes through the center of the aperture 6 in said card. In the normal lowered position of the tube 403 as shown in FIG. 25, the upper end of said tube projects upwardly beyond the bearing cap 405 and is spaced downwardly from the card supporting plate 172 a predetermined distance. Resting on top of the tube 403 and secured thereto, as by machine screws 414, is a die holder 415 which is formed to include centrally thereof an upwardly projecting rectangular block 416 having a rectangular opening 417 extending vertically therethrough and communicating with the interior of said tube the inner diameter of which is somewhat larger than the longer dimension of said opening. The die holder 415 is rotatably positioned on the tube 403 such that the four sides of the block 416 and the four edges of the opening 417 therein are parallel to the four edges of the aperture 6 in the card 5a as positioned on the conveyor against the stop finger 236 and the side guide bar 174. The size of the opening 417 in the block 416 is the same as the size of the central portion of the adhesive sheet 7 which is to be die-cut from said adhesive sheet to form the window opening 10 therein, said central portion, in the illustrated embodiment, being that portion of the adhesive sheet containing the four holes 8.

Positioned to rest on and extend lengthwise of the opposed longitudinal rims of the block 416 are two flat cutting knives 418. The confronting inner plane surfaces of the knives 418 are flush with the confronting longitudinal walls of the opening 417 and terminate at the tops thereof in cutting edges 419 which are square with the vertical axis of the tube 403. The length of the cutting edges 419 of the knives 418 is equal to the distance between the centers of the front and rear holes 8 in the adhesive sheet 7 on the card 5. The knives 418 are secured, as by machine screws 420, to backing plates 421 which, in turn, are secured, as by machine screws 422, to the outer longitudinal surfaces of the block 416. Positioned to rest on and extend lengthwise of the opposed transverse rims of the block 416 are two flat cutting knives 423 the confronting inner plane surfaces of which are flush with the confronting transverse walls of the opening 417 and terminate at the tops thereof in cutting edges 424 which are also square with the vertical axis of the tube 403. The length of the cutting edges 424 of the knives 423 is less than the length of the bodies of said knives, but is equal to the distance between the centers of the near and far holes 8 in the adhesive sheet 7 on the card 5. The length of the bodies of the knives 423 is such that they span the knives 418 and are snugly confined between the backing plates 421 which serve to hold the knives 423 against any endwise horizontal displacement. The knives 423 are firmly pressed against the ends of the knives 418 and held against upward and outward displacement by cone-pointed setscrews 425 which are threaded in suitable threaded openings formed in backing plates 426 and are engaged in suitable depressions or recesses in the knives 423. The backing plates 426 are secured, as by machine screws 427, to the outer transverse surfaces of the block 416. The cutting edges 419 and 424 of the knives 418 and 423, respectively, are all located in the same horizontal plane, and in the normal lowered position of the tube 403, said cutting edges are located a predetermined distance away from the line of travel of the cards.

It will be apparent that when the die comprising the knives 418, 418 and 423, 423 is moved upwardly through a suitable clearance opening formed in the card supporting plate 172 and is projected into the aperture 6 in the card 5a, the cutting edges 419, 419 and 424, 424 of said knives, respectively, will engage the adhesive sheet 7 on said card under pressure and along parallel longitudinal and transverse lines tangent to the outside of the holes 8 in said adhesive sheet. Under these conditions, the central portion of the adhesive sheet 7 will be die-cut from said sheet by the knives 418, 418 and 423, 423 in cooperation with an upper cutting block 428, thereby forming a rectangular opening 10 of a desired size in the adhesive sheet and leaving a rectangular marginal portion of said sheet projecting into the card aperture 6 and having rounded inner corners.

The cutting block 428 is located above the conveyor 15 and the card 5a resting on said conveyor, and is carried by and at the lower end of a strong vertically disposed tube 429 which is positioned coaxially with the lower die tube 403. The cutting block 428 and the tube 429 are formed with confronting wedge-shaped flanges 430 and 431, respectively, and for replacement purposes, said block is removably mounted on said tube by a split ring clamp 432 which surrounds said flanges and is formed with an internal annular groove 433 to receive the flanges therein. The groove 433 is formed with opposed tapering surfaces which mate with the tapering surfaces of the flanges 430 and 431, respectively, whereby the cutting block 428 will be firmly drawn axially toward the tube 429 by the clamp 432 by a wedging action. The two parts of the ring clamp 432 are pivotally connected together by a link 434 to enable separation of said parts and opening and closing of said clamp. The two parts of the ring clamp 432 are drawn together by a bolt 435 which is threaded in a pivot pin 436 loosely mounted in one of said parts and is loosely received in clearance slots formed in both of said parts to enable pivotal movement of said bolt to clamp opening and closing positions. In order to alleviate shock and to cushion the action of the die 418, 423, a disc or annular pad 438 of rubber or other suitable cushioning material is interposed between the cutting block 428 and the tube 429. The cutting block 428 and the cushion disc 438 are properly centered on the tubes 429 by two diametrically opposite locating pins 439 which are suitably secured in said tube and project downwardly therefrom into suitable axially aligned openings formed in said block and said disc. The diameter of the cutting block 428 is substantially equal to the longer dimension of the adhesive sheet 7 on the card 5.

The tube 429 is formed with an external upwardly facing annular shoulder 440, and is journalled for straight-line vertical reciprocating movement in suitable bearings provided in the transverse members 375 and 376 of the frame 370 and in bearing caps 441 and 442 which are bolted or otherwise suitably secured to said frame members, respectively. Vertical reciprocating movement is imparted to the tube 429 and the cutting block 428 thereon by the lever 402 previously referred to. This lever 402, like the lever 393, is disposed between the side members 372 and 373 of the frame 370 and has one arm 443 which projects toward the back of said frame, and another arm 444 which projects toward and beyond the front of said frame and is forked so as to partly surround and extend on opposite sides of the tube 429. The lever 402 is clamped to a transverse stub shaft 445 which is journalled at opposite ends thereof in suitable bearings in the side members 372 and 373 of the frame 370. The arm 444 of the lever 402 has pivotally connected thereto at opposite sides of the tube 429 by studs 446 the upper ends of vertical links 447 the lower ends of which are pivotally connected by pins 448 to a ring or collar 449 which surrounds said tube and is positioned in abutting relation with the shoulder 440 on the tube, said pins being suitably secured in or formed integrally with said ring. The ring 449 is keyed to the tube 429 against relative rotation and is also suitably secured to said tube. In order to further prevent rotation of the tube 429 relative to the ring 449 and the frame 370, said ring is formed with a flat forwardly projecting lug 450 which is slidably fitted in an elongated vertical slot 451 formed in a guide block 452 which is recessed into the bearing cap 442 and is bolted or otherwise suitably secured thereto.

The arm 443 of lever 402 has pivotally mounted thereon at the free end thereof an arm 453 having journalled thereon a cam follower 454 which engages a cam 455 that is engaged over and is bolted or otherwise suitably secured to the hub 388 on the cam shaft 384. The arm 453 is formed with an upstanding lugs 456 within which is adjustably threaded a bolt 457 which engages the arm 443 of lever 402 and is locked in adjusted positions by a lock nut 458. The cam follower 454 may thus be adjusted relative to the lever 402 toward and away from the cam 455 by rotating the bolt 457 in the proper direction, whereby the stroke of said lever and, hence, the extent of downward movement of the cutting block 428 may be regulated to a desired degree and such that said block just contacts the upper surface of the adhesive sheet 7 on the card 5a. The cam follower 454 is yieldingly held in engagement with the cam 455 by the spring 399, and in order to insure continued engagement of said cam follower with said cam, as well as the cam follower 390 with the cam 389, two of said springs are preferably employed and connected in side-by-side relation to the levers 402 and 393. It will thus be apparent that the tube 429 and the cutting block 428 thereon, through the described operating connections therefor with the cam lever 402, will be lowered by the cam 455 and will be raised by the springs 399 under the control of said cam, and that such lowering and raising movements of said tube and said block will occur once during each cycle of operation of the machine.

In the normal raised position of the tube 429, as shown in FIG. 25, the cutting block 428 is spaced upwardly away from the line of travel of the cards substantially the same distance that the die 418, 423 is spaced downwardly away from said line of card travel in the normal lowered position of the tube 403. The operations of the die 418, 423 and the cutting block 428 are so timed that said die and said block are moved in unison toward and away from each other, whereby the die and the block will simultaneously engage the lower and upper surfaces, respectively, of the adhesive sheet 7 on the card 5a, and after a predetermined interval said die and said block will simultaneously move away from and clear of said card so that the latter may be moved to the next station. It will be apparent that upon engagement of the die 418, 423 and the cutting block 428 with the adhesive sheet 7 on the card 5a as described, said die will press said adhesive sheet against said block and thereby die-cut the center portion of the adhesive sheet, and the block, in addition to providing a cutting surface for the die to operate against, serves to hold said card against the supporting plate 172 and against upward displacement from said plate by said die during the cutting operation on the adhesive sheet.

Means are provided for moving the die-cut center portion of the adhesive sheet 7 away from the cutting block 428 and beyond the cutting edges 419, 419 and 424, 424 of the die to a position completely clear of said cutting edges and the card 5a so as to insure that said card is devoid of the die-cut center portion when advanced to the next station and that said center portion will present no interference to the movement of subsequent cards and to the proper operation of the die and cutting block on said cards. As herein shown, said means comprises a rectangular vacuum shoe 459 which is centrally located with respect to the cutting block 428 and is normally disposed within a corresponding clearance opening 460 formed in and extending axially through said block. The length and width of the shoe 459 is slightly less than that of the die-cut window opening 10 in the adhesive sheet 7 on the card 5a so as to enable vertical movement of said shoe therethrough. The shoe 459 is formed in the lower surface thereof with a shallow chamber 461 which, except for a narrow rim around said shoe, extends over the entire area of said surface. The chamber 461 is closed by a perforated cover plate 462 which is secured to the shoe 459, as by machine screws 463, the perforations in said plate communicating with the chamber 461 and being distributed substantially over the entire area of said plate. The shoe 459 is integrally formed with and at the lower end of a short annular member 464 which projects upwardly from said shoe into the tube 429 and is slidably fitted in a flanged bushing 465 which is suitably secured in the lower end of said tube, as by a press fit.

The annular member 464 is counterbored for a major portion of the length thereof to receive therein the lower end of an elongated tube 466, and said member is provided in the base portion thereof with a series of circumferentially spaced vertical ports or passages 467 which communicate at the upper ends thereof with the interior of the tube 466 and at the lower ends thereof with the chamber 461 in the shoe 459. For purposes to be hereinafter described, the annular member 464 and the tube 466 are provided with a series of continuously registering relief ports 468 and 469, respectively, which extend radially therethrough and are equally spaced around the same, and the bushing 465 and tube 429 are provided with a corresponding series of continuously registering relief ports 470 and 471 which extend radially therethrough and are correspondingly spaced around the same. In the normal raised retracted position of the vacuum shoe 459, the relief ports 468 and 469 are axially spaced upwardly from and out of communication with the relief ports 470 and 471.

The tube 466 is received at the upper end thereof in the lower larger diameter portion 472 of a stepped counterbore in a cap 473 which is slidably fitted in the upper end of the tube 429 and projects upwardly beyond said tube, the upper smaller diameter portion of said counterbore being indicated at 474 and forming in said cap an axial annular chamber 475 which extends substantially to the top of the cap. The vacuum shoe 459, the tube 466, and the cap 473 are connected together as a single unit by a vertical draw rod 476 which extends centrally through the cap, the counterbore 472, 474, and the tube 466, and is threadedly connected at the lower end thereof to the base portion of the annular member 464 of said vacuum shoe. The rod 476 projects upwardly beyond the cap 473 and has threaded thereon a nut 477 which is firmly tightened against said cap. The rod 476 is of a diameter less than the inside diameter of the tube 466 and that of the chamber 475 in the cap 473. It will thus be seen that the chamber 461 in the vacuum shoe 459 is connected with the chamber 475 in the cap 473 through the ports 467 and the tube 466.

Reciprocating movement is imparted at predetermined intervals to the unit comprising the vacuum shoe 459, the tube 466 and the cap 473 relative to the tube 429 and the cutting block 428, and for this purpose, said cap is formed with a flange 478 adjacent the top thereof. Engaged with the upper surface of the flange 478 and symmetrically disposed at opposite sides of the central axis of the cap 473 are two wear buttons 479 which are suitably fixed in the free forked end of one arm 480 of a bellcrank lever 481 having another arm 482 which extends downwardly at an angle toward the rear of the frame 370. The bell-crank lever 481 is located between the side members 372 and 373 and above the shelf 374 of the frame 370, and is clamped to a transverse stub shaft 483 which is journaled at opposite ends thereof in suitable bearings in said side members. The arm 482 of the bellcrank lever 481 projects downwardly through a suitable clearance opening formed in the shelf 374 and has pivotally mounted thereon at the free end thereof an arm 484 having journalled thereon a cam follower 485. This cam follower 485 engages a cam 486 which is engaged over and is bolted or otherwise suitably secured to the hub 388 on the cam shaft 384, said cam being positioned between the cams 389 and 455 on said hub.

The arm 484 is formed with a lug 487 within which is adjustably threaded a bolt 488 which engages the arm 482 of the bell-crank lever 481 and is locked in adjusted positions by a lock nut 489. The cam follower 485 may thus be adjusted relative to the bell-crank lever 481 toward and away from the cam 486 by rotating the bolt 488 in the proper direction, whereby the stroke of said lever and, hence, the extent of downward movement of the vacuum shoe 459 may be regulated as desired. The cam follower 485 is yieldingly held in engagement with the cam 486 by a coil compression spring 490 which is located within the tube 429 and surrounds the tube 466 and engages at one end thereof against the inner lower surface of the cap 473 and at the opposite end thereof against a washer 491 which is engaged over the tube 466 and rests on the inner upper surface of the bushing 465. Rotation of the unit comprising the vacuum shoe 459, the tube 466, and the cap 473 relative to the tube 429 in all axial positions of said unit is prevented by a tubular stem 492 which is threaded at one end thereof in a suitable threaded opening formed in the cap 473 and communicates through said opening with the chamber 475 in said cap for a purpose to be hereinafter described. The stem 492 projects outwardly from the cap 473 and has its other end slidably fitted in an elongated vertical slot 493 formed in a guide block 494 which is recessed into the bearing cap 441 and is bolted or otherwise suitably secured thereto.

When the cutting block 428 is disposed in its normal raised position, the vacuum shoe 459 is also disposed in its raised position and such that the lower surface of the perforated cover plate 462 is flush with or slightly retracted with respect to the cutting surface of said cutting block. It will be apparent that the vacuum shoe 459 will be lowered by the cam 486 and will be raised by the spring 490 under the control of said cam, and that such raising and lowering movements of said shoe will occur once during each cycle of operation of the machine. The cam 486 and the bell-crank lever 481 are so chosen that with the cutting block 428 and the die 418, 423 in their lowered and raised operative positions, respectively, shown in FIG. 28, the vacuum shoe 459 will be moved downwardly through the die-cut window opening 10 in the adhesive sheet 7 on the card 5a into the die to a position such that the lower surface of the perforated cover plate 462 is slightly below the top of the die holder block 416, as shown in broken lines in FIG. 28, whereby the die-cut center portion of the adhesive sheet gripped by vacuum by said shoe will be carried by the latter to said position.

The operation of the vacuum shoe 459 is so timed that it is moved downwardly immediately after the cutting block 428 begins its downward movement towards the card 5a in unison with the upward movement of the die 418, 423, whereby said shoe will reach the adhesive sheet 7 on said card and grip the center portion of said sheet at about the same time that said center portion is die-cut from the sheet. Thereupon, the gripped die-cut center portion of the adhesive sheet 7 is carried downwardly away from the card 5a by the vacuum shoe 459 upon continued downward movement thereof. As the vacuum shoe 459 approaches its lowermost position, vacuum in the chamber 475, the tube 466, the passages 467, the chamber 461 and the perforations in the cover plate 462 is broken, and the ports 468 and 469 register with the ports 470 and 471, thus connecting said perforations, said chambers, said passages, and said tube with the atmosphere and causing the vacuum shoe 459 to release the die-cut center portion of the adhesive sheet 7 at said position. When the vacuum shoe 459 reaches its lowermost position, it is immediately raised and returned to its original position through the resulting window opening 10 in the adhesive sheet 7 on the card 5a. During this return movement of the vacuum shoe 459, the card 5a is held by the cutting block 428 against movement until said shoe is clear of said card, whereupon said block and the cutting die 418, 423 are also moved away from the card in unison to their original positions, and the vacuum shoe continues its return movement to its original position in unison with the cutting block.

When the die-cut center portion of the adhesive sheet 7 is released by the vacuum shoe 459, as above described, said center portion will fall from said shoe through the die holder 415 and the tube 403 into a suitable receptacle (not shown) which is provided in the machine and is located beneath the lower open end of said tube. However, in order to prevent the released and falling die-cut center portion of the adhesive sheet 7 from flying about within the tube 403 because of the feather weight thereof and possibly clinging to said tube and the die holder 415, means in the form of an annular choke plate 495 is provided for temporarily arresting the falling movement of said center portion before it reaches the tube 403 and for causing it and sequent die-cut center portions to build up in the die holder 415 into the form of a pad of adhering center portions, as indicated at 496, in broken lines in FIG. 28. In this manner, the die-cut center portions are held against falling into and through the tube 403 until the pad 496 thereof has increased in thickness sufficiently so that it will be engaged at the top thereof by the vacuum shoe 459 and thereby gradually forced through and beyond the choke plate 495, whereupon small sections of said pad will break away from the lower end of the pad, as indicated at 497, in broken lines in FIG. 28, and said sections because of the added weight thereof will fall freely through the tube 403. The choke plate 495 is located between and immovably held by the tube 403 and the die holder 415 and is formed with a restricted rectangular opening 498 which is slightly smaller in length and width than that of the die-cut center portion of the adhesive sheet and is formed so that the edges of said plate defining said opening are slightly chambered downwardly and inwardly.

Since the pad 496 of the die-cut center portions in effect closes the opening 417 in the die holder 415, the latter is vented by means of transverse slots 499 to permit escape of the air created within said holder between said pad and the vacuum shoe 495 through downward movement of said shoe with the die-cut center portion adhering by vacuum thereto. The slots 499 are formed in the upper surfaces of the four walls of the block 416 and they communicate with the opening 417 and with the atmosphere through horizontal openings 500 (FIG. 25) in the backing members 421 and vertical channels 501 formed in and extending upwardly through the backing members 426. It is to be noted that due to the presence of the pad 496 of die-cut center portions in the die holder 415, each subsequent die-cut center portion will be pressed by the shoe 495 against the top of said pad, thus causing said subsequent center portion to adhere to the pad and further assuring that the shoe will be devoid of said center portion when returned to its original position.

Suitable means are provided for creating and breaking vacuum at predetermined intervals in the vacuum shoe 459 and as herein shown said means are mounted on and comprised by the following instrumentalities. Located beneath the plate or platform 22 and suitably secured to the supporting base 12 is a vacuum pump-electric motor unit, the pump being seen in FIG. 1 and indicated at 502, and the electric motor being shown diagrammatically in FIG. 58 and indicated at 503 and controlled for starting and stopping purposes by a manually operated switch which will be later explained in connection with the description of the electrical control circuit for the machine. The pump and motor unit 502, 503 is of well-known construction needing no detailed description herein. The vacuum side of the pump 502 has connected therewith one end of a conduit 504 the opposite end of which is connected with a manifold 505. The manifold 505 is mounted on, and secured in any suitable manner to, the underside of the plate 22 and connected with said manifold is one end of a conduit 506. The conduit 506 extends upwardly from the manifold 505 through a suitable clearance opening in the plate 22 and has its opposite end connected to one side and adjacent the top of a block 507 which forms part of a valve unit indicated generally at 508 which is bolted or otherwise suitably secured to the outer surface of the side member 373 of the frame 370.

The conduit 506 communicates with one end of a horizontal passage 509 formed in and extending lengthwise of the valve block 507 and which, in turn communicates at the other end thereof with a bore 510 formed in and extending vertically through said block. The block 507 is formed in the bore 510 thereof with two axially spaced annular chambers 511 and 512, and with a horizontal relief passage 513 communicating with the chamber 512 and opening outwardly to atmosphere through the side of said block at which the conduit 506 is connected. The chamber 511 also communicates with the passage 509, and the passage 513 also communicates with the bore 510. The block 507 has also formed therein a passage 514 which communicates with the bore 510 and is located centrally between the chambers 511 and 512. Connected to the block 507 and communicating with the passage 514 and with the bore 510 through said passage is the lower end of a conduit 515 which extends upwardly to the top of the frame 370 and then to the front of said frame and has its other end connected to the center branch of a T-fitting 516 by an extension 517. The T-fitting 516 has connected to one side branch thereof one end of a flexible conduit 518 the opposite end of which is connected to the previously described tubular stem 492 which communicates with the chamber 475 in the cap 473. The vacuum shoe 459 which is pneumatically connected with the tubular stem 492 as previously described, is thus pneumatically connected with the vacuum pump 502 through the conduit 506, passages 509 and 514 and bore 510 in the valve block 507, and the conduit 515 leading to said stem.

Slidably mounted in the bore 510 of valve block 507 is a piston valve 519 which is formed intermediate its ends with a reduced annular portion 520 which is of a length substantially equal to the distance between the chambers 511 and 512. The lower end of the piston valve 519 is rounded and projects downwardly beyond the block 507 to engage, and to be engaged by, the free end of a horizontal arm 521 having journalled thereon at said end a cam follower 522. The arm 521 is pivotally mounted at the other end thereof on a stud 523 which is suitably secured in the side member 373 of the frame 370. The cam follower 522 engages a cam 524 which is located exteriorly of the frame 370 and is keyed and suitably secured to the cam shaft 384. The piston valve 519 is yieldingly held in engagement with the arm 521, and the cam follower 522 is, in turn, yieldingly held in engagement with the cam 524, by a coil compression spring 525 which is located between said piston valve and a cap 526 which is suitably secured to the upper surface of the block 507, said spring being recessed into said piston valve and said cap and engaging against both of the same. The cap 526 is provided in the lower surface thereof with a clearance space for the upper end of the piston valve 519, and to prevent said piston valve from becoming "air-bound" at the top of the block 507, said cap is provided with a relief port 527. The piston valve 519 is thus cam operated in one direction and spring operated in the opposite direction to respectively make and break vacuum in the vacuum shoe 459 once during each cycle of operation of the machine.

When the cam follower 522 is engaged by the high part of the cam 524 which occurs during the downward movement of the vacuum shoe 459 and before said shoe contacts the adhesive sheet 7 on the card 5a, the piston valve 519 is raised to a position such that the chamber 511 in the valve block 507 is in full communication with the passage 514 through the reduced portion 520 of said piston valve and the bore 510, and that the chamber 512 in said block and the relief passage 513 is completely closed to the passage 514 by the lower larger diameter portion of the piston valve 519, said position of said piston valve being higher than that shown in FIG. 32. Under these conditions, the vacuum supply conduit 506 and passage 509 will be connected with the conduit 515 and, hence, vacuum will be created in the chamber 461 in the vacuum shoe 459 through the extension 517, fitting 516, conduit 518, tubular stem 492, chamber 475 in the cap 473, tube 466, and the passages 467 in the member 464 to cause the die-cut center portion of the adhesive sheet 7 to adhere to the perforated plate 462 on said vacuum shoe.

When through continued rotation of the cam 524, the cam follower 522 is engaged in the low part of said cam which occurs as the downwardly moving vacuum shoe 459 approaches the end of its downward movement with the die-cut center portion of the adhesive sheet 7 adhering to the perforated plate 462 thereof, the piston valve 519 is lowered by the spring 525 to a position such that the chamber 512 in the valve block 507 is placed in communication with the passage 514 through the reduced portion 520 of said piston valve and the bore 510, and that the chamber 511, the passage 509 and the vacuum supply conduit 506 are closed to the passage 514 by the upper larger diameter portion of the piston valve 519. Under these conditions, vacuum in the bore 510 in the valve block 507 will be broken and the passage 514 will be opened to atmosphere through said bore, the chamber 512 and the relief passage 513. At about this time, the ports 468 and 469 in the member 464 and tube 466, respectively, begin to register with the ports 470 and 471 in the bushing 465 and tube 429, respectively, whereupon the vacuum shoe 459 is quickly vented to atmosphere to cause said shoe to immediately release the die-cut center portion of the adhesive sheet 7 as it reaches or just before it reaches its lowermost position.

Detector means is provided for detecting whether or not the center portion of the adhesive sheet 7 on the card 5a has been die-cut from said sheet by the die 418, 423, and for controlling the operation of control means for causing stopping of the machine in the event said center portion has not been die-cut completely or otherwise from the adhesive sheet and consequently is not present on and gripped by the vacuum shoe 459 during the downward movement thereof into the die 418, 423. As herein shown, said detector means comprises the vacuum shoe 459, and said control means comprises the following elements which are constructed, mounted and controlled as follows.

Located at the top of the frame 370 and adjacent to the path of pivotal movement of the arm 480 of the bellcrank lever 481 is a bracket 530 which is bolted or otherwise suitably secured to the upper surface of the shelf 374 of the frame 370. The bracket 530 is provided therein with a horizontal bore 531 which extends therethrough at right angles to the bell-crank arm 480 and is closed at the outer end thereof by a cap 532 which is suitably secured to said bracket, as by machine screws 533. Fitted for reciprocation in the bore 531 in the bracket 530 is a plunger 534 which is formed intermediate its ends with a reduced annular portion 535, and at the inner end thereof with a reduced stem-like annular portion 536. The plunger 534 is further formed in the reduced portion 535 thereof with a series of radially extending ports 537 which are equally spaced about said plunger portion and communicate with the bore 531 and with a bore 538 formed in and extending axially of said plunger and opening only through the outer end of the plunger. The reduced portion 535 of the plunger 534 and the ports 537 in said plunger are arranged to continuously communicate with a passage 539 which is formed in the bracket 530 and opens into the bore 531 in said bracket. Connected with the bracket 530 and communicating with the bore 531 therein through the passage 539 is one end of a conduit 540 the opposite end of which is connected to the other side branch of the T-fitting 516. Disposed within the bore 538 in the plunger 534 is a light coil compression spring 541 having one end thereof engaging against the bottom wall of said bore and the opposite end engaging against a bolt 542 which is adjustably threaded in the cap 532 and is locked in adjusted positions by a lock nut 543. The tension of spring 541 may thus be regulated as required by rotating the bolt 542 in the proper direction.

The spring 541 normally tends to project the plunger 534 outwardly of the bracket 530 toward the bell-crank arm 480 to a position such that the stem-like portion 536 of said plunger is normally disposed in the path of vertical downward movement of a cam surface 544 which is formed on the adjacent side of a vertically disposed arm 545, such outward movement of said plunger to said position being limited by a snap ring 546 which is engaged in a suitable internal groove formed in the bracket 530 and around the bore 531. This arm 545 is pivotally mounted at the lower end thereof on the bell-crank arm 480 by a stud 547 which is suitably secured in said bell-crank arm. The upper end of the arm 545 is bifurcated to receive a pin 548 which is secured in the bell-crank arm 480 and serves to hold the arm 545 in upstanding position while permitting limited pivotal movement thereof toward and away from the plunger stem 536. It will be apparent that upon downward pivotal movement of the bell-crank arm 480, the arm 545 through engagement of the cam surface 544 thereon with the projected plunger stem 536 will be rocked in a direction away from said stem. It will also be apparent that when vacuum is created in the bore 531 in the bracket 530 above the plunger 534 as viewed in FIG. 34, and the vacuum pressure is sufficient to overcome the resistance of the spring 541, atmospheric air pressure acting on the exposed lower end of said plunger will push the latter into said bracket until it engages the cap 532, whereby the projecting stem 536 of the plunger is retracted out of the path of downward movement of the cam surface 544 on the arm 545 and no pivotal movement will be imparted to said arm by said stem. The cam surface 544 on the arm 545 and the stem 536 of the plunger 534 are so relatively positioned that said cam surface will engage said stem substantially when the lower surface of the perforated plate 462 on the vacuum shoe 459 in the downward movement thereof is disposed a slight distance beyond the plane of the lower surface of the card 5a.

Arranged to be engaged by the arm 545 is one end of a horizontal plunger pin 549 which is slidably mounted in a block 550 that is bolted or otherwise suitably secured to the bracket 530. Threaded into the other end of the plunger pin 549 is a screw 551 the head of which engages the plunger 552 of a normally open micro-switch 553 having conductors 554 and 555 leading therefrom which are connected in the electrical control circuit for the machine, as illustrated in FIG. 58 and to be hereinafter described. The micro-switch 553 is suitably secured to a spacer block 556 which, in turn, is bolted or otherwise suitably secured to the upper surface of the shelf 374 of the frame 370. In the normal positions of the arm 545 and the plunger 552 of the switch 553, as shown in FIG. 33, the screw 551 is adjusted so that the head thereof just contacts said plunger and that the plunger pin 549 just contacts said arm, said screw being then locked in its adjusted position by a lock nut 557.

It will thus be apparent that when the vacuum shoe 459 during downward movement thereof toward the card 5a is connected with the vacuum pump 502 through operation of the piston valve 519 as above described, the bore 531 in the control bracket 530 is simultaneously connected with said pump through the conduit 540, T-fitting 516 and the passage 539 in said bracket, but no vacuum or substantially no vacuum will be created in said bore and said shoe because the latter is at this time open to atmosphere through the perforations in the cover plate 462 on the shoe. The control plunger 534 will thus remain in its projected position. However, when the vacuum shoe 459 upon continued downward movement thereof reaches the adhesive sheet 7 on the card 5a and the perforated plate 462 on said shoe is completely sealed by the die-cut center portion of said adhesive sheet, vacuum is immediately created in said shoe and the bore 531 in the control bracket 530, whereupon the die-cut center portion of the adhesive sheet is immediately gripped by said plate, and the control plunger 534 is simultaneously retracted into said bore out of the path of downward movement of the control arm 545 with the bell-crank arm 480. Under these conditions, the control arm 545 will not be rocked about its pivot 547 toward the switch 553 and, hence, said switch will not be actuated or closed and the machine will continue to operate in the usual normal manner. When, as above described, vacuum is broken in the vacuum shoe 459 through operation of the piston valve 519, and the die-cut center portion of the adhesive sheet is released by said shoe, vacuum is also simultaneously broken in the bore 531 in the control bracket 530, whereupon the spring 541 acts through expansion thereof to return the retracted control plunger 534 to its original projected position in readiness for operation during the next cycle of operation of the machine.

However, if the perforated cover plate 462 on the vacuum shoe 459, upon continued downward movement thereof beyond the plane of the card 5a, does not, for some reason, have the center portion of the adhesive sheet 7 adhering thereto, indicating that an abnormal condition exists in the operation of the cutting die 418, 423 and cutting block 428, the control plunger 534 will remain in its projected position since the perforations in the cover plate have not been covered and sealed by the center portion of the adhesive sheet to cause pneumatic retraction of said plunger. Under these conditions, the cam surface 544 on the control arm 545, through downward movement of said arm with the bell-crank arm 480, will engage the stem 536 of the projected control plunger 534 and through such engagement and further downward movement of said arms, the arm 545 will be rocked about its pivot 547 toward the switch 553, thereby moving the pin 549 in the same direction and actuating the plunger 552 to close the contacts of said switch. Closing of the contacts of switch 553 closes the control circuit in which said switch is connected and effects stopping of the machine in a manner to be hereinafter described. Following this, the normal condition is corrected and, if necessary, a duplicate card without the cover sheet and with the window opening in the adhesive sheet is placed on the conveyor and in engagement with the stop finger 236, and the machine is again started in a manner to be hereinafter described. The micro-switch 553 is self-opening, and when the bell-crank arm 480 is raised to its original position to raise and return the vacuum shoe 459 to its original position, the plunger 552 through opening of said switch acts to return the control arm 545 to its original position.

It is to be noted that in the event the center portion of the adhesive sheet 7 on the card 5a is not, for some reason, fully die-cut from said adhesive sheet by the die 418, 423 and cooperating cutting block 428, and said center portion is gripped by the vacuum shoe 459, said shoe upon continued downward movement thereof will effectively draw the gripped center portion of the adhesive sheet over and along the cutting edges 419, 419 and 424, 424 of the raised knives 418, 423, respectively, and thereby neatly and evenly tear said center portion from the adhesive sheet without damaging the card 5a. The card 5a will thus be conserved and retained in the machine for further processing, and said machine will continue to operate in the usual normal manner.

After the window opening 10 has been die-cut in the adhesive sheet 7 on the card 5a, resulting in the card shown at 5b in FIG. 4b, and the cutting die 418, 423, the cutting block 428, and the vacuum shoe 459 have been returned to their original positions clear of the resulting card 5b, the stop fingers 235, 236 and 237 are raised. Thereupon, the card 5b is advanced by the driven conveyor rollers 178 and 179 beyond the stop finger 236 to the driven conveyor roller 180 which acts to further advance said card toward the next station, at about which time the stop fingers 235, 236 and 237 are again lowered to their respective card arresting positions inaugurating the next cycle of operation of the machine. It will be understood that while the card 5b is being advanced toward the next station, the preceding card on the conveyor is likewise being advanced to the succeeding station, and a new card from the feeder is being advanced to the first station. The card 5b is advanced by the driven conveyor roller 180 along the side guide bar 174 toward the next station until it engages the stop finger 237. Engagement of the card 5b with the stop finger 237 stops said card for a predetermined interval in a predetermined position at which a record bearing insert or other insert and which, in the illustrated embodiment, is a frame or section of exposed image-bearing micro-film, is mounted in the aperture 6 in the card and against the adhesive surface of the marginal portion of the pressure-sensitive adhesive sheet 7 on said card. The station at which the insert is mounted in the card 5b, and in succeeding cards 5b, is the last station, and as herein shown, said station is provided with a mechanism 18 for unwinding a length of micro-film strip from a supply roll thereof; a mechanism 19 for feeding and registering the film strip; and a mechanism 20 for cutting the fed and registered film strip into individual image-bearing frames, transferring each severed film frame to card mounting position, and mounting the same in the card. These instrumentalities will be described in the order named and they are constructed, mounted and operated as follows.

FILM UNWINDING MECHANISM

*FIGS. 1, and 46 to 50, inclusive*

The machine is capable of handling a relatively large supply of insert material whereby frequent stopping of the machine for reloading purposes is advantageously avoided, and an increased hourly output of finished cards with inserts mounted therein is advantageously obtained. In this connection, it is pointed out that the supply of cards 5 in the feeder 14 may be and is replenished while the machine is in operation. In the illustrated embodiment, the insert material is in the form of individual frames of exposed image-bearing micro-film, as indicated at 11 in FIG. 4c. It is to be understood that the machine of the present invention is capable of and may be used for mounting inserts of other types and other materials in such and other cards for various purposes, as desired.

The individual micro-film inserts 11 are cut from a supply strip 575 bearing image areas 576 spaced therealong and separated by line-spaces or areas 577 which, as well known in the photographic art, may either be opaque areas or clear transparent areas. The film supply strip 575, as presented to the machine, is wound upon a core 579 forming a roll 578 thereof, and for the purpose of relieving the film strip feeding means of the strain of unwinding the film strip directly from the large and heavy roll thereof, separate power actuated mechanism is provided for unwinding the film strip from the supply roll as required during the normal operation of the machine, and for forming and maintaining at all times in the machine a free loop of said strip. In this manner, the film strip is drawn from the free loop thereof which presents substantialy no frictional drag or load on the feeding means, with the result that accurate uniform feeding of given lengths of the film strip by the feeding means is always obtained, and accurate cutting from said strip of individual image-bearing sections of a given length is always assured.

As herein shown, the various stationary and movable parts of the film unwinding mechanism 18, including the film supply roll 578, are mounted on an L-shaped frame 580 which is bolted or otherwise suitably secured to the base plate or platform 22. The film unwinding mechanism 18 is quickly and easily located in its proper position longitudinally and laterally of the machine by a key, keyway and stop block arrangement the same as employed in connection with the previously described mechanisms 16 and 17, the stop block and stop bolt therein only being shown and appearing in FIG. 46 and indicated at 581 and 582, respectively. For purposes which will presently be seen, the frame 580 is located forwardly of the conveyor 15 and near the front end of the platform 22, and such that the upwardly projecting portion thereof is located at the side guide side of said conveyor and is spaced a short distance outwardly from the line of travel of the cards. The vertical portion of the frame 580 extends well above the line of travel of the cards so as to accommodate the large diameter film supply roll 578. The frame 580 has secured to the outer surface of the vertical portion thereof a plate 583 which provides a smooth inner wall for the film supply roll 578.

The film supply roll 578 is mounted in a novel manner on the frame 580 for free and easy rotation relative to said frame. For this purpose, the film supply roll 578 is engaged over a short sleeve 584 which is slidably received in a corresponding opening in the core 579. The sleeve 584 has suitably secured to the outer end thereof a knob 585 for manually rotating the film supply roll 578, and said knob has suitably secured thereto an annular plate 586 which serves as a retaining wall for said film supply roll. The unit comprising the film supply roll 578, the sleeve 584, knob 585 and plate 586 is slipped over and rotatably supported by a spindle 587 which is secured to the frame 580 adjacent the upper end thereof by a nut 588, said unit being removably retained on said spindle by two spring-pressed detents 589 which are carried by the spindle and project radially therefrom into an annular groove 590 formed in the inner wall of the sleeve 584. Engaged over and surrounding the spindle 587 are two anti-friction needle bearings 591 which provide for substantially frictionless rotation of the film supply roll 578. The spindle 587 is counterbored to receive therein snap rings 592 for retaining the detents 589 in said spindle when the sleeve 584 is disengaged therefrom and removed from the spindle to reload the machine with a new supply roll of film.

The film supply strip 575 is led downwardly from the rear side of the supply roll 578 between a rubber-tired feed roller 593 and a cooperating rubber-tired pressure roller 594. From the rollers 593 and 594 the film supply strip 575 is led in slack condition to a horizontal guide 595 so as to form between said guide and said rollers a free loop 596 of said strip. The guide 595 forms part of the film strip feeding and registering mechanism 19 to be hereinafter described. The feed roller 593 is fixed on one end of a stub shaft 597 which projects through a suitable clearance opening in the plate 583 and is journalled at the other end thereof in a suitable bearing in the vertical portion of the frame 580. The feed roller 593 is intermittently rotated during the normal operation of the machine to unwind the film strip 575 from the supply roll 578 as required and thereby maintain at all times in said machine a free loop of said film strip. For this purpose, there is provided a separate electric motor 598 which is of the conventional gear reducing type, needing on detailed description herein. The motor 598 is bolted or otherwise suitably secured to the inner surface of the vertical portion of the frame 580, and the output shaft 599 of said motor has fixed thereon a spur gear 600 which meshes with a somewhat larger spur gear 601 that is fixed on the feed roller shaft 597. The feed roller 593 will thus be rotated by the motor 598 at a desired and proper speed to gently and smoothly unwind the film strip 575 from the supply roll 578 in cooperation with the pressure roller 594. The pressure roller 594 is journalled on a pin 602 which is secured at the outer end thereof to a flanged arm 603 which is disposed outwardly of said roller. The arm 603 is pivotally mounted on the vertical portion of the frame 580 by a stub shaft 604 which is secured in an elongated hub on said arm and projects through a suitable clearance opening in the plate 583 and is journalled in a suitable bearing in said frame portion. The arm 603 and consequently the pressure roller 594 carried thereby is yieldingly urged toward the feed roller 593 by a coil extension spring 605 to maintain said pressure roller engaged with the film supply strip 575 and to yieldingly press the latter against said feed roller. The spring 605 is located at the inner side of the vertical portion of the frame 580 and has one end thereof connected at 606 to said frame portion and the other end connected to the free end of an arm 607 which is secured to the projecting inner end of the stub shaft 604.

During the normal operation of the machine, the electric motor 598 is controlled such that it is started to effect rotation of the feed roller 593 and unwinding of a length of the film strip 575 thereby from the supply roll 578 when the free loop 596 of said strip has become reduced to a predetermined size and before it has completely disappeared, and is stopped to discontinue such unwinding of the film strip when the free loop is again increased to a predetermined normal size. When the free loop 596 is reduced to the desired minimum size thereof it extends below the rollers 593 and 594 to the upper broken line position shown in FIG. 46, and when said loop is increased to the desired maximum size thereof it extends farther below said rollers to the position shown in FIG. 50 which corresponds to the lower broken line position thereof shown in FIG. 46. In this manner, the free loop 596 will never become too small or too large, and there will always be maintained in the machine a free loop of the film strip to insure accurate performance of feeding, registering and cutting operations on said strip.

This starting and stopping of the electric motor 598 is effected under the control of the free loop 596 of the film strip 575 and is accomplished through the provision of a relatively long lever 608 which is located at the inner side of the vertical portion of the frame 580 and is loosely mounted at one end thereof on said frame portion for free pivotal movement in a vertical plane by a stud 609 which is suitably fixed in said frame portion. The lever 608 has secured in the other end thereof a horizontal pin 610 which projects laterally from said lever beyond the plate 583 through aligned arcuate slots formed in said plate and the vertical portion of the frame 580 concentric with the pivotal axis 609 of said lever, only the slot in said frame portion being seen and indicated at 611. The pin 610 has journalled thereon a flanged roller 612 which is disposed within the free loop 596 of the film strip 575 and continuously rests by gravity thereon under the weight of said roller and the lever 608. The peripheral surface of the roller 612 is preferably smooth and highly polished so as not to scratch or otherwise injure the images on the film strip 575. It will be apparent that as the size of the free loop 596 of the film strip 575 is reduced through feeding of said strip from said loop, as hereinafter described, the lever 608, through engagement of the roller 612 with the free loop, will be raised or rocked in a clockwise direction, as viewed in FIG. 46, by the diminishing free loop, and when the size of the free loop is increased through unwinding of the film strip from the supply roll 578, the lever 608 will follow by gravity with the free lop as it increases and, hence, said lever will be lowered or rocked in a counterclockwise direction.

Engaged over the stud 609 and suitably secured to the lever 608 for rotation thereby in opposite directions as said lever is raised and lowered, respectively, as above described, is a cam 613 which is engaged at opposite sides thereof by cam followers or rollers 614 and 615 which are journalled on and at the upper ends of vertical arms 616 and 617, respectively. These arms 616 and 617 are pivotally mounted intermediate the ends thereof at 618 and 619, respectively, on the vertical portion of the frame 580, and the lower end portions of said arms are twisted to dispose the same substantially at 90° to the upper remaining portions of said arms. Adjustably threaded in the twisted lower end portions of the arms 616 and 617 are machine screws 620 and 621, respectively, which are arranged to respectively engage the contact closing plunger 622 and the contact opening plunger 623 of a conventional micro-switch 624 which is suitably secured to the vertical portion of the frame 580. The micro-switch 624 is of the resetting type which requires actuation of the plunger 623 to open the contacts thereof when once closed by the plunger 622, and requires actuation of the plunger 622 to close said contacts when once opened by the plunger 623, said plungers, however, being capable of returning to their original projected positions when released and permitted to do so by their respective screws 620 and 621. The cam rollers 614 and 615 are yieldingly held in engagement with the cam 613, and the lower end portions of the arms 616 and 617 are yieldingly urged away from the switch 624, by a coil extension spring 625 having one end thereof connected at 626 to the arm 616 and the other end connected at 627 to the arm 617. With the cam rollers 614 and 615 engaged in the low part of the cam 613, as shown in FIG. 46, and with the switch 624 open at this time and the motor 598 accordingly stopped, the screws 620 and 621 are adjusted so that they just contact their respective projected plungers 622 and 623, said screws being then locked in adjusted positions by lock nuts 628 and 629, respectively. The motor 598 and the micro-switch 624 are electrically connected together by a conductor 630, and said motor and said switch are connected by conductors 631 and 632, respectively, in the electrical control circuit for the machine, as illustrated in FIG. 58 and to be hereinafter described.

The length of the high part of the cam 613 and the position of said cam on the lever 608 are so chosen, that when said lever occupies a position substantially centrally between the upper and lower limits of pivotal movement thereof, as shown in full lines in FIGURE 46, the cam rollers 614 and 615 are both engaged in the low part of said cam and positioned alike distances away from the ends of the high part of said cam. At this time, the length of the free loop 596 of the film strip 575 is substantially one-half its maximum size, the plungers 622 and 623 of the switch 624 are released by the arms 616 and 617, respectively, said switch is open and no electrical current is being conducted to the motor 598.

It will thus be apparent that when the free loop 596 of the film strip 575 is reduced to its minimum size and consequently the lever 608 is raised by said loop to the upper broken line position thereof shown in FIG. 46, thereby rotating the cam 613 in a clockwise direction, the cam roller 614 will be engaged by the high part of said cam, while the cam roller 615 will continue to engage the low part of the cam. Under these conditions, the arm 616 only is rocked in a counterclockwise direction about its pivot 618 by the cam 613, thus actuating the plunger 622 of the switch 624 and closing the contacts of said switch. Closing of the contacts of switch 624 starts the motor 598, whereupon the rollers 593 and 594 are rotated and the film strip 575 is drawn thereby from the supply roll 578 and added to the diminished free loop 596. As the film strip 575 is drawn from the supply roll 578 and the length or size of the free loop 596 thus increases, the lever 608 drops by gravity with the increasing free loop, thereby rotating the cam 613 in the opposite or counterclockwise direction. When the lever 608, during continued downward pivotal movement thereof with the still increasing free loop 596 of the film strip 575, substantially reaches the midway position thereof, the high part of the cam 613 will leave the cam roller 614, whereupon the arm 616 is rocked about its pivot 618 in a clockwise direction by the action of the spring 625 and the plunger 622 of the switch 624 is released by said arm and returns to its original projected position. The contacts of the switch 624, however, remain closed and, hence, the motor 598 continues to operate, and unwinding of the film strip 575 from the supply roll 578 continues until the lever 608 reaches its lower broken line position shown in FIG. 46 and the free loop 596 is accordingly extended to said position. Thereupon, the cam roller 615, through continued rotation of the cam 613 in a counterclockwise direction by the downwardly moving lever 608, is engaged by the high part of said cam and the arm 617 is rocked in a clockwise direction about its pivot 619, thus actuating the plunger 623 of the switch 624 and opening the contacts of said switch. With the free loop 596 of the film strip 575 thus restored to its maximum size, opening of the contacts of the switch 624 stops the motor 598, thereby interrupting the unwinding of the film strip 575 from the supply roll 578. As the film strip 575 is fed from the restored free loop 596 thereof, the lever 608 is raised from its lower broken line position shown in FIG. 46, and when said lever, during such upward movement thereof, substantially reaches its midway position, the high part of the cam 613 will leave the cam roller 615. Thereupon, the arm 617 is rocked about its pivot 619 in a counterclockwise direction by the action of the spring 625, and the plunger 623 of the switch 624 is released by said arm and returns to its original projected position, thus resetting said switch for subsequent operation in the manner above described.

FILM STRIP FEEDING AND REGISTERING MECHANISM

*FIGS. 1, 35, 36, 37, 38, 42 to 47, inclusive, 49, and 50*

The film strip 575 is led from the free loop 596 thereof over a rubber-tired roller 633, to be hereinafter referred to, and threaded through the horizontal guide 595 which forms part of the mechanism 19 for intermittently feeding said strip from said loop and registering the same with knife means, to be hereinafter described, whereby individual frames severed from the strip by said knife means each will contain a full image properly centered thereon. It might be repeated at this time, that the aperture 6 in the card 5 is made of such width or vertical dimension that it accurately receives the uncut longitudinal edges of the film frame or insert severed from the film strip. In this manner, the full width of the film strip is economically utilized, and at the most two transverse cuts extending completely across the strip are only required to produce an insert of a length to accurately fit within the aperture 6 in the card 5. It will thus be seen that in the case of the image bearing film strip in the illustrated embodiment, or any other record or indicia bearing strip, a very high degree of accuracy is required in the feeding of the strip to the cutting means. As herein shown, the film strip feeding and registering mechanism 19 comprises the following elements, including the guide 595, which are constructed, mounted, operated and controlled as follows.

The guide 595 is located in line with the film strip supply roll 578 to receive the film strip 575 in a straight line from the free loop 596 thereof and, hence, said guide is also located at the side guide side of the machine and is laterally spaced a selected distance from the line of travel of the cards. The guide 595 consists of two complementary elongated members 634 and 635 which, when fitted together, define a shallow horizontal guide passage 636 of rectangular transverse section. The film strip 575 enters the passage 636 at the right-hand end of the guide 595, as viewed in FIGS. 42 and 50, and is advanced step-by-step along said guide passage to the zone of action of cutting means to be hereinafter described. The guide 595 is mounted on top and at the inner side of a frame 637 and on top and at the confronting outer side of a bracket 638 disposed in spaced parallel relation to said frame. The guide 595 bridges the space between the frame 637 and the bracket 638 and is suitably secured to said frame and said bracket. The bracket 638 is bolted or otherwise suitably secured to the frame 637, and said frame is bolted or otherwise suitably secured to an auxiliary base block or pedestal 639. This block or pedestal 639 is bolted or otherwise suitably secured to the base portion of a frame 640 which forms part of the film strip cutting, film frame transferring and mounting mechanism 20 to be later described. Location of the frame 637 and the pedestal 639 in proper positions on said pedestal and the frame 640, respectively, is facilitated by keys 641 and 642 secured to the upper and lower surfaces, respectively, of the pedestal and engaged in keyways 643 and 644, respectively, formed in the frames 637 and 640, respectively.

The various operable parts of the film strip feeding and registering mechanism 19 are driven from a speed reduction drive unit 645 which includes an electric motor 646 coupled thereto and forming a part thereof. This combined unit 645, 646 is slidably mounted on and bolted or otherwise suitably secured to a plate 647 which, in turn, is bolted or otherwise suitably secured to the base portion of the frame 580 of the previously described film unwinding mechanism 18. The electric motor 646 is connected in the electrical control circuit for the machine and is controlled for starting and stopping purposes by a manually operated switch which will be later explained in connection with the description of said circuit. Fixed on the output shaft 648 of the speed reduction drive unit 645 is a sprocket 649 around which passes a chain 650 which also passes around a smaller diameter sprocket 651. This sprocket 651 is fixed on the inwardly projecting end of a horizontal transverse shaft 652 which is journalled adjacent said end in a suitable bearing block 653 carried by a bracket 654 which is located directly below the line of travel of the cards and is bolted or otherwise suitably secured to the frame 640. Slack in the chain 650 is compensated for by sliding the driving unit 645, 646 on and relative to the supporting plate 647. The shaft 652 projects through and beyond the bearing block 653 and the bracket 654 and has fixed on the extreme outer end thereof a sprocket 655 around which passes a chain 656. The chain 656 extends upwardly from the sprocket 655 and passes around a larger diameter sprocket 657 which is fixed on the inner end of a stub shaft 658. This stub shaft 658 is journalled in suitable bearings provided in two plates 659 and 660 which are located below the guide 595 and are bolted together in spaced parallel relation and to the frame 637 by bolts 661 which pass through clearance openings in said plates and through spacers 662 between said plates and are threaded into said frame. Slack in the chain 656 is compensated for by an idler sprocket 663 which is journalled on and at the free end of an arm 664 which is carried by and is adjustably secured to the plate 659.

The sprocket 657 is disposed exteriorly of the plate 659, and the stub shaft 658 driven by said sprocket has fixed thereon between the plates 659 and 660 a spur pinion 665 which meshes with a larger diameter spur gear 666 which is fixed on a stub shaft 667. This stub shaft 667 is journalled in suitable bearings in the plates 659 and 660 and projects beyond the adjacent inner wall of the frame 637 through a suitable clearance opening in said wall. The stub shaft 667 has fixed on the outwardly projecting end thereof a spur pinion 668 which meshes with the larger diameter spur gear 669 of a compound idler gear which includes a smaller diameter spur gear 670 secured to or formed integrally with the gear 669. The compound idler gear 669, 670 is journalled on a stud 671 which is suitably secured in the frame 637. The smaller gear 670 of the compound idler meshes with and drives a larger diameter spur gear 672. This gear 672 is fixed on the outwardly projecting end of a stub shaft 673 which extends transversely of the guide 595 beneath the latter and is journalled in suitable bearings in the frame 637 and bracket 638. The stub shaft 673 has keyed thereon a rubber-tired feed roller 674 which is located between the frame 673 and the bracket 638 and projects through the lower member 635 of the guide 595 through an enlarged opening 675 in said guide member so as to engage, and to be engaged by, the film strip 575 disposed within and extending along the guide passage 636.

The larger gear 669 of the compound idler meshes with and drives a smaller diameter spur gear or pinion 676 which is secured to the driven member 677 of a friction slip clutch 678 which is engaged over a shaft 679 extending transversely of the guide 595 beneath the latter. The shaft 679 is disposed in parallel relation to the feed roller shaft 673 and is spaced a selected distance rearwardly from said feed roller shaft. The shaft 679 has its inner end portion journalled in suitable bearings in the bracket 638 and the frame 637, and is also journalled adjacent the outer end thereof in a suitable bearing in another bracket 680 which is bolted or otherwise suitably secured to said frame. The slip clutch 678 is of conventional design embodying the clutch member 677 which is loosely mounted on the shaft 679, and a series of friction discs (not shown) which are disposed within said clutch member and cooperate with the latter and with each other to drive said shaft, certain of said discs being connected to the clutch member 677 and others being connected to the shaft 679. The shaft 679 has keyed on the inner end portion thereof a rubber-tired feed roller 681 which is located between the frame 637 and the bracket 638 and projects through the lower member 635 of the guide 595 through an enlarged opening 682 in said guide member so as to engage, and to be engaged by, the film strip 575 disposed within and extending along the guide passage 636.

The shaft 679 projects beyond the bracket 680 and has fixed on the outer end thereof a cam disc 683 formed with two alike cam surfaces 684 which terminate in two alike radially extending shoulders or abutments 685 disposed diametrically opposite each other and facing in the direction of rotation of said shaft. The bracket 680 has pivotally mounted thereon at 686 one end of a stop lever 687 having journalled thereon at the other end thereof a roller 688 which is adapted to normally engage one or the other of the two shoulders 685 on the cam disc 683 and thus normally hold the shaft 679 and consequently the feed roller 681 against rotation in opposition to the driving torque of the clutch 678, said clutch slipping at this time and thus having no affect on the operation of the speed reduction drive unit 645. The stop lever 687 is continously biased toward the cam disc 683 by a coil extension spring 689 having one end thereof connected at 690 to said lever and the opposite end engaged over a pin 691 suitably secured in the bracket 680. It will be apparent that when the stop lever 687 is rocked out of engagement with the cam disc 683, as hereinafter described, thereby releasing said disc, rotation will immediately be imparted to the shaft 679 and the feed roller 681 by the speed reduction drive unit 645 through the described gearing, including the clutch 678. When the stop lever 687 is rocked toward the cam disc 683 by the action of the spring 689 substantially immediately following the release of said disc by said lever, the roller 688 will engage and ride along the succeeding cam surface 684 on the disc so that the succeeding shoulder 685 on said disc will engage said roller, thus stopping the disc after it has made exactly one-half of a revolution and limiting the rotation of the feed roller 681 to exactly one-half of a revolution.

During the normal operation of the machine, the electric motor 646 is operated continuously, and it will thus be apparent that the feed roller 674 is rotated continuously and that by virtue of the speed reduction drive unit 645 and the described gearing for said feed roller such rotation of the latter occurs at a very slow surface speed. Accordingly, the film strip 575 engaged by the feed roller 674 will be advanced by said roller at a very slow surface speed along the guide 595. It will also be apparent that the feed roller 681, through the described gearing therefore, including the clutch 678, with the continuously driven speed reduction drive unit 645, will be rotated by said unit when released by the stop lever 687, and that by virtue of said gearing such rotation of said roller will occur at a surface speed faster than the surface speed of the continuously driven feed roller 674. Accordingly, the film strip 575 engaged by the feed roller 681 will be advanced by said roller at a faster surface speed along the guide 595 independently of the feed roller 674.

Cooperating with the feed rollers 674 and 681 to increase the tractive effort of said rollers on the film strip 575 and to insure movement of said strip along the guide 595 at slow speed by the feed roller 674 and at a faster speed by the feed roller 681, as above described, are upper rubber-tired pressure rollers 692 and 693, respectively. These pressure rollers 692 and 693 are journalled on and at opposite ends of a rocker arm 694 which is pivotally mounted centrally of said ends on a stub shaft 695 that is secured in the frame 637 and the bracket 638. It will be apparent that by virtue of the described mounting for the pressure rollers 692 and 693, when the pressure roller 692 is moved toward the feed roller 674 and the film strip 575 is pressed thereby against said feed roller to effect advancing movement of said film strip, the pressure roller 693 is simultaneously moved away from the feed roller 681 which at this time is stationary, thus enabling movement of the film strip 575 at slow speed along the guide 595 by the feed roller 674. When the pressure roller 693 is moved toward the feed roller 681 and the film strip 575 is pressed thereby against said feed roller to effect advancing movement of said film strip, the pressure roller 692 is simultaneously moved away from the feed roller 674 and out of engagement with the film strip 575, thus enabling free advancing movement of said film strip at a faster speed along the guide 595 by the feed roller 681.

Rocking movement of the rocker arm 694 in a clockwise direction, as viewed in FIG. 42, to bring the pressure roller 692 into pressing engagement with the film strip 575 within the guide 595 is timed to occur once during each cycle of operation of the machine, and is effected electrically by energization of a solenoid 696. The operation of this solenoid 696 is under the control of an electric timing switch 697 which forms part of a multiple circuit timer utilized in the machine and indicated generally at 698 in FIGS. 1 and 56. The timer 698 is of conventional design, embodying the switch 697, and other similar switches 699, 700 and 701 to be hereinafter referred to, and two driven rotary cams for each of said switches to open and close the contacts thereof at predetermined intervals, the contact closing cams being indicated at 702, 703, 704 and 705, respectively, and the contact opening cams being indicated at 706, 707, 708 and 709, respectively. The cams 702 to 709, inclusive, are fixed in pairs on a shaft 710 which is journalled in suitable bearings in a casing 711. During the normal operation of the machine, the shaft 710 is rotated continuously and such that it makes one complete revolution for each cycle of operation of the machine. For this purpose, the timer 698 is mounted on and suitably secured to the base plate or platform 22 in front of the cover sheet stripping mechanism 16, and the shaft 710 of said timer has mounted thereon a sprocket 712 around which passes a chain 713 which also passes around and is driven by a similar sprocket 714 that is fixed on the main cam shaft 50 of the machine, said sprockets being of the same size.

To prevent possible damage to the timer 698 upon manual rotation of the cam shaft 50 in a reverse direction for any reason, the sprocket 712 is loosely mounted on the timer shaft 710 and is connected to said shaft by a slip coupling (FIG. 57) comprising a collar 715 which is fixed on the shaft adjacent said sprocket and is formed in the peripheral surface thereof with a spiral groove 716, and a spring-pressed plunger 717 which is slidably mounted in the sprocket 712 and is arranged to yieldingly project into the groove 716 and engage the leading wall of said groove, said wall being flattened at the inner end thereof parallel to the axis of rotation of the collar 715 so as to provide more surface contact of said plunger with said collar. During the normal operation of the machine, the timer shaft 710 will thus be driven in the proper direction by the sprocket 712 through engagement of the plunger 717 with the flat portion of the leading wall of the spiral groove 716 in the collar 715, and when the machine is stopped and the cam shaft 50 is manually rotated in the reverse direction for some reason, the plunger 717, through reverse rotation of the sprocket 712, will engage the inclined trailing wall of the spiral groove 716 in the collar 715 and, hence, said plunger will be cammed out of driving engagement with said collar and no reverse rotation will be imparted to the timer shaft 710. The outer end of the trailing wall of the spiral groove 716 in the collar 715 is also flattened so that the ends of said groove are interchangeable for the described purpose, thereby simplifying the mounting of the collar on the shaft 710 and providing for prolonged use of said collar in the machine. The timer 698 includes a terminal block 718 which is suitably secured to the casing 711 and to which the conductors (not shown) leading from the contacts of the various switches switches 697, 699, 700 and 701 are connected at 719 and 720, 721 and 722, 723 and 724, and 725 and 726, respectively. The terminals 719 and 720 appertaining to the switch 697 have connected thereto conductors 727 and 728 which are connected in the electrical control circuit for the machine as more fully explained hereinafter in the description of said circuit.

Referring back to the solenoid 696 for operating the rocker arm 694, said solenoid is bolted or otherwise suitably secured to the frame 637 and has conductors 729 and 730 leading therefrom which are connected in the electrical control circuit for the machine, as illustrated in FIG. 58. Pivotally connected at 731 with the movable core 732 of the solenoid 696 is the lower end of a vertical link 733 the upper end of which extends between two spaced parallel plates 734 of triangular shape and is pivotally connected at 735 to said plates. The plates 734 are pivotally mounted at 736 on a bracket 737 which is bolted or otherwise suitably secured to the frame 637. Disposed between the plates 734 and pivotally connected to said plates at 738 intermediate the pivotal points 735 and 736 is the lower end of a short vertical link 739 the upper end of which is received within and is pivotally connected at 740 to the U-shaped portion 741 of a resilient arm 742 formed of spring steel. This arm 742, together with a shorter, more rigid metallic strip 743 disposed above the same, is secured at the other end thereof to a block 744 which is suitably secured to the projecting end of the stub shaft 695 to which the rocker arm 694 is secured. The plates 734 have pivotally connected thereto at 745 the upper end of a rod 746 which projects downwardly from said plates and has its lower end disposed within and projecting through a suitable clearance opening formed in the bracket 737. Surrounding the rod 746 is a coil compression spring 747 having one end thereof engaging against the bracket 737 and the opposite end engaging against a collar 748 which is adjustably secured to said rod.

It will thus be apparent that when the solenoid 696 is energized through closing of the timer switch 697 by the timer cam 702, the core 732 will be electrically drawn downwardly and, hence, the rocker arm 694, through the described operating connections therefore with said core, will be rocked about the pivotal axis 695 in a clockwise direction, as viewed in FIG. 42, until the pressure roller 692 on said arm contacts the film strip 575, whereupon the resilient arm 742 will yield under the continued downward pull of the core 732 and said film strip will be yieldingly pressed by said pressure roller against the feed roller 674. When the solenoid 696 is thereafter deenergized, as explained hereinafter in connection with the description of the electrical control circuit for the machine, the plates 734 will be rocked about the pivotal axis 736 thereof in a clockwise direction, as viewed in FIG. 44, by the expanding action of the spring 747, whereupon the core 732 will be raised, and the rocker arm 94 will be rocked in a counterclockwise direction, as viewed in FIG. 42, until the pressure roller 693 on said arm contacts the film strip 575 and yieldingly presses the same against the feed roller 681, at which time the pressure roller 692 is raised clear of said film strip.

It is apparent that while the pressure rollers 692 and 693 are being lowered and raised, as above described, into and out of engagement with the film strip 575 in the guide 595, there is a brief moment when said film strip is not engaged by or under the control of either roller and, hence, the film strip at this moment is entirely free in said guide and would be retracted from its proper normal longitudinal position in the guide under the influence of the lever 608 on the free loop 596 of said strip. Brake means is, therefore, provided for continuously holding the film strip 575 against any retracting movement relative to the guide 595, while at all times permitting feeding movement of said strip by the feed rollers 674 and 681. As herein shown, said brake means comprises the rubber-tired idler roller 633, previously referred to, and a spring-pressed rubber-tired pressure roller 749 cooperating with said idler roller to pinch the film strip 575 therebetween. The idler roller 633 is slidably engaged over a fixed stub shaft 750 which extends through a suitable clearance opening in the plate 583 and is suitably secured in the vertical portion of the frame 580. The idler 633 is connected to the stub shaft 750 by a coupling in the form of an over-running clutch (FIG. 49) which is disposed within said roller and utilizes the inner shell 751 of the roller as a component part thereof. The clutch includes a series of spring-biased rollers 752 which are disposed in notches 753 formed in the periphery of a member 754 which is splined or otherwise suitably secured to the stub shaft 750. By virtue of the over-running clutch type of coupling, the idler roller 633 is free for rotation at all times, in a counterclockwise direction, as viewed in FIG. 49, relative to the member 754, by the film strip 575 as the latter is advanced along the guide 595 from the free loop 596 thereof by the feed rollers 674 and 681. This is due to the fact that rotation of the idler roller 633 in the film strip feeding direction causes the rollers 752 to move into the deep ends of the notches 753 and rotate freely therein without transmitting any binding action between the surfaces of the shell 751 and member 754.

However, it will be apparent that if the idler roller 633 is rotated in a clockwise direction, as viewed in FIG. 49, the rollers 752 are immediately urged toward the shallow ends of the notches 753, thereby locking said idler roller against the member 754 and preventing rotation of said idler roller in said direction. Since the film strip 575 is normally pinched by and between the idler roller 633 and the pressure roller 749, retracting movement of said film strip relative to the guide 595 is thus normally prevented.

The pressure roller 749 is journalled on and at one end of an arm 755 which is pivotally mounted at the other end thereof on a stub shaft 756 which extends transversely of the guide 595 and is adjustably secured at the inner end thereof in a bracket 757 by a nut 758, said shaft being formed adjacent said bracket with an enlarged annular portion 759. The bracket 757 is bolted or otherwise suitably secured to the upper member 634 of the guide 595. A torsion spring 760 encircles the shaft 756 and has its inner end engaged in a suitable opening in the portion 759 of said shaft and its outer end engaged in a suitable opening in the arm 755. A collar 761 is mounted on the outer end of the shaft 756 and is engaged by the arm 755, said arm and said collar being retained on said shaft against axial outward displacement therefrom by a snap ring 762 which is engaged in a suitable annular groove in said shaft. The collar 762 is normally free on the shaft 756 and is formed on the inner surface thereof with a radial lug 763 which projects into a corresponding radial recess formed in the adjacent surface of the arm 755, whereby said arm and the pressure roller 749 thereon may be raised away from the idler roller 633 and held in elevated position by tightening a set screw 764 provided in the collar, so as to facilitate threading of the film strip 575 over said idler roller and into the guide 595. By loosening the nut 758 and rotating the shaft 756 the tension of the spring 760 may be increased or decreased as desired, following which said nut is again tightened.

The previously described slow speed advancing movement of the film strip 575 along the guide 595 effected by the continuously driven feed roller 674 and cooperating pressure roller 692, is advantageously and effectively utilized to provide for accurate and reliable scanning of said film strip and detection of each line-space or area 577 separating adjacent image-bearing areas 576 of the strip by a photo-electric cell unit indicated generally at 765, whereby the operation of the feed roller 674 and the feed roller 681 and, hence, the feeding of the film strip 575 thereby to strip severing means to be hereinafter described, is effectively controlled to insure accurate registry of the images on said film strip with said severing means such that the film strip will be severed on the line-spaces substantially centrally thereof into individual frames each containing a full image located substantially centrally thereon.

The photo-electric cell unit 765 is suitably mounted to scan the slow moving film strip 575 at a selected point which, in the illustrated embodiment, is located between the feed roller 681 and the strip severing means and is spaced from said severing means a distance less than the length of one image-bearing film frame as measured between the centers of adjacent line-spaces 577 defining said frame. This location of the photo-electric cell unit 765 in relation to the strip severing means provides for feeding of the film strip 575 first at slow speed through part only of the distance by the feed roller 674 to bring the trailing line-space 577 into scanning position, and then at a faster speed the remainder of the distance by the feed roller 681 to quickly bring said line-space into registry with said strip severing means.

As herein shown, the photo-electric cell unit 765 is preferably, but not necessarily, located below the guide 595 and comprises a photo-electric cell 766 enclosed in a suitable casing 767 which is suitably secured to the lower horizontal portion of a vertically extending bracket 768. A source of light in the form of an electric lamp 769 for the photo-electric cell 766 is provided and located above the guide 595 in vertical alignment with said cell. The lamp 769 is enclosed in a suitable casing 770 which is suitably secured to the upper horizontal portion of the bracket 768. The casing 767 is provided at the top thereof with a suitable lens system 771, and the casing 770 is provided at the bottom thereof with a suitable lens system 772, said lens systems serving to concentrate the light beam from the lamp 769 upon the photo-electric cell 766, as indicated by the broken lines in FIG. 36. The bracket 768 is mounted by a bolt 773 on the frame 640 for pivotal movement longitudinally of the guide 595 to locate the photo-electric cell 766 and the light source 769 in proper position with respect to said guide. The bracket 768 is maintained in adjusted position by tightening the bolt 773, and by a second bolt 774 which extends through a clearance slot 775 in an angle bracket 776 and is threaded into the bracket 768, said angle bracket being bolted or otherwise suitably secured to the frame 640.

The upper and lower members 634 and 635, respectively, of the guide 595 are provided with registering openings 777 and 778, respectively, for transmission of the light beam therethrough and for scanning of the film strip 575 by the photo-electric cell 766. The light rays from the lamp 769 are passed through a narrow transverse slot 779 formed in a mask 780 which is mounted on the upper member 634 of the guide 595. The mask 780 is adjustable longitudinally of the guide 595 to proper position by means of a threaded pin 781 which is secured at opposite ends thereof in spaced posts 782 and has threaded thereon a knurled adjusting nut 783 which is confined between two upstanding ears 784 formed on said mask, said posts being suitably secured to the upper guide member 634. Rotation of the nut 783 will thus impart longitudinal movement to the mask 780 relative to the guide 595. The mask 780 is maintained in its adjusted position by a machine screw 785 which extends through a suitable slot in said mask and is threaded in the upper guide member 634.

As will be hereinafter explained in connection with the description of the electrical control circuit for the machine, the photo-elecric cell 766 is connected in said circuit such that when a line-space 577 on the slow moving film strip 575 registers with the slot 779 in the mask 780, thereby affecting the light directed through said slot into said cell, the photo-electric cell, in response to such change in light, simultaneously causes the breaking of the electric circuit in which the solenoid 696 is connected and the closing of another electric circuit in which is connected a solenoid 786 which controls the operation of the faster speed feed roller 681. Under these conditions, the slow movement of the film strip 575 is interrupted through deenergizing of the solenoid 696 and lifting of the pressure roller 692 from said strip as hereinbefore described, and simultaneously therewith and with engagement of the pressure roller 693 with the film strip the rotation of the faster speed feed roller 681 is initiated. Thereupon, the feed roller 681 makes one-half of a revolution, thus continuing the advance of the film strip 575 but at a faster speed, and presenting said strip to the strip severing means with the leading image 576 thereon in proper registry with said severing means.

The solenoid 786 is operatively associated with the stop lever 687 to rock the same away from the cam disc 683 when energized, as previously described, and thereby release said disc and provide for rotation of the faster speed feed roller 681. For this purpose, the solenoid 786 is bolted or otherwise suitably secured to the frame 637 and has conductors 787 and 788 leading therefrom which are connected in the electrical control circuit for the machine, as illustrated in FIG. 58. The movable core 789 of the solenoid 786 has pivotally connected thereto at 790 the lower end of a vertically disposed latch member 791 which is formed with a downwardly facing shoulder 792 which normally projects over a laterally offset portion 793 of the stop lever 687. The latch member 791 is biased toward and into engagement with the portion 793 of the stop lever 687 by a short coil extension spring 794 having one end thereof engaged over the pin 691 and the opposite end connected at 795 to said latch member. The core 789 of the solenoid 786 and the latch member 791 are biased upwardly to their normal positions by a coil extension spring 796 having one end thereof connected at 790 and the opposite end connected at 797 to the bracket 680. A stop pin 798 is suitably secured in the bracket 680 and is arranged to be engaged by an upwardly facing shoulder 799 on the latch member 791 so as to limit the upward movement of said latch member by the spring 796 such that the shoulder 792 in the normal position of the latch member is spaced upwardly from the portion 793 of the stop lever 687 by a minimum clearance. The latch member 791 is also formed with a downwardly facing cam surface 800 which is adapted to engage the stop pin 798.

It will thus be apparent that when the solenoid 786 is energized, the core 789 thereof and the latch member 791 will be drawn electrically downwardly and, hence, the stop lever 687, through engagement of the portion 793 thereof by the shoulder 792 on said latch member, will be rocked downwardly about its pivot 686 away from the cam disc 683 and thereby release said disc. Simultaneously with such release of the cam disc 683 by the stop lever 687, the faster speed feed roller 681 is rotated. Upon continued downward pull of the core 789 and the latch member 791, the cam surface 800 on said latch member will engage the stop pin 798 and, hence, said latch member will be cammed out of engagement with the stop lever 687, whereupon said stop lever will be returned to its original position by the contracting action of the spring 689 into the path of rotation of the succeeding shoulder 685 on the cam disc 683 to stop said disc after it and the feed roller 681 has made one-half of a revolution. When the solenoid 786 is thereafter de-energized, as will be hereinafter explained in connection with the description of the electrical control circuit for the machine, the core 789 of said solenoid and the latch member 791 will be raised relative to the stop lever 687 by the contracting action of the spring 796 until the shoulder 792 on said latch member is clear of the portion 793 of said stop lever at which time the stop pin 798 is engaged by the shoulder 799 on the latch member. Thereupon, the latch member 791 is rocked toward and into engagement with the portion 793 of the stop lever 687 by the contracting action of the spring 794, thus restoring said latch member to its original position in readiness to again actuate said stop lever when the solenoid 786 is again energized during the next cycle of operation of the machine.

FILM STRIP SEVERING AND FILM FRAME TRANSFERRING AND MOUNTING MECHANISM

*FIGS. 1, and 35 to 41, inclusive*

From the film strip guide 595, the film strip 575, fed and registered as above described by the coordinated actions of the photo-electric cell 766 and the primary and secondary feeding means comprising the feed roller 674 and pressure roller 692, and the feed roller 681 and pressure roller 693, respectively, is presented to the mechanism 20 such that the leading image-bearing portion or frame thereof is accurately positioned for severance of said portion on and substantially centrally of the line-space 577 between said portion and the next following image-bearing portion. The mechanism 20, in addition to the film strip severing means, includes carrier means for transferring the severed image-bearing frame of the film strip 575 to a position below the card 5b in vertical alignment with the aperture 6 in said card and for mounting said frame vertically in said aperture and against the adhesive marginal portion of the adhesive sheet 7 on the card, and anvil means arranged above the card for holding the latter against upward movement and providing a backing for the adhesive sheet during mounting of the severed film frame in said card by said carrier means. The film strip severing means, the film frame carrier means and the anvil means are comprised by the following instrumentalities which are constructed, assembled, mounted and operated as follows.

The frame 640, previously referred to, of the mechanism 20 is mounted on the base plate or platform 22 and consists of a lower section 801 and an upper section 802 which is bolted or otherwise suitably secured to said lower section at the top thereof. The frame 640 and consequently the mechanism 20 is quickly and easily located in proper position longitudinally and laterally of the machine by a key 803 and a stop block 804 having threaded therein an adjustable stop bolt 805, said key and said block being suitably secured to the upper surface of the platform 22. The frame 640 is provided in the lower surface of the lower section 801 thereof with a suitable keyway 806 to receive the key 803, and when so engaged, said frame is moved along said key and the platform 22 until it contacts the stop bolt 805. Following this, the frame 640 is immovably bolted to the platform 22.

The various operable parts of the mechanism 20 are actuated in proper timed relation from a short shaft 807 which extends longitudinally of the machine and transversely of the frame 640 and is journalled in suitable bearings in the lower section 801 of said frame. The shaft 807 is located coaxially with the shaft 379, and said shafts are connected together by a conventional disc-type coupling having one part 808 which is keyed and suitably secured to the shaft 379 and another part 809 which is bolted to the part 808 and is keyed and suitably secured to the shaft 807. The shaft 807 forms in effect a further extension of the cam shaft 50 and, hence, it is also driven to make one complete revolution for each cycle of operation of the machine and may be correctly referred to as the cam shaft of the mechanism 20.

Located between the frame 640 and the coupling 808, 809 is a cam 810 which is bolted or otherwise suitably secured to the hub 811 of a face cam 812 to be hereinafter referred to and which is keyed on and suitably secured to the cam shaft 807. The cam 810 engages a cam follower 813 which is journalled on and at the free lower end of one arm 814 of a bell-crank lever 815 the other arm of which is indicated at 816. This bell-crank lever 815 is suitably secured to a stub shaft 817 which is journalled at opposite ends thereof in suitable bearings in the lower section 801 of the frame 640. The arm 816 of the lever 815 extends upwardly from the pivotal axis 817 and has pivotally connected thereto at the upper free end thereof the rear end of a horizontal link 818. The front end of this link 818 is pivotally connected to the free lower end of one arm 819 of a bell-crank lever 820 the other arm of which is indicated at 821. This bell-crank lever 820 is suitably secured to a stub shaft 822 which is journalled at opposite ends thereof in suitable bearings in the upper section 802 of the frame 640. The arm 821 of the lever 820 projects toward the front of the frame 640 and has adjustably threaded in the free end thereof a tappet 823 which engages the upper end of a vertical stem 824 and is locked in adjusted position by a lock nut 825. The stem 824 is slidably mounted for vertical up and down movement in a bearing block 826 which is disposed between and is bolted or otherwise suitably secured to two vertically disposed side plates 827 and 828 which are bolted or otherwise suitably secured to the upper section 802 of the frame 640. The side plates 827 and 828 are disposed at right angles to the line of travel of the cards on the conveyor, and they project toward the back of the frame 640 for a purpose to be hereinafter described. With the card 5b in its arrested position against the stop finger 237, the bearing block 826 and the side plates 827 and 828 are symmetrically disposed at opposite sides of the transverse center line of the aperture 6 in said card, and said plates are spaced apart a distance slightly in excess of the length or longer dimension of said card aperture.

The stem 824 projects downwardly beyond the bearing block 826, and said stem has secured thereto or formed integrally therewith at the lower end thereof a rectangular holder 829 which is positioned so that two opposed sides thereof are parallel to the side plates 827 and 828. Surrounding the projecting upper end of the stem 824 is a coil compression spring 830 having one end thereof engaging against the bearing block 826 and the opposite end engaging against a snap ring 831 which is engaged in a suitable annular groove formed in said stem. The spring 830 functions to yieldly urge the stem 824 and holder 829 upwardly to their normal raised positions shown in FIG. 39, and to also yieldingly hold the cam follower 813 in engagement with the cam 810.

Bolted to the side of the holder 829 facing the film strip guide 595 is a flat knife blade 832, and bolted to the opposite side of said holder is another flat knife blade 833. The knife blades 832 and 833 are vertically positioned on the holder 829 such that the lower surfaces thereof are flush with the lower flat surface of said holder. Cooperating with the knife blades 832 and 833 are stationary knife blades 834 and 835, respectively. These knife blades 834 and 835 are recessed into the inner surfaces of the side plates 827 and 828, respectively, such that they project a slight distance beyond said surfaces and that the distance between the confronting inner surfaces of said blades is slightly less than the length or longer dimension of the aperture 6 in the cards 5. The knife blades 834 and 835 are bolted to their respective side plates 827 and 828 and they are preferably tipped at a slight angle in a vertical plane to effect a shearing action. At least the outer lower edges of the knife blades 832 and 833, and the confronting inner upper edges of the knife blades 834 and 835 are formed as cutting edges, but in the illustrated embodiment, all four longitudinal edges of each of the knife blades are formed as cutting edges so as to prolong the use of said blades in the machine before replacements thereof are necessary. The film strip guide 595 extends to the side plate 827, and said plate and the side plate 828 are formed with transversely extending horizontally disposed film strip receiving passages 836 and 837, respectively. The lower surfaces of the passages 836 and 837 are flush with the upper surfaces of the stationary knife blades 834 and 835, respectively, and in the normal raised or retracted positions of the movable knife blades 832 and 833 the latter blades are spaced upwardly from the stationary knife blades 834 and 835, respectively.

The film strip 575 as advanced along the guide 595 by the primary and secondary feed rollers 674 and 681, respectively, as above described, passes from said guide through the passage 836 in the side plate 827, over the stationary knife blade 834, across the space between said knife blade and the other stationary knife blade 835, and over the latter knife blade, and when such advancing movement of said film strip is stopped, the leading edge of the film strip will slightly overlie the stationary knife blade 835, and the center of the line-space 577 immediately following the leading image-bearing portion of said strip will substantially overlie the active cutting edge of the stationary blade 834. It will thus be apparent that when the cam follower 813 is thereafter engaged by the high part of the cam 810 through continued rotation of said cam, the holder 829, through the described operating connections therefor with said cam, will be lowered to move the knife blades 832 and 833 thereon past the lowest points of the active cutting edges of the stationary knife blades 834 and 835, respectively. Under these conditions, the leading image-bearing portion of the film strip 575 will be shearingly severed from said strip on the line-space 577 by the cooperating knives 832 and 834, and said portion will be shearingly trimmed to a given size at the leading edge thereof by the cooperating knife blades 833 and 835 so that the severed image-bearing portion or frame will accurately fit between the end walls of the aperture 6 in the card 5b, as hereinafter described. Upon continued rotation of the cam 810 and engagement of the cam follower 813 with the low part of said cam, the movable knife blades 832 and 833 are raised or retracted to their original positions by the expanding action of the spring 830 in readiness to again act on the film strip 575 during the next cycle of operation of the machine when said film strip has again been advanced to position the next following image-bearing portion thereof in registry with said knife blades and the stationary knife blades 834 and 835, at which time the above-described operations are repeated. The lower surfaces of the passages 836 and 837 are preferably chamfered at the outer edges thereof so as to respectively lead the film strip 575 into the passage 836 and to eject the trimmings or shavings of said strip from within the passage 837.

The severed and trimmed image-bearing portion of the film strip 575 is deposited by the movable knife blades 832 and 833 and the holder 829 upon a carrier or shuttle which is normally located between the knife blades 834 and 835 and is in the form of a rectangular vacuum head 838, best seen in FIG. 41, having suitably secured to the upper surface thereof a flanged, rectangular, perforated plate 839. The length and width of the perforated plate 839 is substantially the same as the length and width of the severed and trimmed image-bearing portion of the film strip 575 and slightly smaller than the length and width of the aperture 6 in the cards 5 so as to enable movement of said plate with said image-bearing portion into said card aperture, as hereinafter described. The perforations in the plate 839 communicate with a shallow chamber 840 formed in the lower surface of said plate, and said chamber, in turn, communicates with a vertically disposed passage 841 formed in the head 838.

The carrier 838, 839 is shown in full lines in FIG. 39 in the lowered rearmost positions which it occupies with respect to the stationary knife blades 834 and 835, and it will be noted that in such positions, the carrier plate 839 is located centrally between the opposite ends of said knife blades and directly below the position occupied by the film strip 575. When the carrier 838, 839 is actuated during the normal operation of the machine, as hereinafter described, it is moved upwardly an extent to bring the perforated plate 839 to the broken line position thereof shown in FIG. 39 in which the upper surface of said plate is disposed slightly below the lowermost active points of the cutting edges of the stationary knife blades 834 and 835 so as to directly receive the severed and trimmed image-bearing portion of the film strip 575. After receiving the severed and trimmed image-bearing portion of the film strip 575 and said portion is gripped by vacuum by the carrier plate 839, the carrier is lowered and moved longitudinally of the frame 640 to the left as viewed in FIG. 39, an extent to bring the carrier plate with the image-bearing portion thereon to a position in which it is directly below and in accurate registry with the open end of the aperture 6 in the card 5b resting on the card supporting plate 172, as shown in broken lines in FIG. 39. Then and finally, the carrier 838, 839 with the severed and trimmed image-bearing portion of the film strip 575 adhering by vacuum to the plate 839 is moved upwardly an extent so as to mount said image-bearing portion in the aperture 6 in the card 5b and to press the same against the adhesive sheet 7 on said card, as shown in broken lines in FIG. 39. Just before or at the same time that the severed and trimmed image-bearing portion of the film strip 575 is applied by the carrier 838, 839 to the adhesive sheet 7 on the card 5b, vacuum in said carrier is broken to release said image-bearing portion. After the image-bearing portion of the film strip 575 is applied to the adhesive sheet 7 on the card 5b, the carrier 838, 839 is lowered, retracted and raised in readiness to receive the next severed and trimmed image-bearing portion of the film strip 575 during the next cycle of operation of the machine, at which time the above-described operations are repeated to mount said image-bearing portion in the next card 5b which has been previously advanced along the conveyor and into engagement with the stop finger 237.

The carrier 838, 839 is slidably mounted on two spaced parallel horizontal rods 842 which extend longitudinally of the frame 640 from a position spaced rearwardly of the knife blades 832, 833, 834 and 835 to a position beneath the card supporting plate 172 and beyond the normal position occupied by the card 5b on said plate. The rods 842 are slidably received in suitable bearings in the carrier head 838, and said rods are suitably secured at the rear ends thereof to and at the upper free end of a vertical arm 843 which is pivotally connected at the lower end thereof by a pin 844 with one arm 845 of a lever 846 having two other arms 847 and 848. The arm 847 of the lever 846 extends downwardly at an angle toward the back of the frame 640, and the arm 848 of said lever extends downwardly at right angles to the arm 845 which extends toward the front of said frame. The lever 846 is pivotally mounted on a transverse pin 849 which is suitably secured at opposite ends thereof in the lower section 801 of the frame 640. The arm 848 of the lever 846 has pivotally connected to the lower free end thereof by a pin 850 the rear end of a horizontal link 851 the front end of which is pivotally connected by a pin 852 to the lower free end of one arm 853 of a bell-crank lever 854 having another arm 855 which extends toward the front of the frame 640. The bell-crank lever 854 is pivotally mounted on a transverse pin 856 which is suitably secured at opposite ends thereof in the lower section 801 of the frame 640. Pivotally connected by a pin 857 to the arm 855 of the lever 854 is the forked lower end of an upwardly extending arm 858. This arm 858 has suitably secured therein at the upper free end thereof the forward ends of the rods 842. The described mounting for the carrier 838, 839 thus provides for straight-line vertical and horizontal reciprocating movements of said carrier, as and for the purpose above described. It is evident that vertical reciprocating movement will be imparted to the carrier 838, 839 twice during each cycle of operation of the machine, and that horizontal reciprocating movement will be imparted to said carrier once during said cycle.

For this purpose, there is bolted or otherwise suitably secured to the hub 811 of the box cam 812 a double cam 859 which engages a cam follower 860 journalled on a holder 861 which is releasably clamped to and at the free end of the arm 847 of the lever 846. The arm 847 has threaded therein an adjusting bolt 862 which engages the holder 861 and is locked in adjusted position by a lock nut 863. The cam follower 860 may thus be adjusted relative to the lever 846 toward and away from the cam 859 by rotating the bolt 862 in the proper direction, whereby the desired extent of upward movement of the carrier 838, 839 to receive the severed film section, and the desired degree of pressure applied thereby in mounting said film section in the card 5b may be accurately and conveniently achieved. The carrier 838, 839 is yieldingly urged in an upward direction, and the cam follower 860 is yieldingly held in engagement with the cam 859, by a vertically disposed spring-pressed rod 864 which is pivotally connected at the upper end thereof to and at the free end of the arm 855 of the bell-crank lever 854. The lower end of the rod 864 extends through a suitable clearance opening formed in a web 865 of the lower section 801 of the frame 640, and said rod has threaded thereon adjusting nuts 866. The spring for the rod 864 is of the coil compression type indicated at 867 and surrounds said rod between washers 868 and 869 which are loosely carried by the rod and engage the nuts 866 and the web 865, respectively. It will be apparent that the carrier 838, 839 will be yieldingly raised bodily by the spring-pressed rod 864 under the control of the cam 859, and will be positively lowered bodily by said cam, and that through continued rotation of the cam 859 such raising and lowering movements will occur twice at spaced intervals during each cycle of operation of the machine, i.e., when the carrier is disposed in its rearmost film section receiving position and again when it is disposed in its foremost film section mounting position.

Horizontal reciprocating movement is imparted to the carrier 838, 839 along the rods 842 by the face cam 812 previously referred to. For this purpose, the cam groove or path 870 of the cam 812 has engaged therein a cam follower 871 which is journalled on and at the free upper end of a vertically disposed arm 872. This arm 872 is forked at the lower end thereof to extend on opposite sides of a block 873 which is bolted or otherwise suitably secured to the lower section 801 of the frame 640, said arm being pivotally mounted at said end on a pin 874 which is suitably secured in said block and projects beyond opposite sides thereof. Bolted to the front side of the arm 872 is a relatively thin flat bar 875 which extends upwardly from said arm and has its upper end twisted, as indicated at 876, 90° from the normal plane of said bar. A retaining strap 877 is preferably employed to hold the lower part of the bar 875 flatwise against the arm 872. The upper twisted end 876 of the bar 875 projects into a suitable slot 878 formed in the carrier head 838, and said bar has journalled thereon at said end and at opposite sides thereof rollers 879 which are engaged in corresponding recesses 880 also formed in said head. It will thus be apparent that the lever comprising the arm 872 and bar 875 will be rocked by a positive action in opposite directions about the pivot 874 by the box cam 812, and that such rocking movement will occur once during each cycle of operation of the machine. Accordingly, the carrier 838, 839, through engagement of the rollers 879 in the recesses 880 of the head 838, will be positively advanced and retracted along and relative to the bars 842 to film section mounting and film section receiving positions, respectively, and that such advancing and retracting movements will occur once during each cycle of operation of the machine.

In order to insure accurate location of the carrier 838, 839 in its film section receiving and mounting positions, the cam groove 870 of the box cam 812 is designed to move said carrier beyond said positions, and positive stop elements 881 and 882 are employed and arranged at said positions, respectively, so that the carrier will engage and will be positively stopped by said elements at said positions in opposition to the further thrust imposed thereon by the cam, the actuating bar 875 at these instances flexing or yielding under such thrust thus avoiding any damage to the carrier or its operating mechanism. The stop elements 881 and 882 are in the form of threaded rods which are adjustably mounted in the lower section 801 of the frame 640 and in a bracket 883, respectively, said bracket being bolted or otherwise suitably secured to said frame section at the top and front thereof and also serving as a support for the front end portions of the plate 172 and the side guide bar 174. The stop elements 881 and 882 are respectively threaded into the frame section 801 and bracket 883 and are locked in adjusted positions by lock nuts 884 and 885, respectively.

Vacuum is created and broken at predetermined intervals in the carrier 838, 839 to respectively grip and release the severed image-bearing portion of the film strip 575 and for this purpose, the carrier head 838 has connected thereto one end of a flexible conduit 886 which communicates with the passage 841 in said head and has its opposite end connected to one end of a rigid conduit 887. The opposite end of the rigid conduit 887 is connected to and at the bottom of a block 888 which forms part of a valve unit indicated generally at 889 which is bolted or otherwise suitably secured to the lower section 801 of the frame 640 exteriorly thereof. As best shown in FIG. 40, the conduit 887 communicates with the lower end of a passage 890 formed in and extending vertically of the valve block 888 and which, in turn communicates at the upper end thereof with a bore 891 formed in and extending longitudinally through said block. The block 888 is formed in the bore 891 thereof wtih two axially spaced annular chambers 892 and 893. The chamber 892 communicates with a relief passage 894 (FIG. 36) formed in the block 888 and which opens outwardly to atmosphere through the outer side of said block. The chamber 893 communicates with the lower end of a vertical passage 895 formed in the block 888. Connected with the block 888 and communicating with the passage 895 and with the chamber 893 and bore 891 through said passage is one end of a rigid conduit 896 which extends from said block downwardly through a suitable clearance opening 897 in the plate 22 and has its opposite end connected to the vacuum manifold 505. The perforations in the carrier plate 839 are thus pneumatically connected with the vacuum pump 502 through the chamber 840, passage 841, conduits 886 and 887, passage 890, bore 891, chamber 893, passage 895, conduit 896 and manifold 505, and with the atmosphere from the passage through the bore 891, chamber 892 and passage 894.

Slidably mounted in the bore 891 of the valve block 888 is a piston valve 898 which is formed intermediate its ends with a reduced annular portion 899 which is of a length substantially equal to the distance between the chambers 892 and 893 in said block. The piston valve 898 projects beyond the back end of the block 888 and is rounded at said end for engagement by the free upper end of a vertical arm 900 which is pivotally mounted at the lower end thereof on a stud 901 suitably secured in the lower section 801 of the frame 640. The arm 900 has journalled thereon at the upper end thereof a cam follower 902 which is engaged by a cam 903 that is keyed and suitably secured to the cam shaft 807. The piston valve 898 is yielding held in engagement with the arm 900, and the cam follower 902 is, in turn, yieldingly held in engagement with the cam 903, by a coil compression spring 904 which is located between said valve and a cap 905 which is suitably secured to the block 888, said spring being recessed into said valve and said cap and engaging both of the same. The cap 905 is provided in the inner surface thereof with a clearance space for the adjacent end of the piston valve 898, and to prevent said piston valve from becoming "air bound" between the block 888 and the cap 905, the latter is provided with a suitable relief port 906. The piston valve 898 is thus cam operated in one direction by the cam 903 and is spring operated in the opposite direction by the spring 904 to respectively make and break vacuum in the carrier 838, 839 once during each cycle of operation of the machine.

When the cam follower 902 is engaged by the high part of the cam 903 which occurs during the upward movement of the carrier 838, 839 to receive the severed image-bearing portion of the film strip 575, the piston valve 898 is moved to the full-line position thereof shown in FIG. 40, wherein it will be noted that the passage 890 is connected with the passage 895 through the bore 891, the reduced portion 899 of said valve, and the chamber 893, and that the chamber 892 and the relief passage 894 is completely closed to the passages 890 and 895 by the larger diameter portion of the valve adjacent the actuating arm 900. Under these conditions, the vacuum supply conduit 896 will be connected with the conduit 887 and hence, vacuum will be created in the carrier head 838 and in the perforations of the carrier plate 839 to cause the severed image-bearing portion of the film strip 575 to be gripped by said plate.

When, through continued rotation of the cam 903, the cam follower 902 is engaged in the low part of said cam, which occurs just as or just before the severed image-bearing portion of the film strip 575 is applied by the carrier 838, 839 against the adhesive sheet 7 on the card 5b, the piston valve 898 is moved toward the arm 900 by the expanding action of the spring 904 to the broken-line position thereof shown in FIG. 40, wherein it will be noted that the chamber 892 and the relief passage 894 are placed in communication with the passage 890 through the bore 891 and the reduced portion 899 of said valve, and that the vacuum supply passage 895 in the block 888 is completely closed to the passage 890 by the larger diameter portion of the valve adjacent said spring. Under these conditions, vacuum in the bore 891 in the valve block 888 will be broken, and the conduit 887 connected with the carrier 838, 839 will be connected to the atmosphere, thus venting the carrier and causing the same to release the severed image-bearing portion of the film strip 575.

Detector means is provided for detecting, during the normal operation of the machine, the presence of a severed image-bearing portion of the film strip 575 on the carrier 838, 839 during each advancing movement thereof, and for causing the stopping of the machine in the event an image-bearing portion of the film strip is, for some reason, not present on and gripped by said carrier during such movement thereof. As best seen in FIG. 41, said detector means comprises a horizontal plunger 907 which is carried by the carrier head 838 for movement therewith and is fitted for reciprocating movement relative to said head in a bore 908 which is formed in and extends transversely of the head at right angles to the passage 841 and communicates with said passage and the vacuum conduit 886. The bore 908 opens outwardly only through the side of the carrier head 838 facing the front of the machine, and extends inwardly beyond the passage 841 in said head. The plunger 907 is formed at the outer end thereof with a reduced stem-like annular portion 909, and said plunger is of a length such that in the normal projected position thereof shown in FIG. 41, it does not block the communication between the passage 841 and the conduit 886. The plunger 907 is bored at the inner end thereof to receive therein a coil compression spring 910 one end of which engages against said plunger and the opposite end engages against the wall of the bore 908. The spring 910 normally tends to move the plunger 907 relative to the carrier head 838 to the position thereof shown in FIG. 41, wherein it will be noted that the stem-like portion 909 of said plunger projects beyond said head, such movement of the plunger to said position being limited by a snap ring 911 which is engaged in a suitable internal groove formed in the head around the bore 908.

It will be apparent that with the carrier 838, 839 connected with the pump 502, when a severed image-bearing portion of the film strip 575 is received by said carrier and the perforations in the carrier plate 839 are sealed by said image-bearing portion, vacuum will also be created in the bore 908 in the carrier head 838, whereupon atmospheric air pressure acting on the exposed projecting end of the plunger 907 will push said plunger into said head to a retracted position. When the carrier 838, 839 is devoid of a severed image-bearing portion of the film strip 575, or when said carrier fails, for some reason, to receive a severed image-bearing portion, or when a severed image-bearing portion received by said carrier fails to adhere and seal the perforations in the carrier plate 839, no vacuum will be created in the carrier head or the vacuum pressure therein will be insufficient to overcome the resistance of the spring 910 and, hence, the plunger 907 will remain in its projected position shown in FIG. 41.

In the projected position of the plunger 907 shown in FIG. 41, the stem 909 of said plunger, during advancing movement of the carrier head 838, 839, is adapted to engage an angular or inclined lip 912 which is formed on and at the free end of an arm 913 and projects beyond the inner side of said arm. This arm 913 is pivotally mounted at 914 on a bracket 915 which is bolted or otherwise suitably secured to the lower section 801 of the frame 640 exteriorly thereof. Engagement of the lip 912 of the arm 913 by the stem 909 of the projected plunger 907 on the advancing stroke of the carrier 838, 839 will thus rock said arm downwardly about its pivot 914. Accordingly, failure of the carrier 838, 839 to receive and/or grip a severed image-bearing portion of the film strip 575 will result in actuation of the arm 913 by the projected plunger 907. When a severed image-bearing portion of the film strip 575 is received and gripped by the carrier 838, 839 resulting in retraction of the plunger 907, said plunger will occupy a position such that the stem 909 thereof will miss and not engage the lip 912 of the arm 913 on the advancing stroke of said carrier and, hence, no pivotal downward movement will be imparted to said arm. Retraction of the plunger 907 into the carrier head 838 is limited by a stop pin 916 so as to prevent interruption of the communication between the passage 841 in said head and the vacuum conduit 886 by said plunger, said stop pin being suitably secured in said head and projecting into the bore 908.

Downward pivotal movement of the arm 913 by the projected plunger 907 effects stopping of the machine, and for this purpose, said arm has adjustably threaded therein a screw 917 which is locked in adjusted position by a lock nut 922. In the normal raised position of the arm 913, the screw 917 is adjusted so that it just contacts the plunger 918 of a normally open micro-switch 919. This switch 919 is suitably secured to the bracket 915 and has conductors 920 and 921 leading therefrom which are connected in the electrical control circuit for the mahine, as illustrated in FIG. 58, and to be hereinafter desribed. Closing of the contacts of switch 919 closes the control circuit in which said switch is connected and effects stopping of the machine in a manner to be hereinafter described.

It will thus be apparent that when a severed image-bearing portion of the film strip 575 is present in proper position on the carrier 828, 839 during the advancing stroke thereof, the switch 919 will not be actuated or closed and, hence, the machine will continue to operate in the usual normal manner. However, when a severed image-bearing portion of the film strip 575 is not present on the carrier 838, 839 during the advancing stroke thereof, or the plunger 907 is not, for some reason, in retracted position during such movement, the switch 919, through downward pivotal movement of the arm 913 and actuation of the switch plunger 918, will be closed, thereby affecting the control circuit to cause stopping of the machine. Upon stopping of the machine, the cause thereof is determined and corrected, the image-bearing portion of the film strip 575 missing from the card 5b is manually mounted therein, said card is returned to the conveyor and placed in engagement with the stop finger 237, and the machine is again started. The micro-switch 919 is self-opening, and when the arm 913 is released by the plunger 907, the plunger 918 of said switch acts to raise and return said arm to its original position. It is to be noted that when the carrier 838, 839 is returned from its advanced endmost film section mounting position during the normal operation of the machine, the projected plunger stem 909 will pass beneath the lip 912 of the arm 913 in the normal position of the latter.

Cooperating with the carrier 838, 839 is a rectangular anvil member 923 which serves to hold the card 5b against upward displacement from the supporting plate 172 and to provide a backing for the adhesive sheet 7 on said card during the mounting of the severed image-bearing portion of the film strip 575 in said card by said carrier, as above described. The anvil member 923 is located above the card supporting plate 172 and is normally spaced upwardly from said plate. The anvil member 923 has cemented to the lower surface thereof a pad 924 of cushioning material, such as rubber. The anvil member 923 is suitably secured at the upper end thereof to the lower end of a vertical stem 925 which is slidably mounted for vertical up and down movement in a bearing block 926 which is formed integrally with the upper section 802 of the frame 640. Rotation of the anvil member 923 and stem 925 relative to the upper frame section 802 is prevented by a pin 927 which is suitably secured in the bearing block 926 and projects downwardly therefrom through a corresponding slot formed in said anvil member.

Vertical reciprocating movement is imparted to the anvil member 923 once during each cycle of operation of the machine in timed relation with the operation of the carrier 838, 839, and for this purpose, the hub 811 of the box cam 812 has suitably secured thereto a third cam 928 which engages a cam follower 929 which is journalled on and at the free lower end of one arm 930 of a bell-crank lever 931 the other arm of which is indicated at 932. This bell-crank lever 931 is suitably secured to a stub shaft 933 which is journalled at opposite ends thereof in suitable bearings in the lower section 801 of the frame 640. The arm 932 of the bell-crank lever 931 is vertically disposed and has pivotally connected thereto at the upper free end thereof the rear end of a horizontal link 934. The front end of the link 934 is pivotally connected to the lower free end of one arm 935 of a bell-crank lever 936 the other arm of which is indicated at 937. This bell-crank lever 936 is suitably secured to a stub shaft 938 which is journalled at opposite ends thereof in suitable bearings in the upper section 802 of the frame 640. The arm 937 of the bell-crank lever 936 projects horizontally toward the stem 925 of the anvil member 923 and has adjustably threaded in the free end thereof a tappet 939 which engages the upper end of said stem and is locked in adjusted position by a lock nut 940. The anvil member 923 is yieldingly urged upwardly to its normal position shown in FIG. 39, by a coil compression spring 941 which surrounds the stem 925 and has one end thereof engaging against the bearing block 926 and the opposite end engaging against a snap ring 942 which is engaged in a suitable groove formed in said stem. The spring 941 also functions to hold the cam follower 929 in engagement with the cam 928.

It will thus be apparent that when the cam follower 929 is engaged with the high part of the cam 928 through rotation of said cam, the anvil member 923, through the described operating connections therefor with said cam, will be moved downwardly to bring the pad 924 thereon into pressing engagement with the upper surface of the card 5b on the supporting plate 172, the degree of pressure applied by said anvil member on said card being regulated through adjustment of the tappet 939. When the cam follower 929 is thereafter engaged with the low part of the cam 928 through continued rotation of said cam, the anvil member 923 will be raised from the card 5b and returned to its original position by the expanding action of the spring 941 in readiness to act on and hold the next card 5b during the next cycle of operation of the machine.

The operation of the described film strip feeding rollers 674, 692 and 681, 693 is timed such that the film supply strip 575 is advanced thereby to bring the next succeeding image-bearing portion thereof into cutting relation with the raised knives 832 and 833 while the preceding severed image-bearing portion is being transferred and mounted in a card 5b by the carrier 838, 839 as above described. Dummy shuttle means is, therefore, provided for bridging the space between the stationary knives 834 and 835 and thereby supporting and guiding the leading image-bearing portion of the film strip 575 across said space and into overlying relation with the far knife 835 while said space is vacated by the carrier 838, 839. As best shown in FIGS. 38 and 39, said dummy shuttle means comprises a bracket 943 which is located rearwardly and transversely of the knives 832, 833, 834 and 835 and is mounted for sliding movement toward and away from said knives on two spaced parallel rods 944 and 945. The rods 944 and 945 extend longitudinally of the frame 640 and are suitably secured at their forward ends in the side plates 827 and 828, respectively, and they are supported intermediate the ends thereof by the rearward extensions of said side plates. Slidably mounted in a suitable vertically extending recess formed in the front face of the bracket 943 is a bracket 946 which is formed adjacent the lower end thereof with a forwardly projecting slightly inclined shelf 947 which is provided at the front edge and centrally thereof with an abutment pad 948. Suitably soldered to the upper surface of the shelf 947 is a polished metal plate 949. The shelf 947 and the plate 949 are substantially of the same width as the width of the carrier 838, 839. The bracket 943 has threaded therein an adjusting screw 950 having a grooved head in which is engaged the bracket 946 whereby the latter may be vertically adjusted relative to the bracket 943 to locate the plate 949 at the proper level with respect to the film strip receiving passages 836 and 837 in the side plates 827 and 828, respectively. The bracket 943 has connected thereto at 951 one end of a coil extension spring 952 the opposite end of which is connected to one of the side plates 827 and 828. The spring 952 continuously tends to slide the dummy shuttle toward the carrier 838, 839, and when said carrier is in its retracted endmost film section receiving position, said dummy shuttle, through engagement of the carrier with the abutment pad 948 on the bracket 946, is held by said carrier in its retracted inoperative position and against advancing movement by the spring 952.

It will thus be apparent that when the carrier 838, 839 is advanced from its retracted endmost film section receiving position, the dummy shuttle in response to such movement of said carrier will immediately follow along with the carrier under the influence of the spring 952 until the bracket 943 of said dummy shuttle contacts the side plates 827 and 828. Accordingly, the bracket 946 and plate 949 thereon of the dummy shuttle will be positioned between the stationary knives 834 and 835 and will occupy substantially the same position vacated by the carrier 838, 839 with respect to said knives, thus bridging the space between the knives and providing a guide for subsequently leading the leading image-bearing portion of the film strip 575 from the stationary knife 834 to and over the stationary knife 835. It will also be apparent that when the carrier 838, 839 is thereafter retracted from its advanced endmost film section mounting position to its endmost film section receiving position between the knives 834 and 835, the bracket 946 and the plate 949 thereon of the dummy shuttle will be withdrawn from between the stationary knives 834, 835 by the carrier through such movement thereof and engagement of the same with the pad 948 on said bracket. When the dummy shuttle is retracted by the carrier 838, 839 to its inoperative position, the spring 942 is thereby again placed under sufficient tension to effect subsequent advancing movement of said dummy shuttle during the next cycle of operation of the machine.

FINISHED CARD DELIVERING AND STACKING MECHANISM

*FIGS. 1, 13, 14, 15, 35, 38, and 51 to 55, inclusive*

After the severed and trimmed image-bearing portion of the film strip 575 has been mounted in the card 5b as above described, resulting in the card shown at 5c in FIG. 4 and wherein the mounted film frame or section is indicated at 11, and the vacuum carrier 838, 839 and the anvil member 923 have been lowered and raised, respectively, clear of the resulting card 5c, the stop fingers 235, 236 and 237 are raised. Thereupon, the finished card 5c is advanced by the driven conveyor roller 180 and its cooperating pressure roller 200 beneath and relative to the raised stop finger 237 to the delivering and stacking mechanism 21 which acts to deliver and stack the finished cards 5c in the same order as the cards 5 were originally fed into the machine and in the same relation as to face and back, and to also present the stacked finished cards conveniently to the operator at the feeding-in end of the machine and in stacks of a predetermined number. After the finished card 5c has been received by the delivering and stacking mechanism 21 and has been advanced beyond the raised stop finger 237, the stop fingers 235, 236 and 237 are again lowered to their respective card arresting positions inaugurating the next cycle of operation of the machine. It will be understood that when the finished card 5c is advanced toward the delivering and stacking mechanism 21, the preceding cards 5b and 5a on the conveyor are simultaneously advanced to the succeeding stations, and a new card 5 from the feeder is simultaneously advanced to the first station. The finished card delivering and stacking mechanism 21 and the controlling and operating means therefor will now be described in detail.

Each finished card 5c is advanced by the driven conveyor roller 180 and cooperating pressure roller 200 to and between two transversely spaced parallel endless belts 953 and two idler pressure rollers 954 cooperating with said belts to increase the tractive effort thereof on the cards. The idler pressure rollers 954 are journalled on and at the free rear ends of arms 955 which are pivotally mounted at the front ends thereof by studs 956 on and at opposite sides of a bracket 957 which is bolted or otherwise suitably secured to the upper section 802 of the frame 640 of the previously described mechanism 20. The arms 955 and consequently the pressure rollers 954 thereon are yieldingly urged downwardly toward their respective belts 953 by coil compression springs 958 to maintain said pressure rollers engaged with the successive cards 5c and to yieldingly press the latter against said belts, said springs having corresponding ends thereof engaging against said arms and the opposite ends engaging against the lower ends of screw elements 959 which are adjustably threaded in the bracket 957 and are locked in adjusted positions by lock nuts 960. The springs 958 are preferably engaged over short and small diameter pins on the arms 955 and screw elements 959 to confine said springs therebetween.

The rear portions of the belts 953 pass around separate pulleys 961 which are journalled on and at the opposite ends of a stub shaft 962 which is suitably secured intermediate the ends thereof in the bracket 883. As shown in FIG. 1, the upper active reaches of the belts 953 extend forwardly from the pulleys 961 in a substantially horizontal plane tangent to the peripheral surface of a relatively large diameter, flanged wheel 963. The wheel 963 is keyed and suitably secured to a transverse stub shaft 964 which is journalled in a suitable bearing provided in and at the upper end of a vertically extending bracket 965 which is bolted or otherwise suitably secured at the lower end thereof to the frame 580 of the mechanism 18. The upper active reaches of the belts 953 pass upwardly and rearwardly around the front portion of the wheel 963 to the top of said wheel and then they extend rearwardly from said wheel in a substantially horizontal plane for a short distance and return upwardly and forwardly around a twin idler pulley 966. This idler pulley 966 is journaled on a transverse stub shaft 967 which is suitably fixed at one end thereof in a bracket 968 which is bolted or otherwise suitably secured to and adjacent the upper end of a standard 969 which extends transversely of the machine and is bolted or otherwise suitably secured to the base plate or platform 22 and projects upwardly therefrom.

From the twin idler pulley 966 the return reaches of the belts 953 pass forwardly over and around flanged idler pulleys 970 which are journalled on and at the free upper ends of separate vertical arms 971 which are releasably clamped at the lower ends thereof, for independent adjustment, to a single transverse stub shaft 972 which is suitably fixed at one end thereof in the frame 580 of the mechanism 18. The arms 971 thus provide for tightening of the belts 953 independently of each other to cause the active reaches thereof to frictionally bear against the peripheral surface of the wheel 963. From the belt tightening pulleys 970 the return reaches of the belts 953 pass downwardly and rearwardly under a twin idler pulley 973 which is journalled on a transverse stub shaft 974 which is suitably fixed at one end thereof in the frame 580 of the mechanism 18. From the twin idler pulley 973 the return reaches of the belts 953 pass rearwardly over and around flanged idler pulleys 975, then downwardly under and around a twin driving pulley 976, then upwardly and rearwardly over flanged idler pulleys 977 to the idler pulleys 961. The idler pulleys 975 and 977 are journalled in pairs on and at the opposite ends of stub shafts 978 and 979, respectively, which are suitably secured intermediate the ends thereof in a bracket 980 which is bolted or otherwise suitably secured to the frame 580 of the mechanism 18.

As best seen in FIGS. 35 and 38, the twin pulley 976 is engaged over the driven shaft 652 and is journalled on a sleeve 981 which surrounds said shaft and is formed with a flange 982 by means of which said sleeve is bolted or otherwise suitably secured to the bracket 654. The pulley 976 is suitably secured to the shaft 652 and, hence, it will be apparent that the belts 953 are continuously driven by said pulley at a relatively slow speed from said shaft which is continuously rotated by the motor driven speed reduction drive unit 645, as hereinbefore described. It will also be apparent that the wheel 963 is rotated by and through frictional contact of the belts 953 therewith, and that as each card 5c is delivered to the bight formed by said belts and said wheel 963 it is gripped and positively advanced upwardly and rearwardly in an arcuate path until it reaches the top of said wheel.

Other flanged pulleys 983 are employed and engaged with the return reaches of the belts 953 for keeping said belts taut and in frictional contact with the driving pulley 976. The pulleys 983 are journalled on separated pins 984 which are fixed at one end thereof in separate arms 985 which are disposed between the furcations of a bifurcated bracket 986 and are pivotally mounted on a single stub shaft 987 which is suitably secured in said bracket. The bracket 986 is bolted or otherwise suitably secured to the bracket 654. The arms 985 and consequently the pulleys 983 thereon are continuously urged into pressing engagement with the belts 953 by separate coil extension springs 988 having corresponding ends thereof connected to said arms and the opposite ends connected to a bracket 989 which is bolted or otherwise suitably secured to the bracket 654.

Each finished card 5c received by the belts 953 is maintained in proper lateral position on said belts and guided between the flanges of the wheel 963 by a shallow U-shaped pan 990 over which the upper active reaches of the belts travel, and two holddown rollers 991 which are journalled on and at the free lower ends of arms 992 which are pivotally mounted at the other ends thereof at 993 on the bracket 957. The rollers 991 rest by gravity on the belts 953, and the pan 990 is suitably secured to the bracket 980.

The finished cards 5c follow each other in closely spaced relation around the wheel 963, and as each card passes from between said wheel and the belts 953 it is further advanced horizontally rearwardly by said belts over a supporting plate or chute 994 which is suitably secured to a transverse bar 995. For pivotal adjustment of the plate 994, the bar 995 is secured at the outer end thereof to a bracket 996 by a machine screw 997 which extends through a suitable clearance opening in said bracket and is threaded into said bar. The bracket 996 is secured by a machine screw 998 to a bracket 999, and to provide for longitudinal adjustment of the plate 994 relative to the belts 953, said screw extends through a suitable clearance slot in the bracket 996 and is threaded into the bracket 999. The bracket 999 is secured to a horizontal plate-like bracket 1000 by bolts 1001 which pass through horizontal clearance slots in the bracket 999 and are threaded into the bracket 1000, said bolt and slot arrangement providing for longitudinal adjustment of the bracket 999 for a purpose to appear hereinafter. The bracket 1000 is bolted or otherwise suitably secured to the underside of a relatively long and wide open frame 1002 which extends longitudinally of the machine and is horizontally disposed substantially in the plane of the top of the wheel 963. The frame 1002 rests at the rear end thereof on top of the standard 155 and is bolted or otherwise suitably secured at said end and at the opposite end thereof to said standard and the standard 969, respectively.

Each card 5c advanced over the plate 994 by the belts 953 passes from said plate and drops flatwise upon a relatively long endless stacker belt 1003 which extends horizontally rearwardly to a position substantially over the card feeder 14, thus conveniently enabling the operator at one position to reload said feeder with additional cards 5 and to remove or unload the finished cards 5c from the stacker belt 1003. The front portion of the stacker belt 1003 passes around a roller 1004, and the rear portion of said belt passes around a roller 1005. The front roller 1004 is received within the forked front end of the bracket 999 and is journalled on a stub shaft 1006 which is formed at opposite ends thereof with flat surfaces and is slidably engaged at said ends in corresponding slots 1007 formed in said bracket. The stub shaft 1006 is connected at one end thereof to the bracket 999 for pivotal movement in a horizontal plane, and is engaged at the other end thereof by an adjusting screw 1008 threaded in said bracket for pivotally adjusting said shaft and the roller 1004 thereon so that the axis of rotation of said roller is normal to the line of travel of the stacker belt 1003.

During the normal operation of the machine, a relatively small increment of advancing movement is normally imparted to the stacker belt 1003 during each machine cycle so that the cards 5c delivered successively thereto are stacked thereon in overlapping fanned-out relation and intermittently advanced in such relation to the discharge end of said belt. For this purpose, the rear roller 1005 is fixed on one end of a shaft 1009 which extends transversely of the frame 1002 and is journalled in suitable bearings in spaced brackets 1010 and 1011 which are bolted or otherwise suitably secured to the standard 155. The shaft 1009 projects beyond the bracket 1011 and has fixed thereon a ratchet 1012 which is continuously engaged by a spring-pressed pawl 1013. This pawl 1013 is pivotally mounted at 1014 on a pawl carrier 1015 which is loosely mounted on the shaft 1009 exteriorly of the ratchet 1012 and is retained on said shaft by a snap ring 1016 which is engaged in a suitable annular groove formed in said shaft. Pivotally connected at 1017 to the pawl carrier 1015 is one end of a connecting rod 1018 which extends downwardly from said pawl carrier and has its opposite end pivotally connected at 1019 to one arm 1020 of a bellcrank lever 1021 having an upwardly projecting arm 1022 and a downwardly projecting shorter arm 1023. The bell-crank lever 1021 is pivotally mounted on a stud 1024 which is suitably secured in a boss 1025 (FIG. 15) formed on the frame 270 of the cover sheet stripping mechanism 16.

The arm 1022 of the bell-crank lever 1021 has journalled thereon at the free end thereof a cam follower 1026 which engages a cam 1027. This cam 1027 is keyed and suitably secured to the driven shaft 281 of the angle gear drive unit 280 which, as previously described, forms part of the drive for the cover sheet stripping mechanism 16. Accordingly, the cam 1027 will likewise make one complete revolution for each cycle of operation of the machine. The cam follower 1026 is yieldingly urged toward and into engagement with the cam 1027 by a coil extension spring 1028 having one end thereof connected at 1019 to the bell-crank lever 1021 and the opposite end connected to an angle bracket 1029 which is bolted or otherwise suitably secured to the frame 270 of the cover sheet stripping mechanism 16.

It will thus be apparent that upon engagement of the high part of the rotating cam 1027 with the cam follower 1026, the pawl carrier 1015, through the described operating connections therefor with said cam, will be positively rocked on its power stroke to rotate the ratchet 1012 a partial revolution through engagement of the pawl 1013 with said ratchet and thereby impart advancing movement to the stacker belt 103 and the cards 5c thereon. Upon engagement of the cam follower 1026 with the low part of the rotating cam 1027, the pawl carrier 1015 will be rocked on its idle or return stroke by the contracting action of the spring 1028. The operation of the ratchet 1012 is so timed that the stacker belt 1003 will be advanced after each card 5c is delivered thereto. A spring-pressed retaining pawl 1030 pivotally mounted at 1031 on the bracket 1011 is continuously engaged with the ratchet 1012 to hold the latter and the stacker belt 1003 in actuated positions and prevent return movement thereof as the pawl carrier 1015 is returned on its idle stroke.

It is evident that the extent of advancing movement imparted to the stacker belt 1003 is governed entirely by the depth of the low part of the cam 1027 and by the extent of movement of the cam follower 1026 into said low part. Accordingly, when the cam follower 1026 is permitted to follow the full depth of the low part of the cam 1027 a relatively large increment of advancing movement will be imparted to the stacker belt 1003, and when said cam follower is restrained to follow only part of the depth of the low part of said cam a relatively small increment of advancing movement will be imparted to said stacker belt. Latch means is, therefore, provided to normally restrain the bell-crank lever 1021 from rocking movement the full depth of the low part of the cam 1027 so that during the normal operation of the machine small increments of advancing movement are normally imparted to the stacker belt 1003, and to release said lever for rocking movement the full depth of the low part of said cam when the last card of a desired predetermined number of cards has been delivered to said belt, whereupon a relatively large increment of advancing movement will be imparted to the stacker belt, thus producing a relatively wide, easily discernible gap between said last card and the next succeeding card, as clearly shown in broken lines in FIG. 51, and thereby stacking the finished cards 5c on said stacker belt in stacks of a predetermined number as indicated at 1032 and 1033 in FIGS. 1 and 51.

As herein shown, said latch means comprises a latch member 1034 which is pivotally mounted by a stud 1035 on the frame 270 of the cover sheet stripping mechanism 16. Pivotally connected at 1036 to the latch member 1034 is the upper end of a vertical link 1037 the lower end of which is pivotally connected to 1038 to the movable core 1039 of a solenoid 1040 which is suitably secured to the angle bracket 1029. The solenoid 1040 has conductors 1041 and 1042 leading therefrom which are connected in the electrical control circuit for the machine, as illustrated in FIG. 58 and hereinafter described. The core 1039 of the solenoid 1040 and the latch member 1034 are biased upwardly to their normal positions shown in FIG. 55 by a coil extension spring 1043 having one end thereof connected at 1044 to said latch member and the opposite end connected to the angle bracket 1029. A stop screw 1045 adjustably threaded in the link 1037 and engaged by the latch member 1034 serves to limit upward pivotal movement of said latch member by the spring 1043 and to accurately locate the latch member in its normal operative position.

It is to be noted that in the normal position of the latch member 1034 shown in FIG. 55, said latch member is so located that each time the bell-crank lever 1021 is rocked in a counterclockwise direction by the spring 1028 as the cam follower 1026 enters the low part of the rotating cam 1027, the arm 1023 of said lever will engage the latch member and thereby stop the lever when said cam follower has entered only a small portion of the full depth of the low part of said cam, as clearly shown in broken lines in FIG. 55. Accordingly, only a small increment of advancing movement will normally be imparted to the stacker belt 1003 during each cycle of operation of the machine. However, when the solenoid 1040 is energized under the control of a conventional electrical counter as hereinafter explained in connection with the description of the electrical control circuit for the machine, the core 1039 of said solenoid will be drawn electrically downwardly and consequently the latch member 1034 will be rocked downwardly about its pivot 1035 by said core to a position clear of the arm 1023 of the bell-crank lever 1021. Under these conditions, the cam follower 1026 is permitted to follow the full depth of the low part of the cam 1027 and consequently the bell-crank lever 1021 will be rocked by the spring 1028 its full extent with the result that a large increment of advancing movement will be imparted to the stacker belt 1003 and the cards 5c thereon.

The counting of the finished cards 5c is done by a pair of relatively long resilient fingers 1046 and 1047 and a single relatively short resilient finger 1048. These feeler fingers 1046, 1047 and 1048 are suitably attached in spaced side-by-side relation to a terminal block 1049 which is suitably secured to the front face of the bracket 957. The feeler fingers 1046, 1047 and 1048 extend forwardly and downwardly from the terminal block 1049 between the belts 953 into yielding pressing contact with the card guiding pan 990, and as so located, the successive finished cards 5c are caused to pass successively beneath said fingers, and said fingers are caused to wipe along in yielding contact with the mounted film sections 11 in the successive cards through the window openings 10 in the adhesive sheets 7 on said cards. The relative lengths of the feeler fingers 1046, 1047 and 1048 are such that the long fingers 1046 and 1047 are spaced forwardly from the short finger 1048 a distance slightly greater than the length of the aperture 6 in the card so that at no time will all three fingers simultaneously contact the mounted film section 11 in the finished card 5c as the latter passes first beneath the short finger 1048 and then beneath the long fingers 1046 and 1047.

By virtue of the described location of the feeler fingers 1046, 1047 and 1048 so that they contact the film section 11 mounted in each finished card 5c, said feeler fingers also advantageously and effectively serve as detector means to detect the absence of the film section from the card after the latter leaves the mounting station with the film section supposedly mounted therein. In this manner, a final check is performed on each finished card, and the machine is stopped in the event the film section is, for some reason, missing from a card. When a film section 11 is missing from a supposedly finished card 5c, the feeler fingers 1046, 1047 and 1048 will contact the card guiding pan 990 through the vacant aperture 6 in said card and thereby affect the control circuit to cause stopping of the machine in a manner to be hereinafter described. For this purpose, as well as for the purpose of counting the finished cards 5c, the long feeler fingers 1046 and 1047 are electrically connected together by a conductor 1050, and one of said fingers and the short feeler finger 1048 have connected thereto conductors 1051 and 1052, respectively, which, together with the card guiding pan 990, are connected in the electrical control circuit for the machine, as illustrated in FIG. 58 and hereinafter described. The card guiding pan 990 forms in effect a circuit terminal as indicated in FIG. 58, being connected to ground through the frame structure of the machine which is represented by the conductor 1053 in said figure.

As the finished cards 5c pass successively from the plate 994, they engage a deflecting roller 1054 which acts to deflect the cards toward and onto the stacker belt 1003. The roller 1054 is journalled on and at one end of a rod 1055 which extends longitudinally of the stacker belt 1003 and is adjustably secured in a transverse stud 1056 which is loosely mounted in the standard 969 to enable the roller 1054 to rest by gravity on the cards 5c on said stacker belt.

ELECTRICAL CONTROL SYSTEM
FIG. 58

The electrical control circuit and the operation of the machine in connection with said circuit will now be described.

A main source of 110 volt alternating current is connected to vertical power lines P1 and P2 through closing of a master starting switch S. These power lines P1 and P2 supply alternating current to the various and sundry instrumentalities hereinbefore described, including the controlling relays therefor, but not including the magnetic clutch and brake unit 35. The controlling relays are designated by the symbol CR with an appropriate numerical suffix for each relay. The contacts controlled by each relay have the same reference character applied thereto with an appropriate capital letter suffix for each contact. Certain of the relays are of the standard non-latching type and others are of the standard latching-in type. As to the latching-in relays, the capital letter suffix LR is used to identify the latch releasing coils of said relays. The contacts of the various relays are shown in the positions assumed before the master switch S is closed.

The main driving motor 25 is directly connected to the power lines P1 and P2 by branch conductors 1075 and 1076, respectively. The vacuum pump motor 503 is directly connected to the power lines P1 and P2 by branch conductors 1077 and 1078, respectively. The motor 646 for driving the film strip feeding and registering mechanism 19 and the finished card delivering and stacking mechanism 21 is directly connected to the power lines P1 and P2 by branch conductors 1079 and 1080, respectively. Accordingly, when the master switch S is closed, the motors 25, 503 and 646 will start and continue to run as long as said switch remains closed.

Closing of the master switch S also supplies alternating current directly from the power lines P1 and P2 to a conventional electronic photo-electric cell amplifier or control 1081 through branch conductors 1082 and 1083, and 1084, respectively. The photo-electric cell 766 is directly connected with the amplifier 1081 by a conductor 1085. The light source 769 takes its current directly from the power line P2 through a branch conductor 1086, and from the power line P1 through the conductor 1082, a manual normally closed push-button switch 1087 and a conductor 1088. The switch 1087 is mounted on the front panel of a control box (not shown) which is mounted at a convenient point on the machine, such as on the open frame 1002, and contains the various relays and other switches and elements to be hereinafter referred to. The switch 1087 provides for independent extinguishing of the light source 769 when the same is not needed, as when inserts are produced from plain blank material and mounted in the cards.

Closing of the master switch S also supplies alternating current directly from the power lines P1 and P2 through branch conductors 1089 and 1090, respectively, to the primary winding 1091 of a step-down transformer 1092. Closing of the master switch S also supplies alternating current directly from the power lines P1 and P2 to an electrical counter 1093. The counter 1093 is preferably a Microflex reset counter which is well known and needs no detail description herein, except to say that electrical impulses are transmitted thereto in a manner to be hereinafter described by the feeler fingers 1046, 1047 and 1048 in response to the passing of the cards 5c successively beneath the same, and when a predetermined number of impulses have been transmitted, a circuit including the conductors 1041 and 1042 is closed to energize the solenoid 1040 and thereby effect a large increment of advancing movement to the stacker belt 1003 and the cards 5c stacked thereon, as hereinbefore described, the conductor 1041 being connected directly to said counter and the conductor 1042 being connected directly to the power line P2. Following this, the counter 1093 is again reset as hereinafter described.

The conductor 632 connected with one of the terminals of the micro-switch 624 is connected to the power line P1, and the conductor 631 connected to the motor 598 controlled by said switch is connected to the power line P2. Accordingly, when the microswitch 624 is closed as hereinbefore described, the motor 598 is started to effect unwinding and feeding of the film strip 575 from the supply roll 578 until the micro-switch 624 is again opened when the free loop 596 of the film strip 575 is fully extended, as hereinbefore described.

The power line P1 has directly connected thereto one end of a branch conductor 1094 the other end of which is connected to one terminal of a manual normally open starting switch 1095 of the push-button type which is mounted on the control panel. The other terminal of switch 1095 has connected thereto a conductor 1096 which is connected to a non-latching starting relay CR1 which is directly connected to the power line P2 by a branch conductor 1097. The contacts controlled by this relay CR1 are CR1A, CR1B, CR1C and CR1D. The conductor 1096 has connected thereto a conductor 1098 which is connected to a latching-in relay CR5, and the conductor 1098, in turn, has connected thereto conductors 1099 and 1100 which are connected to latching-in relays CR3 and CR4, respectively, said relays being directly connected to the power line P2 by conductors 1101, 1102 and 1103, respectively. The contacts controlled by the relays CR3, CR4 and CR5 are CR3A, CR4A and CR5A, respectively. The latch releasing coils of the relays CR3, CR4 and CR5 are indicated at CR3LR, CR4LR, and CR5LR, respectively.

One terminal of the contacts CR1A of the relay CR1 is directly connected to the power line P1 by a branch conductor 1104, and the other terminal of said contacts is connected by a conductor 1105 to one terminal of a manual normally closed stop switch 1106 of the push-button type which is mounted on the control panel. The other terminal of switch 1106 is connected to a non-latching holding relay CR2 which is connected to the power line P2 by a conductor 1107 through the conductor 1102. The contacts controlled by the relay CR2 are CR2A and CR2B. One terminal of the contacts CR1B of the relay CR1 is directly connected to the power line P1 by a branch conductor 1108, and the other terminal of said contacts is connected by a conductor 1109 with the conductors 263, 554 and 920 of the mercury switch 262 and the micro-switches 553 and 919, respectively, which, as hereinbefore described, form part of the card calipering means, the detecting means embodied in the adhesive sheet die mechanism, and the detecting means embodied in the film strip severing and film frame transferring and mounting mechanism, respectively. The other conductors 264, 555 and 921 of the switches 262, 553 and 919, respectively, are connected to the latch releasing coils CR3LR, CR4LR and CR5LR, respectively, which are directly connected to the power line P2 by branch conductors 1110, 1111 and 1112, respectively. The terminal of the fixed contact of contacts CR1C of the relay CR1 is connected to latching-in relays CR6 and CR7 by conductors 1113 and 1114, respectively, said relays being directly connected to the power line P2 by branch conductors 1115 and 1116, respectively. The contacts controlled by these relays CR6 and CR7 are CR6A and CR7A, respectively, and the latch releasing coils of said relays are indicated at CR6LR and CR7LR, respectively. The terminal of the fixed contact of contacts CR1D of the relay CR1 is connected by conductors 1117 and 1118 to the latch releasing coils CR6LR and CR7LR, respectively. The latch releasing coil CR6LR has connected thereto the conductor 363 which is connected to the cover sheet detector finger or probe 360. The terminal of the movable contact which cooperates with the fixed contacts of contacts CR1C and CR1D of relay CR1 is connected by a conductor 1119 to a conductor 1120 which is connected to one end of the secondary winding 1121 of the transformer 1092, the other end of said winding being connected to the conductor 1090 and thus to the power line P2 by a conductor 1122.

The power line P1 has connected thereto conductors 1123 and 1124 which are connected to a manual normally open double-pole double-throw push-button switch 1125, the conductor 1123 being connected to one terminal of one pair of contacts, and the conductor 1124 being connected to the corresponding terminal of the other pair of contacts. The switch 1125 is mounted on the control panel. Upon actuation of switch 1125 in one direction, said switch serves to connect the conductor 1123 with a conductor 1126, and upon actuation of the switch in the other direction, said switch serves to connect the conductor 1124 with a conductor 1127, said conductors 1126 and 1127 being connected to the remaining corresponding terminals of the switch. The conductor 1126 is also connected to a latching-in relay CR8 which is directly connected to the power line P2 by a conductor 1128. The contacts controlled by this relay CR8 are CR8A and CR8B, and the latch releasing coil of said relay is indicated at CR8LR. One terminal of the contacts CR8A is connected by a conductor 1129 to the conductor 1126, and the other terminal of said contacts has connected thereto the conductor 729 which, as previously described, is connected to the solenoid 696 which controls the intermittent feeding of the film strip 575 to the severing means. The other conductor 730 leading from the solenoid 696 is connected directly to the power line P2. The conductor 1060 leading from the timer 698 and associated with the cam actuated timer switch 699 is directly connected to the power line P1. The other companion conductor 1061 leading from the timer 698 is connected to the latch releasing coil CR8LR which is directly connected to the power line P2 by a conductor 1130. One of the terminals of the contacts CR8B of the relay CR8 is connected by a conductor 1131 to a latching-in relay CR9 which is directly connected to the power line P2 by a conductor 1132. The other terminal of the contacts CR8B has connected thereto a conductor 1133 to be hereinafter referred to.

The contacts controlled by the relay CR9 are CR9A, CR9B and CR9C, and the latch releasing coil of said relay is indicated at CR9LR. One of the terminals of the contacts CR9C is connected by a conductor 1134 to the conductor 1060, and the other terminal of said contacts has connected thereto the conductor 787 which, as previously described, is connected to the film strip feeding solenoid 786. The other conductor 788 leading from the solenoid 786 is directly connected to the power line P2. The latch releasing coil CR9LR is directly connected to the power line P2 by a conductor 1135, and said coil has connected thereto a conductor 1136 which is connected to one terminal of a manual normally open push-button switch 1137 which is mounted on the control panel. The other terminal of switch 1137 is directly connected to the power line P1 by a conductor 1138. A conductor 1139 is connected to the conductors 1061 and 1136. One terminal of the contacts CR9B is connected by a conductor 1140 to the photo-cell amplifier 1081, and the other terminal of said contacts is connected by a conductor 1141 to a non-latching relay CR10 which is directly connected to the power line P2 by a conductor 1142. The contacts controlled by this relay CR10 are CR10A and CR10B.

The contacts CR2B, CR9A, CR6A, CR5A, CR7A, CR3A and CR4A are connected in series in the order named beginning with the fixed contact of the contacts CR2B and ending with the movable contact of the contacts CR4A. The terminal of the movable contact of the contacts CR4A is connected by a conductor 1143 with a non-latching relay CR11 which is directly connected to the power line P2 by a conductor 1144. The terminal of the fixed contact of the contacts CR2B is connected by a conductor 1145 to the terminal of the movable contact of the contacts CR2A. The terminal of the fixed contact of the contacts CR2A is connected by a conductor 1146 to the conductor 1105. The contacts controlled by the relay CR11 are CR11A, CR11B and CR11C. One terminal of the contacts CR11A is directly connected to the power line P1 by a conductor 1147. The other terminal of the contacts CR11A is connected by a conductor 1148 to the fixed contact of the contacts CR2B and to the movable contact of the contacts CR2A through the conductor 1145, said terminal having also connected thereto the conductor 1062 which is connected to one terminal of the cam actuated timer switch 700. The other terminal of the cam actuated timer switch 700 has connected thereto the conductor 1063 which is connected to one terminal of the cam actuated timer switch 701 and to the series circuit between the contacts CR3A and CR4A of the relays CR3 and CR4, respectively. The other terminal of the cam actuated timer switch 701 has connected thereto the conductor 1064 which is connected to the conductor 1143.

The terminal of the fixed contact of contacts CR11B of the relay CR11 is connected by a conductor 1149 to a brush 1150 that engages the slip ring 39 on the driving pulley 28, said slip ring being connected to the driving magnet 36 which is also connected to the slip ring 40 on said pulley. The terminal of the fixed contact of contacts CR11C of relay CR11 is connected by a conductor 1151 to the braking magnet 37 which is connected by a conductor 1152 to a conductor 1153. This conductor 1153 is connected to an outside source of direct current 1154 and to a brush 1155 which engages the slip ring 40. The terminal of the movable contact which cooperates with the fixed contacts of contacts CR11B and CR11C is connected by a conductor 1156 to the power source 1154.

The conductors 727 and 728 which are connected to the terminals of the cam actuated timer switch 697, as previously described, are connected to the power line P1 and to one terminal of one pair of contacts of a double-pole double-throw switch 1157. This switch 1157 is arranged on the control panel to be simultaneously actuated when the push-button switch 1087 is actuated by the operator to closed and opened positions. The corresponding terminal of the other pair of contacts of the switch 1157 has connected thereto the conductor 1127 which, as previously described, is connected with the switch 1125. The conductor 1127 is also connected to the conductor 728. When the push-button switch 1087 is closed, the switch 1157 is adapted to connect the conductors 728 and 1127 with a conductor 1158, and when the push-button switch 1087 is opened, the switch 1157 is adapted to connect the conductors 728 and 1127 with a conductor 1159. The conductor 1158 connected to the switch 1157 is connected to the terminal of the movable contact which is operated by the relay CR10 and cooperates with the fixed contacts of the contacts CR10A and CR10B of said relay. The fixed contact of the contacts CR10A has connected thereto a conductor 1160 which is connected to one terminal of one pair of contacts of a double-pole double-throw switch 1161 which is mounted on the control panel and has connected to the other terminal of said pair of contacts the conductor 1133 which, as previously described, is connected to one of the contacts of the contacts CR8B of the relay CR8. One of the terminals of the other pair of contacts of the switch 1161 has connected thereto a conductor 1162 which is connected to the fixed contact of the contacts CR10B of the relay CR10, said switch having connected to the other terminal of said pair of contacts a conductor 1163 which is connected to the conductor 1133. The conductor 1160 has connected thereto a conductor 1164 which is connected to one terminal of one pair of contacts of a double-pole double-throw switch 1165 having connected to the other terminal of said pair of contacts a conductor 1166 which is connected to a conductor 1167. The switch 1165 is mounted on the control panel for operation in unison with the switch 1161. The conductor 1167 is connected to the conductor 1126 and to one terminal of the other pair of contacts of the switch 1165, the other terminal of said pair of contacts having the conductor 1162 connected thereto.

The conductor 1120 which, as previously described, is connected to the secondary winding 1121 of the transformer 1092, is also connected to a non-latching relay CR12. This relay CR12 has connected thereto the conductor 1052 which, as previously described, is connected to the short film section detecting and card counting feeler finger 1048. The contacts controlled by this relay CR12 are CR12A, CR12B, CR12C and CR12D. The fixed contact of the contacts CR12A is connected to the latch releasing coil CR7LR of the relay CR7. The fixed contact of the contacts CR12B is connected to the conductor 1052. The movable contact which cooperates with the fixed contacts of the contacts CR12A and CR12B has connected thereto the conductor 1051 which, as previously described, is connected to the long film section detecting and card counting feeler fingers 1046 and 1047. The fixed contact of the contacts CR12C is connected to the counter 1093 by a conductor 1168. The fixed contact of the contacts CR12D is connected to the counter 1093 by a conductor 1169. The movable contact which cooperates with the fixed contacts of the contacts CR12C and CR12D is directly connected to the power line P1 by a conductor 1170.

Let it now be assumed that the switch S has been closed by the machine attendant, thus starting the motors 25, 503 and 646, and energizing the photo-electric cell 766 and the amplifier 1081. The switches 1087 and 1157 are closed by the machine attendant to the positions shown in FIG. 58, thus illuminating the light source 769 and providing for feeding, scanning and registering of the film strip 575. Let it also be assumed that the image-bearing film strip 575, or other like transparent or translucent image-bearing strip, to be handled in the machine is formed so that the image-bearing areas or portions 576 thereof are defined by relatively dark and/or opaque line-spaces or areas 577. The rays of light from the light source 769 will, therefore, normally impinge upon the photo-electric cell 766, thus normally energizing the relay CR10 and thereby closing the contacts CR10A. The switches 1161 and 1165 are then closed by the machine attendant to the positions shown in FIG. 58 so that the circuit including said switches and controlled by the photo-electric cell 766 will function in response to "fall of light," i.e., by said photo-electric cell sensing the dark lines-paces 577 on the film strip 575.

With the film strip 575 threaded into the guide 595, the machine attendant may now, without running the entire machine, operate the film strip feeding and registering mechanism 19 and make whatever adjustments that are necessary to insure accurate registry of the film strip 575 with the severing means. This is conveniently accomplished by means of the switch 1125 which normally occupies a neutral position. Closing of this switch 1125 by the machine attendant in a direction to momentarily connect the conductors 1123 and 1126 will energize the relay CR8, resulting in closing and latching of the contacts CR8A and CR8B and energizing of the film strip feed solenoid 686 and slow speed feeding movement of the film strip 575 along the guide 595. The machine attendant then operates the switch 1125 in the opposite direction to connect the conductors 1124 and 1127 so that the relay CR9 will be energized when a dark line-space 577 on the slow moving film strip 575 reaches and is scanned by the photo-electric cell 766 and thereby interrupts the light beam to said cell or materially decreases the intensity of said light beam upon said cell. Thereupon, the current through the photo-electric cell 766 is decreased, with the result that the relay CR10 is deenergized, thus opening the contacts CR10A and closing the contacts CR10B. Opening of the contacts CR10A breaks the circuit to the relay CR8 and to the film strip feed solenoid 696, and closing of the contacts CR10B completes the circuit to the relay CR9 through the still latched contacts CR8B, thus energizing the relay CR9 to close and latch the contacts CR9C and to open and latch the contacts CR9B. Closing of the contacts CR9C energizes the film strip feed solenoid 786 resulting in continued feeding movement of the film strip 575, but at a faster speed, to the film strip severing means. The machine attendant then releases the switch 1125 to return to the neutral position thereof, thus deenergizing the relay CR9, and then momentarily closes the switch 1137 whereupon the latch releasing coils CR8LR and CR9LR are energized to release the latched contacts CR8A, CR8B, CR9B and CR9C, thus resetting said contacts and breaking the circuit to the film strip feed solenoid 786. When the switch 1137 is released by the machine attendant, the circuit to the latch releasing coils CR8LR and CR9LR is broken, at which time the above-described operations may be repeated by the machine attendant if deemed necessary.

When the image-bearing film or other strip 575 to be handled in the machine is formed so that the image-bearing portions or areas 576 thereof are defined by light and/or transparent or translucent line-spaces or areas 577, the switches 1161 and 1165 are closed by the machine attendant in a direction to connect the conductors 1160 and 1133, and 1162 and 1167, respectively, so that the above-described operations will occur in response to "rise of light," i.e., by the photo-electric cell 766 sensing the light line-spaces 577 on the film strip 575. Under these conditions, the rays of light from the light source 769 falling on the photo-electric cell 766 will normally be interrupted by the film strip 575 and, hence, the relay CR10 will normally be deenergized and the contact CR10B will normally be closed. Accordingly, when a light line-space 577 on the slow moving film strip 575 reaches and is scanned by the photo-electric cell 766, maximum light from the light source 769 will impinge upon said cell and, hence, the current to the cell increases with the result that the relay CR10 will then be energized, thus opening the contacts CR10B and closing the contacts CR10A. Opening of the contacts CR10B breaks the circuit to the relay CR8 and to the film strip solenoid 696, and closing of the contacts CR10A energizes the relay CR9 to effect further feeding movement of the film strip 575 at a faster speed to the film strip severing means. When the relay CR9 is energized resulting in closing and latching of the contacts CR9C and energizing of the film strip feed solenoid 786, and opening and latching of the contacts CR9B and deenergizing of the relay CR10, the switch 1125 is released by the machine attendant to return to the neutral position thereof. Thereupon, the switch 1137 is momentarily closed by the machine attendant to energize the latch releasing coils CR8LR and CR9LR and thereby release the latched contacts CR8A, CR8B, CR9B and CR9C, and break the circuit to the film strip feed solenoid 786.

The make-ready of the entire machine having been completed, the switch 1106 having been closed, the switches 1125 and 1137 having been placed in their normal neutral positions, as shown in FIG. 58, the switches 1087 and 1157 having been closed to the positions shown in FIG. 58, and the switches 1161 and 1165 having been placed in their proper closed positions so that the photo-electric cell 766 should operate by "fall of light" or by "rise of light," as dictated by the type of film or other strip 575 to be handled in the machine, the machine attendant, with the master switch S closed and with the switches 1161 and 1165 positioned and closed, for example, for "fall of light" operation, as shown in FIG. 58, now closes the switch 1095 to provide for starting of the machine and continued normal operation of the various mechanisms.

Closing of the switch 1095 energizes the relays CR1, CR3, CR4 and CR5. Energization of the relay CR1 closes the contacts CR1A and CR1C and opens the contacts CR1B and CR1D. Closing of the contacts CR1A energizes the holding relay CR2. Closing of the contacts CR1C energizes the relays CR6 and CR7. Opening of the contacts CR1B insures that the circuit to the latch releasing coils CR3LR, CR4LR, and CR5LR is initially broken. Opening of the contacts CR1D insures that the circuit to the latch releasing coils CR6LR and CR7LR is initially broken. Energization of the relay CR3 closes and latches the contacts CR3A. Energization of the relay CR4 closes and latches the contacts CR4A. Energization of the relay CR5 closes and latches the contacts CR5A. Energization of the relays CR6 and CR7 closes and latches the contacts CR6A and CR7A, respectively. With a dark line-space 577 on the film strip 575 in non-scanning position with respect to the photo-electric cell 766, the relay CR10 is energized thus closing the contacts CR10A and opening the contacts CR10B.

Energization of the relay CR2 closes the contacts CR2A and CR2B. Closing of the contacts CR2A and CR2B completes the circuit to the relay CR11 through the closed cam actuated timer switches 700 and 701, thus energizing said relay. Energization of the relay CR11 closes the contacts CR11A and CR11B, and opens the contacts CR11C. Closing of the contacts CR11B completes the D.C. circuit to the driving magnet 36, and opening of the contacts CR11C breaks the D.C. circuit to the braking magnet 37. As soon as the driving magnet 36 is energized, and the braking magnet 37 is denergized, as just described, the machine starts in operation, thereupon the machine attendant releases the switch 1095 thus disconnecting the conductors 1094 and 1096 and thereby deenergizing the relays CR1, CR3, CR4 and CR5, resulting in opening of the contacts CR1A and CR1C only, and closing of the contacts CR1B and CR1D only, the contacts CR3A, CR4A and CR5A remaining closed since they are latched as previously described. However, the holding relay CR2 continues to receive current from the power line P1 through the conductor 1147, the closed and latched contacts CR11A, the conductors 1148 and 1145, the closed contacts CR2A, the conductors 1146 and 1145, the closed push-button switch 1106, and the conductors 1107 and 1102 to the power line P2. Accordingly, the machine will continue to run to process the cards 5 and produce finished cards 5c, as hereinbefore described, so long as the push-button switch 1106 is not opened by the machine attendant and no abnormal operating condition arises in connection with the cards, the film strip 575, and the severed film sections.

It will be apparent that when the push-button switch 1106 is opened, the machine will not immediately stop, but that the stopping of the machine will be delayed until either the cam actuated timer switch 700 is opened or the cam actuated timer switch 701 is opened, whereupon the relay CR11 will be deenergized, the contacts CR11B will again be opened and the contacts CR11C will again be closed, with the result that the driving magnet 36 will be deenergized, and the braking magnet 37 will be energized, thus substantially abruptly stopping the machine. It might be mentioned at this time that the cam actuated timer switch 700 is so timed to open while the various cards are in progress from station to station, and the cam actuated timer switch 701 is so timed to open while the cards are still at their respective stations and engaged with their respective stop fingers, and as the adhesive sheet punch substantially reaches the end of its return stroke. In this manner, the defective card may conveniently be removed, checked, corrected, replaced, or a new card inserted.

Reopening of the contacts CR1C breaks the circuit to the relays CR6 and CR7, the contacts CR6A and CR7A of said relays, respectively, however, remain closed since they are latched as previously described. Reclosing of the contacts CR1B connects the power line P1 to the plural-card caliper switch 262, the detector switch 553 of the adhesive sheet die mechanism, and the detector switch of the film section transfer mechanism. Reclosing of the contacts CR1D connects one side of the secondary winding 1121 of the transformer 1092 to the latch releasing coils CR6LR and CR7LR. In this connection, it is pointed out that with the short film-section-detecting and card-counting finger 1048 in contact with the card guiding pan 990 upon closing of the switch 1095, the relay CR12 is also energized, thus opening the contacts CR12A and CR12C, and closing the contacts CR12A and CR12D. Opening of the contacts CR12A disconnects the long film-section-detecting and card-counting fingers 1046 and 1047 from the latch releasing coil CR7LR. Closing of the contacts CR12B connects the long fingers 1046 and 1047 in circuit through contact thereof with the card guiding pan 990. Opening of the contacts CR12C disconnects the circuit from the card counting device of the counter 1093. Closing of the contacts CR12D connects the circuit to the resetting device of the counter 1093 to reset the latter to zero if it has not already been so set.

During the normal operation of the machine, the various operations of the film strip feeding and registering mechanism 19, as previously explained in connection with the make-ready of said mechanism, are automatically controlled at proper intervals by the cam actuated timer switches 697 and 699. Additionally, the closed and latched contacts CR3A, CR4A, CR5A, CR6A and CR7A are connected in series with the relay CR11, and when the relay CR9 is energized in response to the operation of the photo-electric cell 766, the contacts CR9A will also be closed and latched in the series circuit to maintain the circuit to the relay CR11 closed while the cam actuated timer switches 700 and 701 are open, provided no abnormal condition arises which will cause opening of any one of said contacts in which event the machine will be stopped when the timer switch 700 is opened with any one of the contacts CR3A, CR5A, CR6A, CR7A and CR9A open, and when the timer switch 701 is opened with the contacts CR4A open.

For example, when plural cards 5 are simultaneously fed into the machine, resulting in closing of the mercury switch 262, the latch releasing coil CR3LR is thereby energized, thus releasing the contacts CR3A to open and thereby cause stopping of the machine when the cam actuated timer switch 700 is subsequently opened and relay CR11 is thus deenergized. When the adhesive sheet die mechanism 17 fails to die-cut the window opening in a card, the micro-switch 553 is closed, thus energizing the latch releasing coil CR4LR to release the contact CR4A to open and thereby cause stopping of the machine when the cam actuated timer switch 701 is subsequently opened and the relay CR11 is thus deenergized. When the film strip cutting and film frame transferring mechanism 20 fails to transfer a severed film frame to card mounting position, resulting in closing of the micro-switch 919, the latch releasing coil CR5LR is thereby energized, thus releasing the contacts CR5A to open and thereby cause stopping of the machine when the cam actuated timer switch 700 is subsequently opened and the relay CR11 is thus deenergized. Likewise, when the push-button switch 1106 is opened by the machine attendant, the holding relay CR2 will be deenergized, with the result that the contacts CR2A and CR2B will open thus causing stopping of the machine when whichever one of the cam actuated timer switches 700 and 701 is opened first and the relay CR11 is thus deenergized. Additionally, in the event the photo-electric cell 766 fails to function, for some reason, with the result that the relay CR9 is not energized and, hence, the contacts CR9A are not closed, the machine will be stopped when the cam actuated timer switch 700 is subsequently opened and the relay CR11 is thus deenergized. When the cover sheet stripping mechanism 16 fails to remove the cover sheet from a card, the latch releasing coil CR6LR, through contact of the feeler finger 360 with the backing member 345, will be energized, thus releasing the contacts CR6A to open and thereby cause stopping of the machine when the cam actuated timer switch 700 is subsequently opened and the relay CR11 is thus deenergized.

Each finished card 5c received by the delivery belt 953 passes first beneath the short feeler finger 1048 and thereby lifts said finger out of contact with the pan 990, but the relay CR12 is not deenergized at this time since said relay is still connected to ground or the power line P2 through contact of the long feeler fingers 1046 and 1047 with said pan. However, when the card 5c passes next beneath and lifts the long fingers 1046 and 1047 out of contact with the pan 990, the relay CR12 is deenergized, thus opening the contacts CR12B and CR12D and closing the contacts CR12A and CR12C. Upon closing of the contacts CR12C the counting device of the counter 1093 will be electrically actuated to add the finished card 5c, and when a predetermined number of finished cards 5c has been added, said counting device functions to complete the circuit to the solenoid 1040, thus effecting a large increment of advancing movement of the stacker belt 1003, as and for the purpose hereinbefore described. When the short finger 1048 drops off the trailing end of the finished card 5c and again makes contact with the pan 990, the relay CR12 is again energized to reopen the contact CR12A and CR12C and to reclose the contacts CR12B and CR12D in readiness for the next finished card 5c to count and add the same in the counter 1093.

Let it now be assumed that a card 5c received by the delivery belts 953, for some reason, does not contain a film section therein. Under these conditions, when the long fingers 1046 and 1047 lifted by this card pass over the vacant aperture 6 in said card they will drop through said aperture and, hence, again make contact with the pan 990, and since the contacts CR12A are closed at this time, the latch releasing coil CR7LR will be energized, thus releasing the contacts CR7A to open and thereby cause stopping of the machine when the cam actuated timer switch 700 is subsequently opened and the relay CR11 is thus deenergized.

When it is desired to mount plain blank inserts in the cards instead of image-bearing inserts, the switch 1087 is opened by the machine attendant and the switch 1157 is actuated to disconnect the conductors 728 and 1158 and to connect the conductor 728 with the conductor 1159. Accordingly, the light source 769 is extinguished since it is not needed, and the circuit controlling the slow speed film strip feed solenoid 696 and controlled by the photo-electric cell 766 is rendered inoperative. It will thus be apparent that each time the cam actuated timer switch 697 is closed, during the normal operation of the machine, the relay CR9 will thus be energized and, hence, the contacts CR9C will be closed to energize the faster speed film strip feed solenoid 786 and thereby effect feeding movement of the plain blank insert supply strip a proper distance into cutting relation with the strip severing means. It might be said that the diameter of the film strip feed roller 681 is so chosen that the film strip 575 is advanced thereby a distance slightly in excess of the spacing between the fixed knife blades 834 and 835.

While only one embodiment of the present invention has been described in the foregoing specification and illustrated in the accompanying drawings in connection with one specific purpose, it will be apparent that various omissions and substitutions and changes in the form and details of the machine illustrated and its operation may be made by those skilled in the art without departing from the spirit and scope of the invention. The present invention may be embodied in a machine including all of the various mechanisms herein described and illustrated, or certain of said mechanisms may be employed independently for various purposes, or any one or more of the mechanisms may be associated and employed for various purposes independently of the other mechanism or mechanisms. It is not intended, therefore, that the present invention shall be limited to the embodiment shown nor otherwise than by the terms of the appended claims.

The card feeder, the card conveyor, the card calipering means, and certain features of the adhesive sheet die mechanism disclosed herein are not claimed in the present application for the reason that they form the subject matter of a separate application of Stanley T. Stoothoff, Serial No. 649,372, filed March 29, 1957.

What is claimed is:

1. In a machine for operating on cards each having an aperture therein, an adhesive sheet secured over said aperture at one face of the card, and a protective cover sheet within the aperture and removably adhering to said adhesive sheet, the combination of at least three mechanisms arranged in successive order along a predetermined path travelled by successive cards, said mechanisms including a cover sheet stripping mechanism for removing the cover sheet from each card, a die mechanism for forming a window opening in the adhesive sheet of each card, said window opening being located centrally with respect to the card aperture and smaller in size than said aperture leaving a marginal portion of the adhesive sheet extending into the aperture around its edges, and a mounting mechanism for mounting an insert sheet, such as an image bearing section of micro-film, in the aperture and against the marginal portion of the died-out adhesive sheet of each card, said mechanisms being arranged along said path in the order named, means for operating said three mechanisms in unison once during each cycle of operation of the machine whereby the cover sheet stripping operation, the window opening forming operation and the insert sheet mounting operation are performed simultaneously on separate cards, conveyor means arranged along said path for simultaneously advancing during each cycle of operation of the machine the cards from one to the other of said mechanisms, the card with insert sheet therein from the last of said mechanisms, and a new card with cover sheet therein to the first of said mechanisms, and means for operating said conveyor means.

2. In a machine for operating on cards each having an aperture therein, an adhesive sheet secured over said aperture at one face of the card, and a protective cover sheet within the aperture and removably adhering to said adhesive sheet, the combination of continuously driven conveyor means for advancing successive cards in spaced relation along a predetermined path, operable stop means arranged at a first, second and third locality along said path for arresting the movement of each card at each of said localities for a predetermined interval and for thereafter releasing said card for further movement by said conveyor means beyond said localities, means for moving said stop means at said localities in unison into and out of said path during each cycle of operation of the machine whereby three of said cards will be arrested and released during each machine cycle, operable means at said first locality for stripping the cover sheet from each card, operable die means at said second locality for forming a window opening in the adhesive sheet of each card devoid of the cover sheet, said window opening being located centrally with respect to the card aperture and smaller in size than said aperture leaving a marginal portion of the adhesive sheet projecting into the aperture around its edges, operable means at said third locality for mounting an insert sheet, such as an image bearing section of micro-film, in the aperture and against the marginal portion of the died-out adhesive sheet of each card, and means for operating said cover sheet stripping means, said die means and said insert sheet mounting means in unison during each cycle of operation of the machine in timed relation with the operation of said stop means, whereby during each cycle of operation of the machine the cover sheet is stripped from one card, the window opening is die-cut in the adhesive sheet of another card, and the insert sheet is mounted in the aperture of another card.

3. Apparatus as defined in claim 2 wherein said cover sheet stripping means comprises means disposed at one side of the card and operable through the adhesive sheet for initially stripping an edge portion of the cover sheet from said adhesive sheet and deflecting said edge portion beyond the plane of the card through the open end of the aperture in said card, and other means disposed at the other side of said card for completely stripping said cover sheet from said adhesive sheet through said card aperture end beginning with said deflected edge portion of said cover sheet.

4. Apparatus as defined in claim 2 wherein said cover sheet stripping means comprises means disposed at one side of the card and operable through the adhesive sheet for initially stripping an edge portion of the cover sheet from said adhesive sheet and deflecting said edge portion beyond the plane of the card through the open end of the aperture in said card while the latter is at rest, and other means disposed at the other side of said card for progressively peeling said cover sheet from said adhesive sheet through said card aperture end beginning with said deflected edge portion of said cover sheet while said card is being advanced by said conveyor means from said first locality to said second locality.

5. Apparatus as defined in claim 2 wherein said cover sheet stripping means comprises means disposed at one side of the card and operable through the adhesive sheet for initially stripping an edge portion of the cover sheet from said adhesive sheet and deflecting said edge portion beyond the plane of the card through the open end of the aperture in said card, gripper means disposed at the other side of said card, means for operating said gripper means to grip said deflected edge portion of said cover sheet, and means for moving said gripper means relative to said card in a direction so as to progressively peel said cover sheet from said adhesive sheet through said card aperture end.

6. Apparatus as defined in claim 2 wherein said cover sheet stripping means comprises means disposed at one side of the card and operable through the adhesive sheet for initially stripping a transverse edge portion of the cover sheet from said adhesive sheet and deflecting said edge portion beyond the plane of the card through the open end of the aperture in said card while the latter is at rest, gripper means disposed at the other side of said card for gripping said deflected edge portion of said cover sheet while said card is at rest, and means for moving said gripper means in an arcuate path in the direction of and in unison with the movement of said card from said first locality to said second locality to progressively peel said cover sheet from said adhesive sheet through said card aperture end.

7. Apparatus as defined in claim 2 wherein said cover sheet stripping means comprises pin means disposed at one side of the card and operable through the adhesive sheet for initially stripping a transverse edge portion of the cover sheet from said adhesive sheet and deflecting said portion beyond the plane of the card through the open end of the aperture in said card, means for operating said pin means, pivoted gripper means disposed at the other side of said card for progressively peeling said cover sheet from said adhesive sheet through said card aperture end, means for rocking said gripper means in timed relation with the operation of the stop means and release of said card thereby in the direction of movement of the released and moving card and at substantially the same surface speed thereof, and means for operating said gripper means in timed relation with the operation of said pin means and with such rocking movement thereof to respectively grip said deflected portion of said cover sheet and to release said cover sheet when peeled from said adhesive sheet.

8. Apparatus as defined in claim 7 wherein said gripper means comprises a fixed jaw and a pivotal jaw, and said gripper operating means comprises a pivotal cam, and means for imparting pivotal movement to said cam in unison with such rocking movement of said gripper means and for imparting pivotal movement thereto relative to said gripper means to effect pivotal movement of said pivotal jaw toward and away from said fixed jaw to closed and open positions, respectively.

9. Apparatus as defined in claim 7, comprising means arranged adjacent the path of movement of said gripper means to engage the peeled cover sheet released by said gripper means and remove the same from said gripper means.

10. Apparatus as defined in claim 9 wherein said means for removing the peeled cover sheet from said gripper means comprises a roller continuously driven in the direction of movement of said gripper means in peeling said cover sheet from the adhesive sheet, and said gripper means is provided with an idler roller which cooperates with said driven roller and is overlapped by the peeled cover sheet.

11. Apparatus as defined in claim 10 wherein said driven roller is arranged to contact the peeled cover sheet as said gripper means approaches the end of its movement and is effective to remove said cover sheet from said gripper means upon the release of said cover sheet at said end by said gripper means.

12. Apparatus as defined in claim 11 wherein said gripper means is returned to the original cover sheet gripping position thereof substantially immediately following the release of the cover sheet thereby so as to augment the effective action of said driven roller.

13. Apparatus as defined in claim 7, comprising means arranged adjacent the path of movement of said gripper means for detecting the failure of said gripper means to grip and peel the cover sheet from said adhesive sheet, and means operative in response to such detection by said detecting means for causing a desired control action such as stopping of the machine.

14. Apparatus as defined in claim 13 wherein said cover sheet detecting means comprises a fixed electrical contact member, and a companion electrical contact member carried by and movable with said gripper means, said companion contact member being arranged to engage and sweep along said fixed contact member upon failure of said gripper means to peel the cover sheet from the adhesive sheet and to be shielded by the cover sheet as the same is advanced by said gripper means past said fixed contact member thereby preventing engagement of said companion member with said fixed member, said contact members being connected in an electric control circuit for the machine and upon contact thereof affecting said circuit to cause stopping of the machine.

15. Apparatus as defined in claim 2 wherein said cover sheet stripping means comprises pin means disposed at one side of the card and operable through the adhesive sheet for initially stripping opposite corner portions of the cover sheet from said adhesive sheet and deflecting said portions beyond the plane of the card through the open end of the aperture in said card, means for operating said pin means, gripper means disposed at the other side of said card and comprising a pivotal body having a cover sheet gripping surface thereon, and two gripper jaws pivotally mounted on said body to grip said deflected portions of said cover sheet against said surface, means for rocking said body in the direction of movement of said card so as to progressively peel the gripped cover sheet from said adhesive sheet through said card aperture end, and means for operating said gripper jaws toward and away from said surface to closed and open positions, respectively.

16. Apparatus as defined in claim 15, comprising co-operating means on said surface and said jaws for augmenting the effective gripping action of said jaws.

17. Apparatus as defined in claim 16 wherein said cooperating means comprises pointed pins on said gripper jaws and companion recesses in said surface.

18. Apparatus as defined in claim 15 wherein said gripping surface and said gripper jaws are shaped to conform substantially to the shape of the deflected corner portions of the cover sheet.

19. Apparatus as defined in claim 15, comprising a backing member for supporting said cover sheet during peeling and transferring thereof and mounted on said body for pivotal movement into and out of operative position in response to the movement of said gripper jaws to closed and open positons, respectively.

20. Apparatus as defined in claim 19 wherein said backing member is formed of electrically conductive material, and comprising detecting means in the form of a fixed electrical contact member arranged adjacent the path of movement of said gripper means so as to be engaged by said backing member upon failure of said gripper means to peel the cover sheet from the card, engagement of said fixed member with said backing member being normally prevented by the cover sheet gripped by said gripper means, said fixed member and said backing member being connected in an electric control circuit for the machine and upon contact thereof affecting said circuit to cause stopping of the machine.

21. A machine as defined in claim 2 wherein said die means comprises a hollow vertically disposed die located below the card and aligned with the aperture in said card, said die having at the upper end thereof a rectangular cutting edge facing the open end of said card aperture and conforming in size to that of the window opening to be formed in the adhesive sheet on said card, a cutting block located above said card directly opposite said die and cooperating with the latter to cut from said sheet the portion thereof forming said window opening therein, means for imparting relative movement to said die and said block toward each other to cut said sheet portion, ejector means slidable centrally of and relative to said block and movable downwardly to engage and move the die-cut sheet portion into said die to a position spaced below said cutting edge, means for operating said ejector means in timed relation with the cutting of said sheet portion by said die and said block, choke means arranged within said die providing a restricted passage therethrough for releasably and temporarily retaining said die-cut sheet portion therein, and vent means on said die for connecting to the atmosphere the interior space of said die above the die-cut sheet portion deposited therein.

22. A machine as defined in claim 21 wherein said ejector means comprises a vacuum element for gripping and carrying the die-cut sheet portion to said position within said die, means for producing vacuum in said element to cause said sheet portion to be gripped by said element, valve means interposed between and pneumatically connected with said vacuum producing means and said element for controlling the making and breaking of vacuum in said element at proper intervals, and guide means for said element having a relief port therein communicating with the atmosphere, said vacuum element having a relief port therein communicating with the interior thereof and being arranged to register with the relief port in said guide means when said element substantially reaches said position.

23. A machine as defined in claim 2, wherein said die means comprises a hollow vertically disposed die located below the card and aligned with the aperture in said card, said die having at the upper end thereof a rectangular cutting edge facing the open end of said card aperture and conforming in size to that of the window opening to be formed in the adhesive sheet on said card, a cutting block located above said card directly opposite said die and cooperating with the latter to cut from said sheet the portion thereof forming said window opening therein, means for imparting relative movement to said die and said block toward each other to cut said sheet portion, ejector means slidable centrally of and relative to said block and movable downwardly to engage and move the die-cut sheet portion into said die to a position spaced below said cutting edge, means for operating said ejector means in timed relation with the cutting of said sheet portion by said die and said block, and means controlled by said ejector means for causing stopping of the machine when during downward movement of said ejector means into said die no die-cut sheet portion is moved thereby into said die.

24. A machine as defined in claim 23 wherein said last-named means comprises an operable control member movable in unison with said ejector means, an operable controlling member positioned under the control of said ejector means to cause operation of said control member when no die-cut sheet portion is moved into said die by said ejector means and to prevent operation of said control member when a die-cut sheet portion is moved into said die by said ejector means, and means responsive to the operation of said control member for causing stopping of the machine.

25. A machine as defined in claim 23 wherein said ejector means comprises a vacuum element for gripping the die-cut sheet portion and carrying the same into said die to said position, means for producing vacuum in said element to cause said die-cut sheet portion to be gripped by said element, and valve means interposed between and pneumatically connected with said vacuum producing means and said element for controlling the making and breaking of vacuum in said element at proper intervals, and said controlled means comprises a pivotally mounted control member movable in unison with said vacuum element and having a cam surface thereon, a reciprocal controlling plunger, resilient means acting on said plunger to normally position the same for engagement by said cam surface and operation of said control member thereby, means pneumatically connecting said plunger with said vacuum element so as to cause movement of said plunger to an inoperative position by the vacuum created in said element when a die-cut sheet portion is present thereon and seals the same whereby engagement of said cam surface with said plunger and actuation of said control member is prevented, and means responsive to the operation of said control member for causing stopping of the machine.

26. A machine as defined in claim 25 wherein said responsive means comprises an electrical switch connected in an electrical control circuit for maintaining the machine in operation and upon actuation thereof affecting said circuit to cause stopping of the machine.

27. Apparatus as defined in claim 2 wherein said insert sheet mounting means comprises, severing means spaced laterally from the line of travel of the cards for cutting an insert sheet from a supply strip thereof, means for feeding a given length of said strip into cutting relation with said severing means, and carrier means for receiving the severed insert sheet and movable horizontally from a retracted position in which the same is disposed directly below said severing means to an advanced position in which the same is disposed directly below and in alignment with the open end of the aperture in the card and upwardly into said card aperture for transferring the severed insert sheet to the card and mounting said insert sheet in the aperture in the card and against the adhesive marginal portion of the adhesive sheet on said card, and anvil means for said carrier means mounted above the card and movable into pressing engagement with the adhesive sheet on said card.

28. Apparatus as defined in claim 2 wherein said insert sheet mounting means comprises, severing means spaced laterally from the line of travel of the cards for cutting an insert sheet from a supply strip thereof, means for feeding a given length of said strip into cutting relation with said severing means, vacuum carrier means for receiving and gripping the severed insert sheet and movable horizontally from a retracted position in which the same is disposed directly below said severing means to an advanced position in which the same is disposed directly below and in alignment with the open end of the aperture in the card and upwardly into said card aperture for transferring the severed insert sheet to the card and mounting said insert sheet in the aperture in the card and against the adhesive marginal portion of the adhesive sheet on said card, valve means for controlling the making and breaking of vacuum in said carrier means at proper intervals, and anvil means for said carrier means mounted above the card and movable into pressing engagement with the adhesive sheet on said card.

29. Apparatus as defined in claim 27, comprising operable means for causing the stopping of the machine, and means for actuating said operable means when during transfer movement of said carrier means the insert sheet is absent from said carrier means.

30. Apparatus as defined in claim 27, comprising means movable to occupy the retracted insert sheet receiving position of said carrier means when said position is vacated by said carrier means for supporting the leading end portion of the supply strip during feeding movement of said strip into cutting relation with said severing means.

31. Apparatus as defined in claim 28 wherein said vacuum carrier means is also moved upwardly toward said severing means to a predetermined position to receive the severed insert sheet from said severing means.

32. Apparatus as defined in claim 28, comprising operable means for causing the stopping of the machine, and actuating means for said operable means mounted on and movable with said carrier means and positioned relative to said carrier means in response to the presence of the insert sheet on and the absence of the same from said carrier means to prevent actuation of said operable means thereby when the insert sheet is present on said carrier means and to provide for actuation of said operable means thereby when the insert sheet is not present on said carrier means.

33. Apparatus as defined in claim 28, comprising means movable to occupy the retracted insert sheet receiving position occupied by said carrier means for supporting the leading end portion of the supply strip during feeding movement of said strip into cutting relation with said severing means, and means for moving said supporting means into said position when the latter is vacated by said carrier means.

34. Apparatus as defined in claim 28, comprising means movable to occupy the retracted insert sheet receiving position occupied by said carrier means for supporting the leading end portion of the supply strip during feeding movement of said strip into cutting relation with said severing means, biasing means for continuously urging said supporting means into said position and effective in response to the movement of said carrier means out of said position, and means on said supporting means and arranged to be engaged by said carrier means during retracting movement thereof to said position for moving said supporting means out of said position.

35. Apparatus as defined in claim 2, comprising delivering and stacking mechanism for the finished cards, said mechanism comprising an endless delivery conveyor arranged to receive the cards successively from said insert sheet mounting means in spaced relation and to advance said cards in like manner upwardly in an arcuate path and then rearwardly in the direction of said mounting means, means for continuously driving said delivery conveyor, an endless stacker conveyor arranged to receive the successive cards from said delivery conveyor, and means for normally imparting a relatively small increment of advancing movement to said stacker conveyor for each card received thereon to produce a closely overlapping relation of cards on said stacker conveyor and for imparting a relatively large increment of advancing movement to said stacker conveyor after a predetermined number of cards has been stacked thereon so as to provide an easily discernible batch of closely spaced cards thereon.

36. Apparatus as defined in claim 2, comprising delivering and stacking mechanism for the advancing cards, said mechanism comprising a relatively large diameter wheel rotatable about a transverse axis spaced forwardly from said insert sheet mounting means, a plurality of transversely spaced endless delivery belts traveling in conformity with said wheel and substantially tangentially toward the same at the bottom thereof and substantially tangentially away therefrom at the top thereof, means for continuously driving said belts, an endless stacker belt extending substantially tangentially away from said wheel at the top thereof for receiving the successive cards from said delivery belts and said wheel, operable means for intermittently advancing said stacker belt, and means for controlling the operation of said operable means such that normally a relatively small increment of advancing movement is imparted thereby to said stacker belt for each card received thereon to produce a closely overlapping relation of said cards on said stacker belt and a relatively large increment of advancing movement is imparted thereby to said stacker belt after a predetermined number of cards has been stacked thereon to produce a wide separation of cards on said stacker belt into batches.

37. Apparatus as defined in claim 36 wherein said operable means for intermittently advancing said stacker belt comprises a ratchet operatively connected to said stacker belt, a pivotally mounted pawl carrier, a pawl on said carrier and continuously engaged with said ratchet, a pivotally mounted lever operatively connected with said carrier, and cam and spring means for rocking said lever a predetermined maximum extent to impart like rocking movement to said carrier, and said controlling means comprises a releasable latch element arranged to be normally engaged by said lever to limit rocking movement thereof by said cam and spring means to part only of said maximum extent, a counter, means for operating said counter, and means controlled by said counter for moving said latch element clear of said lever at the end of a predetermined count of said counter to permit rocking movement of said lever by said cam and spring means said maximum extent.

38. Apparatus as defined in claim 2, comprising a source of power, means including an electric control circuit providing for operation of the machine by said source of power, means for calipering each card on said conveyor means during movement thereof toward said cover sheet stripping means, switch means connected in said circuit and operable to break said circuit and thereby cause stopping of the machine in response to the operation of said calipering means when plural cards are simultaneously so advanced, detector switch means connected in said circuit and acting to break said circuit and thereby cause stopping of the machine when said cover sheet stripping means fails to remove the cover sheet from a card, other switch means connected in said circuit and arranged to maintain said circuit and provide for continued operation of the machine for a predetermined period following the operation of said first-named switch means or said detector switch means, and timed means for actuating said last-named switch means to break said circuit and thereby cause stopping of the machine.

39. Apparatus as defined in claim 38, comprising means for detecting the failure of said die means to die-cut the window opening in a card, other switch means connected in said circuit and operable to break said circuit and thereby cause stopping of the machine in response to such detection by said detecting means, another switch means connected in said circuit and arranged to maintain said circuit and provide for continued operation of the machine for a predetermined period following the operation of said other switch means, and timed means for actuating said another switch means to break said circuit and thereby cause stopping of the machine.

References Cited in the file of this patent

UNITED STATES PATENTS

| | | |
|---|---|---|
| 1,304,943 | Clark | May 27, 1919 |
| 1,459,693 | Rand et al. | June 19, 1923 |
| 2,365,977 | Stine et al. | Dec. 26, 1944 |
| 2,423,601 | MacArthur | July 8, 1947 |
| 2,493,159 | Morrison | Jan. 3, 1950 |
| 2,511,232 | Wittel | June 13, 1950 |
| 2,519,491 | Monaco | Aug. 22, 1950 |
| 2,555,218 | Bailey | May 29, 1951 |
| 2,570,176 | Wittel | Oct. 2, 1951 |
| 2,588,087 | Connor et al. | Mar. 4, 1952 |
| 2,591,519 | Decker | Apr. 1, 1952 |
| 2,643,786 | Baker | June 30, 1953 |
| 2,666,543 | Standish | Jan. 19, 1954 |
| 2,697,507 | Vergobbi | Dec. 21, 1954 |
| 2,711,984 | Kingman | June 28, 1955 |
| 2,717,710 | Baker | Sept. 13, 1955 |
| 2,725,100 | Payne | Nov. 29, 1955 |
| 2,738,007 | Power et al. | Mar. 13, 1956 |